US011880549B2

(12) United States Patent
Chung et al.

(10) Patent No.: US 11,880,549 B2
(45) Date of Patent: Jan. 23, 2024

(54) ELECTRONIC DEVICE AND METHOD FOR PROVIDING PANEL FOR CONTROL OF APPLICATION IN ELECTRONIC DEVICE

(71) Applicant: SAMSUNG ELECTRONICS CO., LTD., Suwon-si (KR)

(72) Inventors: Jinkyo Chung, Suwon-si (KR); Eunah Jang, Suwon-si (KR); Minwook Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/846,504

(22) Filed: Jun. 22, 2022

(65) Prior Publication Data
US 2023/0034927 A1 Feb. 2, 2023

Related U.S. Application Data

(63) Continuation of application No. PCT/KR2022/006705, filed on May 11, 2022.

(30) Foreign Application Priority Data

Jul. 30, 2021 (KR) ........................ 10-2021-0100513

(51) Int. Cl.
*G06F 3/0482* (2013.01)
*G06F 3/04886* (2022.01)
(Continued)

(52) U.S. Cl.
CPC .......... *G06F 3/0482* (2013.01); *G06F 3/0416* (2013.01); *G06F 3/04812* (2013.01);
(Continued)

(58) Field of Classification Search
CPC .... G06F 1/1643; G06F 1/1652; G06F 1/1681; G06F 3/01; G06F 3/04817; G06F 3/0482;
(Continued)

(56) References Cited

U.S. PATENT DOCUMENTS

2016/0098063 A1   4/2016  Lee et al.
2016/0132074 A1*  5/2016  Kim ...................... G06F 1/1652
                                                       345/173
(Continued)

FOREIGN PATENT DOCUMENTS

CN   109542328 A   3/2019
CN   109925711 A   6/2019
(Continued)

OTHER PUBLICATIONS

International Search Report (PCT/ISA/210) dated Aug. 10, 2022 by the International Searching Authority in International Application No. PCT/KR2022/006705.
(Continued)

*Primary Examiner* — Yaron Cohen
(74) *Attorney, Agent, or Firm* — Sughrue Mion, PLLC

(57) ABSTRACT

An electronic device includes a hinge configured to foldably connect a first housing to a second housing; a display including a first display area disposed on the first housing, and a second display area and a third display area arranged on the second housing; and at least one processor configured to: in a first state in which the hinge is unfolded, display a first application in the first display area and the second display area, and display, in the third display area, at least one default button, in a second state in which the hinge is folded, control the display to display a panel button, in the third display area, and based on a selection of the panel button in the second state, display the first application in the first display area, and display, in the second display area, a first panel including at least one control button and at least one system button.

21 Claims, 68 Drawing Sheets

(51) Int. Cl.
*G06F 3/04883* (2022.01)
*G06F 3/04812* (2022.01)
*H04M 1/02* (2006.01)
*G06F 3/041* (2006.01)

(52) U.S. Cl.
CPC ...... *G06F 3/04883* (2013.01); *G06F 3/04886* (2013.01); *H04M 1/0218* (2013.01); *H04M 1/0268* (2013.01); *G06F 2203/04102* (2013.01); *H04M 2250/22* (2013.01)

(58) Field of Classification Search
CPC ............... G06F 3/04883; G06F 3/147; G06F 2203/04803; G09G 2340/04; G09G 2340/0464; G09G 2340/14; G09G 2354/00; G09G 2358/00; G09G 2380/02; G09G 2380/14; G09G 5/14
See application file for complete search history.

(56) References Cited

U.S. PATENT DOCUMENTS

| | | |
|---|---|---|
| 2017/0045996 A1 | 2/2017 | Ka et al. |
| 2017/0221456 A1 | 8/2017 | Kim et al. |
| 2019/0042066 A1 | 2/2019 | Kim et al. |
| 2020/0174661 A1 | 6/2020 | Liang et al. |
| 2022/0374123 A1 | 11/2022 | Zang et al. |

FOREIGN PATENT DOCUMENTS

| | | |
|---|---|---|
| CN | 111026350 A | 4/2020 |
| CN | 113010076 A | 6/2021 |
| KR | 10-2015-0125554 A | 11/2015 |
| KR | 10 2016-0040909 A | 4/2016 |
| KR | 10-2016-0055646 A | 5/2016 |
| KR | 10-2017-0090851 A | 8/2017 |
| KR | 10-2017-0093658 A | 8/2017 |

OTHER PUBLICATIONS

Written Opinion (PCT/ISA/237) dated Aug. 10, 2022 by the International Searching Authority in International Application No. PCT/KR2022/006705.

* cited by examiner

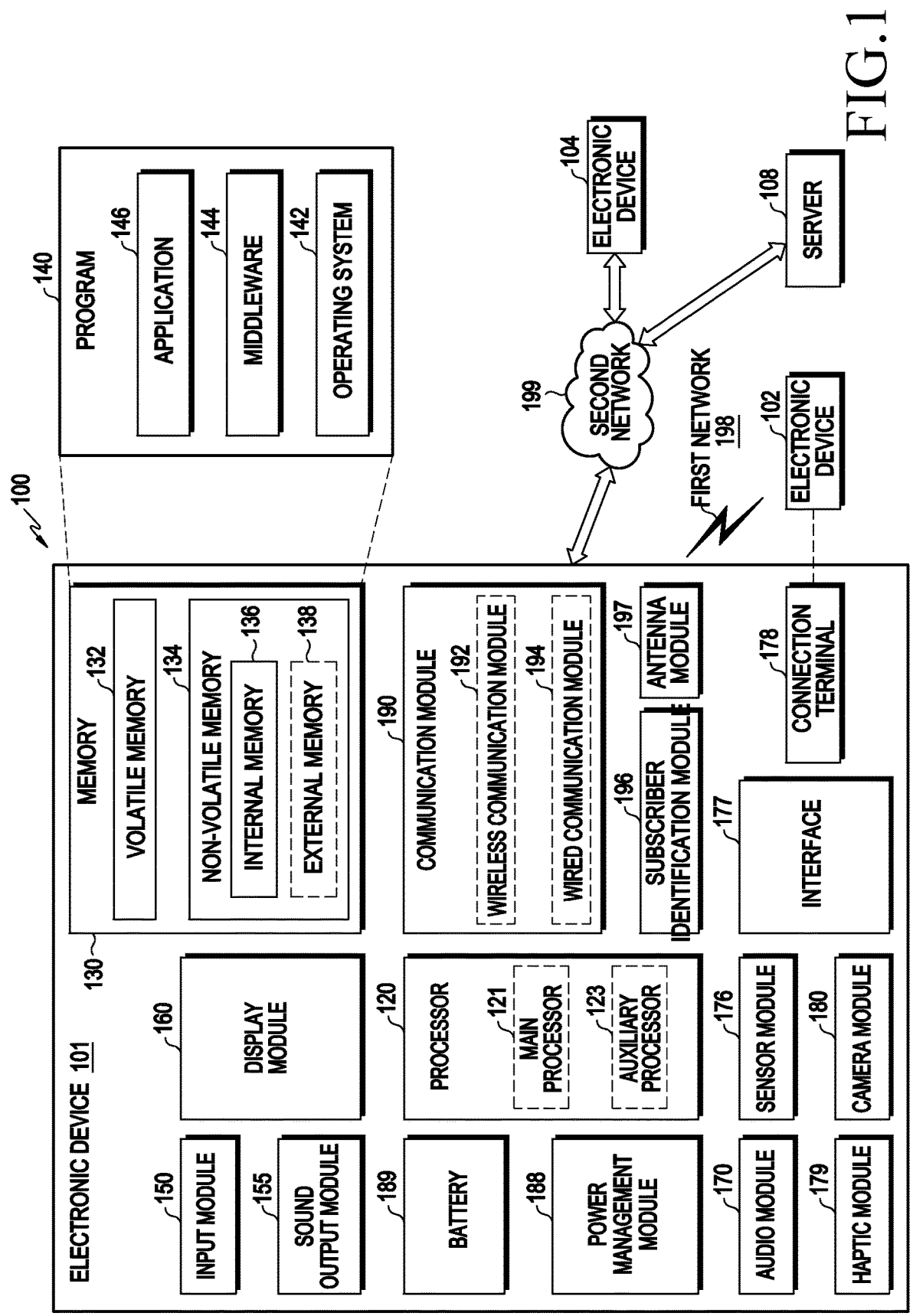

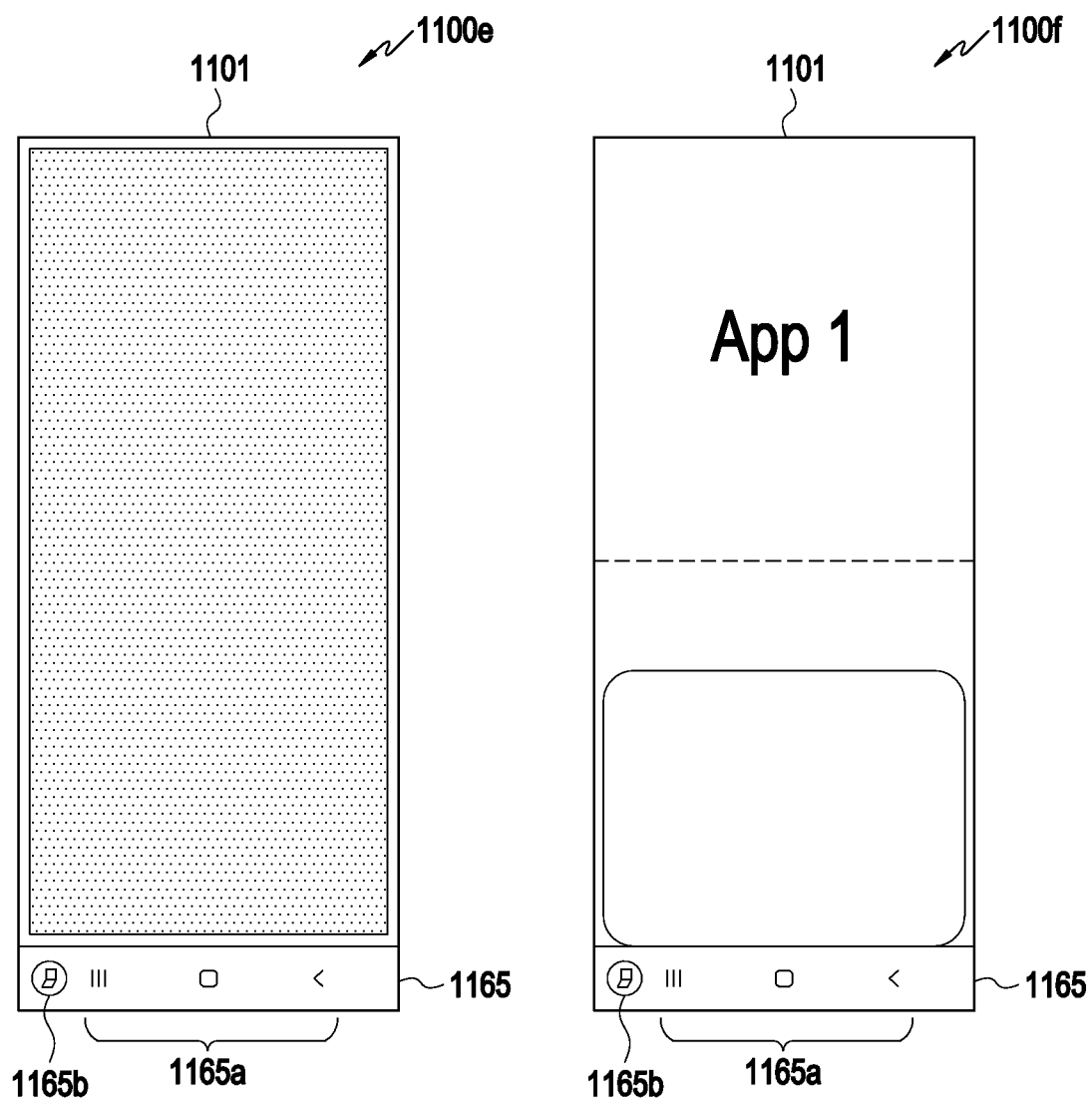

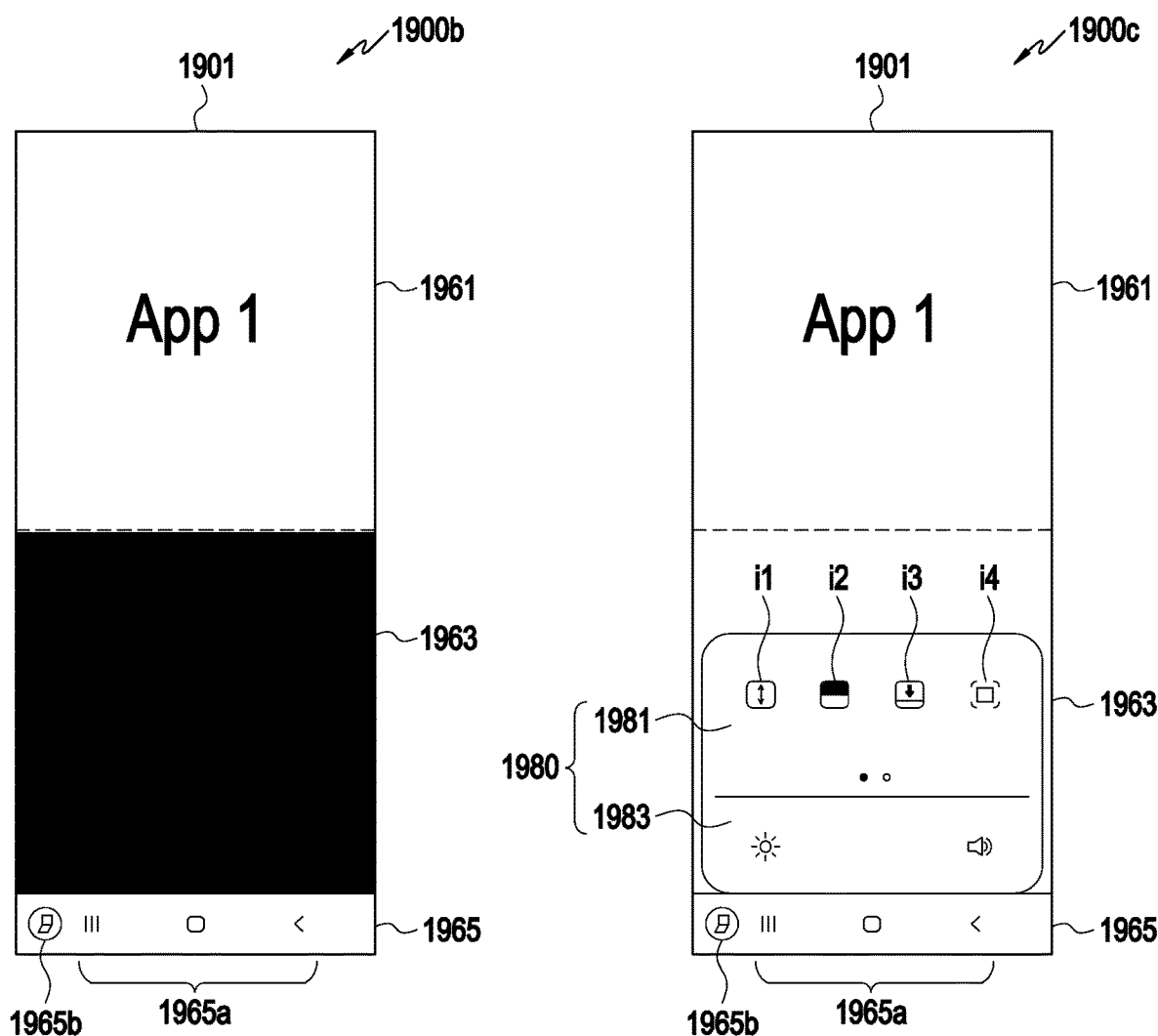

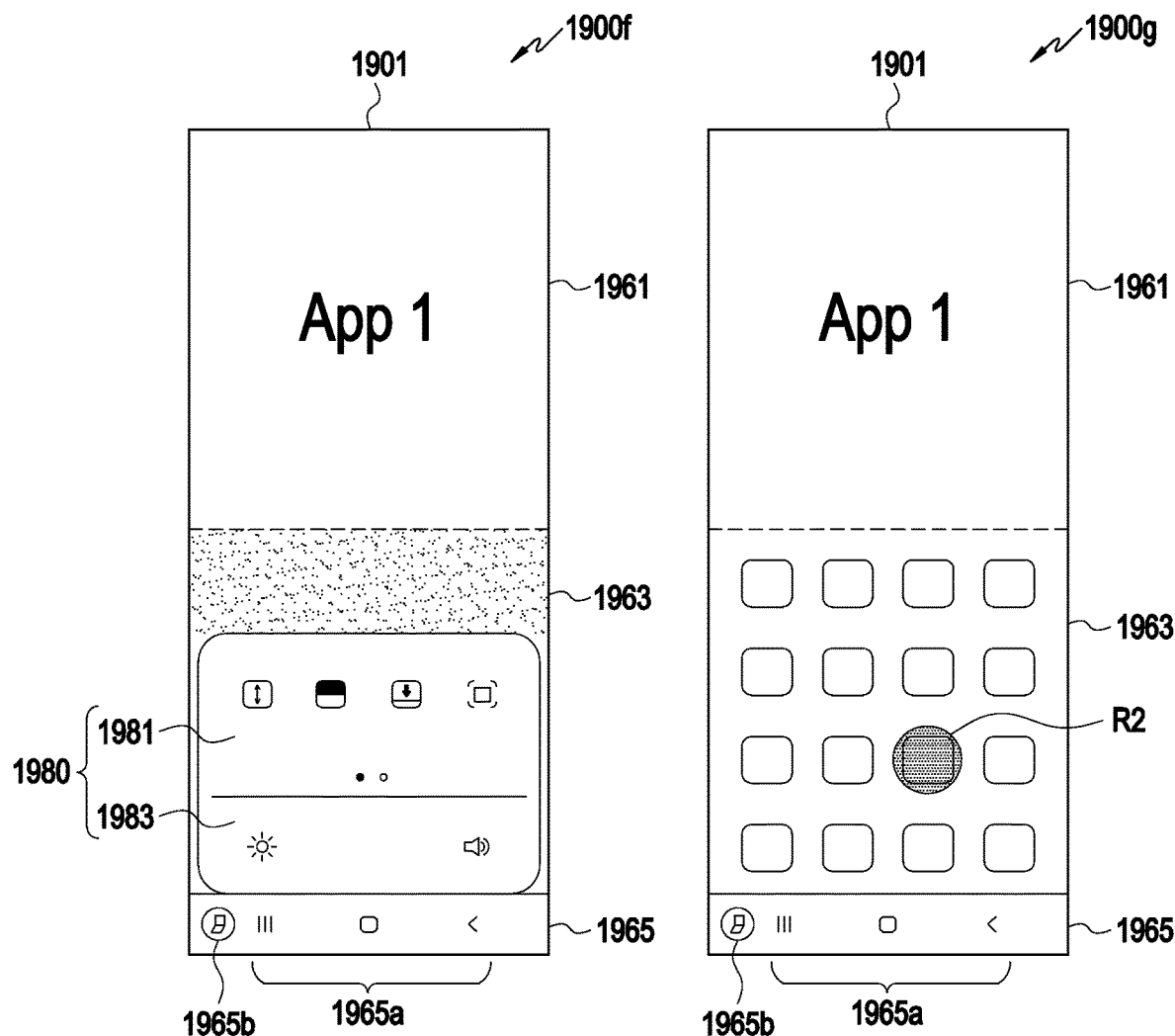

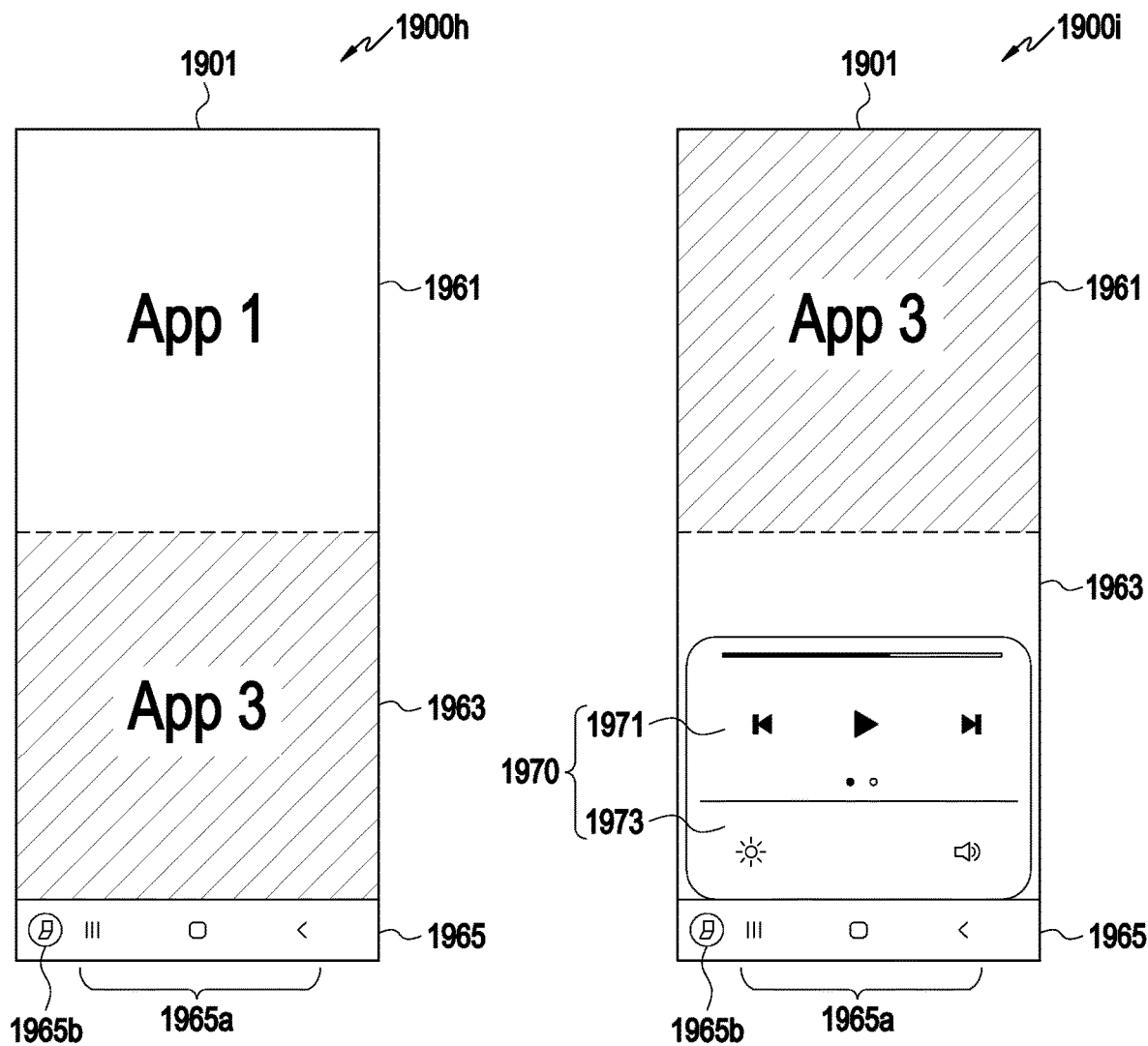

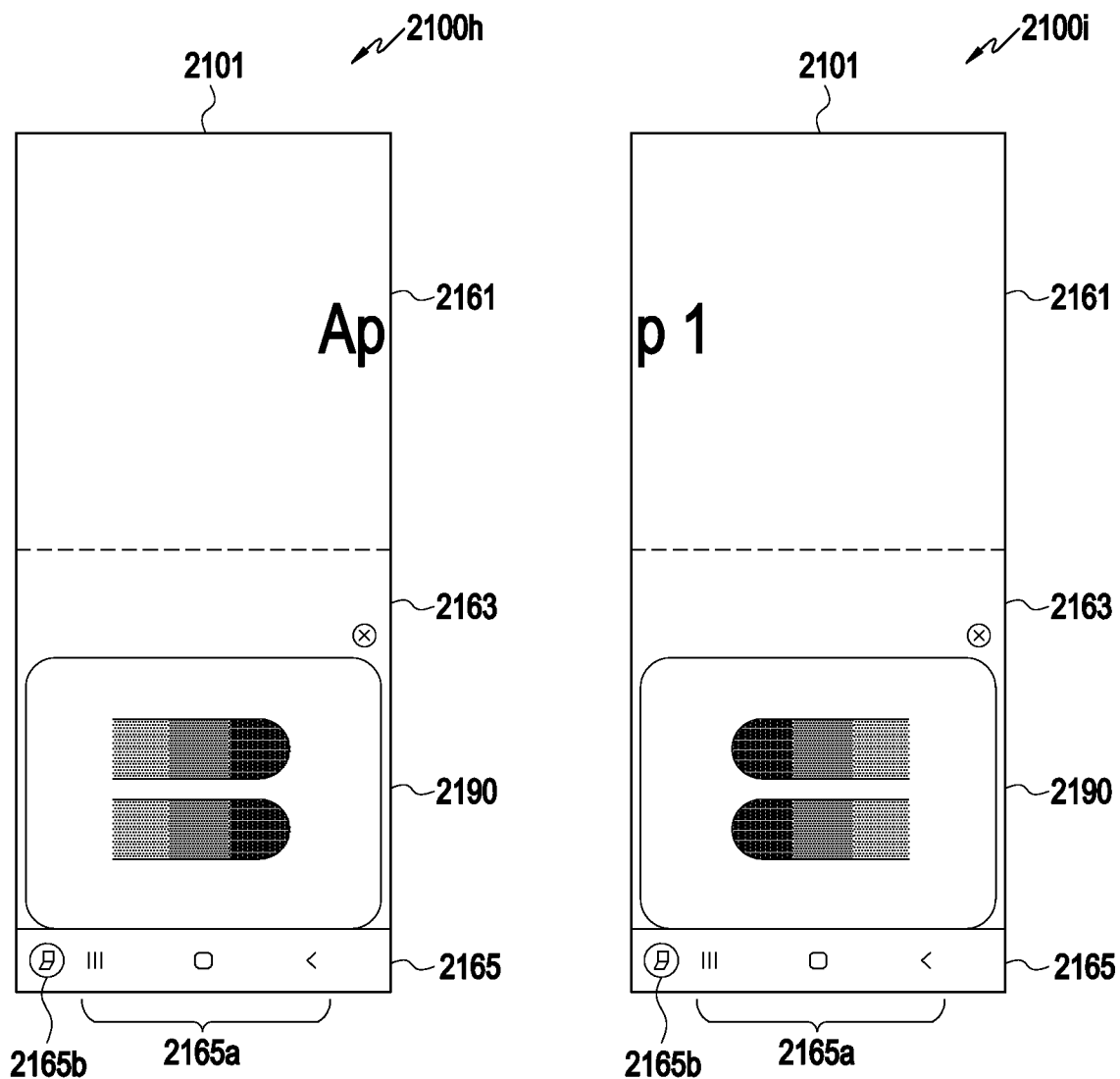

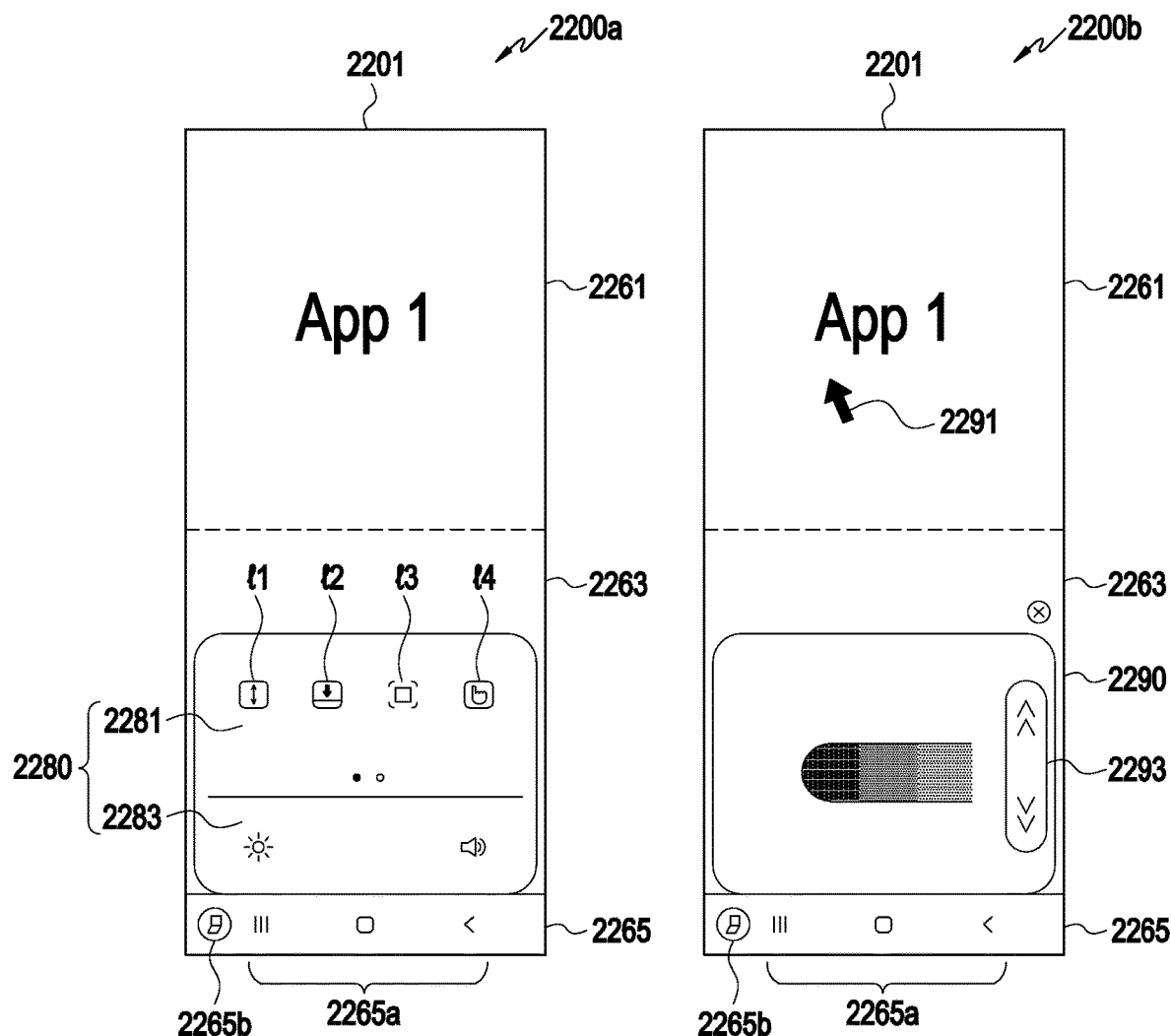

ELECTRONIC DEVICE AND METHOD FOR PROVIDING PANEL FOR CONTROL OF APPLICATION IN ELECTRONIC DEVICE

CROSS-REFERENCE TO RELATED APPLICATIONS

This application is a bypass continuation filed under 35 U.S.C. 365(c) of International Application No. PCT/KR2022/006705, filed on May 11, 2022, which is based on and claims the benefit of a Korean patent application number 10-2021-0100513, filed on Jul. 30, 2021 in the Korean Intellectual Property Office, the disclosure of which is incorporated by reference herein in its entirety.

BACKGROUND

1. Field

The disclosure relates to an electronic device and a method for providing a panel for control of an application in an electronic device.

2. Description of Related Art

Various services and additional functions provided through electronic devices, for example, portable electronic devices such as smartphones, are increasing. To meet the needs of various users and raise use efficiency of such electronic devices, communication service providers or electronic device manufacturers have provided various functions and competitively developed electronic devices that are differentiated from those of other companies. Accordingly, various functions provided through the electronic devices have been advanced.

In addition, in consideration of the portability of an electronic device, a display (or an electronic device including the display mounted therein) may be mounted in the electronic device in a foldable, a bendable, or a rollable shape.

When the state of an electronic device including a foldable or bendable-type display changes to a folding state while an execution screen of an application is being displayed in an unfolding state, a screen of the execution of the application may be distorted when the screen is displayed, or an optimal control button for control of the application according to the type of the executed application may not be properly provided.

SUMMARY

Provided are an electronic device and a method for providing a panel for control of an application in an electronic device.

In accordance with an aspect of the disclosure, an electronic device includes a first housing; a second housing; a hinge configured to foldably connect a side of the first housing to a side of the second housing; a display including a first display area disposed on the first housing, and a second display area and a third display area arranged on the second housing; and at least one processor configured to: based on a state of the electronic device being a first state in which the hinge is unfolded, control the display to display an execution screen of a first application in the first display area and the second display area, and to display, in the third display area, at least one default button for controlling the electronic device, based on the state of the electronic device changing from the first state to a second state in which the hinge is folded, control the display to display a panel button for displaying a panel, in the third display area, and based on a selection of the panel button in the second state, control the display to display the execution screen of the first application in the first display area, and to display, in the second display area, a first panel including at least one control button for controlling the first application and at least one system button for controlling a system of the electronic device.

In accordance with an aspect of the disclosure, a method for providing a panel for control of an application in an electronic device includes, based on a state of the electronic device being a first state in which a hinge is unfolded, wherein the hinge is configured to foldably connect a side of a first housing having a first display area disposed therein to a side of a second housing having a second display area and a third display area arranged therein is unfolded, displaying an execution screen of a first application in the first display area and the second display area and displaying at least one default button for controlling the electronic device in the third display area; based on the state of the electronic device changing from the first state to a second state in which the hinge is folded, displaying a panel button for displaying a panel, in the third display area; and based on a selection of the panel button in the second state, displaying the execution screen of the first application in the first display area and displaying, in the second display area, a first panel including at least one control button for controlling the first application and at least one system button for controlling a system of the electronic device.

In accordance with an aspect of the disclosure, an electronic device including: a first housing; a second housing; a hinge configured to foldably connect a side of the first housing to a side of the second housing; at least one sensor configured to detect a folding state of the electronic device and a posture of the electronic device; a display including a first display area disposed on the first housing, and a second display area disposed on the second housing; and a processor configured to: based on detecting that the folding state is a state in which the hinge is unfolded, control the display to display an execution screen of an application in the first display area and the second display area, and based on detecting that the folding state is changed from state in which the hinge is unfolded to a state in which the hinge is folded, and based on detecting that the posture of the electronic device is a posture in which the first display area is disposed higher than the second display area, based on sensor information received from the at least one sensor, control the display to display the execution screen of the application in the first display area, and display, in the second display area, a panel including at least one control button for controlling the application and at least one system button for controlling a system of the electronic device.

According to various embodiments, an optimal control button capable of controlling an application that is being executed in a folding state of an electronic device and a system button capable of controlling a system of the electronic device is provided, whereby an optimal user experience can be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram illustrating an electronic device in a network environment according to various embodiments;

FIGS. 11A to 11G illustrate operations of providing a panel based on a selection of a panel button in a second state of an electronic device according to various embodiments;

FIGS. 19A to 19J illustrate operations of providing a panel based on a selection of a panel button in a second state of an electronic device, in an electronic device according to various embodiments;

FIGS. 21A to 21I illustrate operations of providing a panel based on a selection of a panel button in a second state of an electronic device, in an electronic device according to various embodiments;

FIGS. 22A to 22D illustrate operations of providing a panel based on a selection of a panel button in a second state of an electronic device, in an electronic device according to various embodiments;

DETAILED DESCRIPTION

Figure 2A:
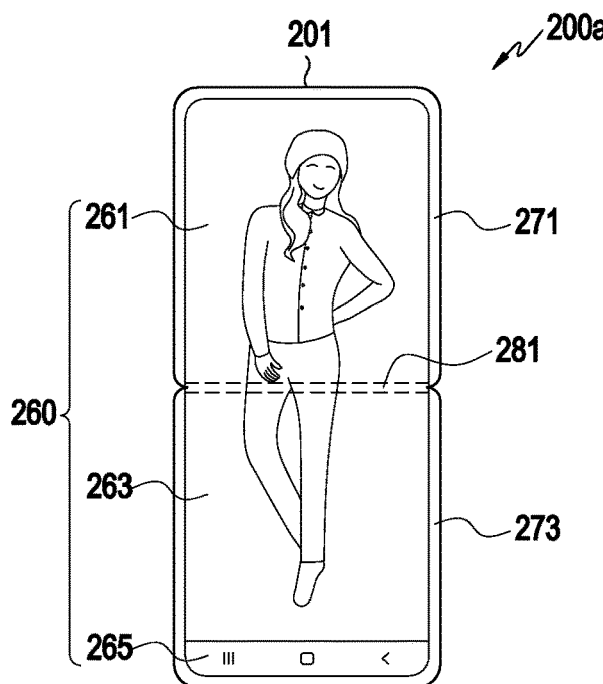
FIGS. 2A to 2C illustrate displays of an electronic device according to various embodiments.

FIG. 1 is a block diagram 100 illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figures 2B, 2C:
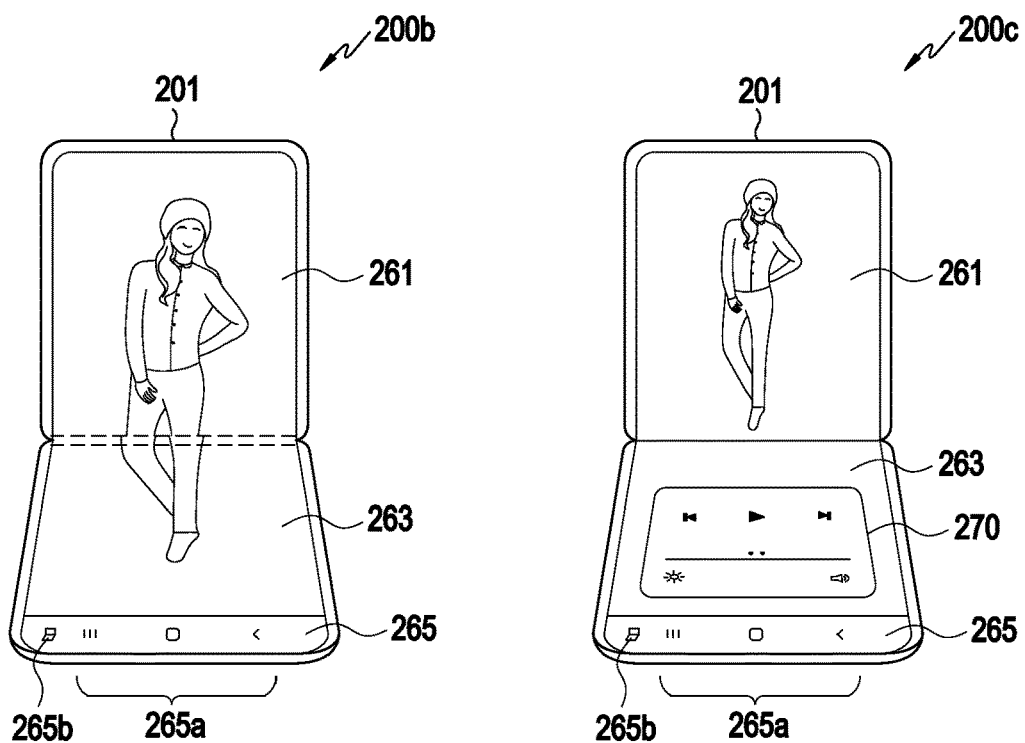

Drawings 200a to 200c in FIGS. 2A to 2C illustrate displays of an electronic device according to various embodiments.

A display 260 of an electronic device 201 illustrated in FIGS. 2A to 2C may include a flexible display in which areas of the display are divided according to folding of a hinge capable of connecting two housings on which the display is disposed. When the electronic device includes an in-foldable hinge capable of connecting two housings, the display in an unfolded state is folded inwardly according to folding of the in-foldable hinge, so that areas of the display can be divided in the flexible display. When the electronic device includes an out-foldable hinge capable of connecting two housings, the display in an unfolded state is folded outwardly according to an unfolding of the out-foldable hinge, so that areas of the display can be divided in the flexible display. The electronic device may include one hinge (e.g., an in-foldable hinge or an out-foldable hinge) or multiple hinges (e.g., an in-foldable hinge and an out-foldable hinge).

FIGS. 2A to 2C describe an example of an operation of the electronic device 201 including the in-foldable hinge, but the same description is also applicable to an electronic device including an out-foldable hinge. FIG. 2A illustrates a first state in which the electronic device 201 is unfolded according to various embodiments, wherein the electronic device 201 may include a display 260 including a first display area 261 disposed on a first housing 271, and a second display area 263 and a third display area 265 which are arranged on a second housing 273. In addition, according to an embodiment, the second display area 263 may correspond to a display area corresponding to the second housing 273, and the third display area 265 may correspond to an area included in the second display area 263. For example, a panel including at least one control button and at least one system button capable of controlling a system of the electronic device may be displayed in the second display area 263, wherein at least a part of the panel may be displayed in the third display area 265. In addition, according to an embodiment, the third display area 265 may not be displayed when there is no user input for a predetermined time, may allow a display area corresponding to the second housing 273 to be completely displayed as the second display area 263, and may be displayed within the second display area 263 according to a user input or the state of the electronic device. The electronic device 201 may include a hinge 281 capable of foldably connecting one side of the first housing 271 to one side of the second housing 273. The electronic device 201 may change the position of the first display area 261 by a predetermined angle according to folding of the hinge 281.

In an unfolded first state, as shown for example in FIG. 2A, the electronic device 201 may display an execution screen of a first application while using the first display area 261 and the second display area 263 as one screen, display at least one default button for control of the electronic device in the third display area 265, and display, for example, a navigation bar including a recent app button, a home button, and a back button, in the third display area 265. In embodiments, the back button may be, for example, a cancel button.

FIG. 2B illustrates a second state in which the electronic device 201 is folded according to various embodiments, wherein the electronic device 201 may display an execution screen of a first application while using the first display area 261 and the second display area 263 as one screen, and additionally display, in the third display area 265, a panel button for a display of a panel, together with at least one default button for control of the electronic device. In embodiments, the at least one default button may be at least one default button 265a, which may include, for example, a recent app button, a home button, and a back and/or cancel button. When unfolding of the electronic device 201 is detected in the second state as shown in FIG. 2B by using sensor information received from a sensor module of the electronic device 201, which may include for example at least one of an angle sensor, a tilt sensor, an acceleration sensor, a geomagnetic sensor, a gyro sensor, or a motion sensor, the state of the electronic device 201 may change to the first state as shown in FIG. 2A.

FIG. 2C illustrates a view in which the electronic device 201 is folded and a panel is displayed according to various embodiments, wherein when identifying a selection of a panel button 265b displayed in the third display area 265 in the second state, the electronic device 201 may distinguish the first display area 261 and the second display area 263 as respective screens, display the execution screen of the first application in the first display area 261, and display, in the second display area 263, a first panel 270 including at least one control button capable of controlling the first application and at least one system button capable of controlling a system of the electronic device, or display a second panel including at least one common button which can be used commonly in all applications and at least one system button capable of controlling a system of the electronic device. In embodiments, all applications may mean a plurality of applications installed in the electronic device. In embodiments, the detecting of the selection may include, identifying or determining the selection, for example by identifying that a selection has taken place, or determining that a user input for selecting has been made or received. When a selection of the panel button 265b displayed in the third display area 265 is identified while displaying a panel (e.g., a first panel (270)) in the second display area (263) as shown in FIG. 2C, the state of the electronic device 201 may change to the second state as shown in FIG. 2B. When unfolding of the electronic device 201 is detected while displaying a panel (e.g., a first panel 270) in the second display area 263 as shown in FIG. 2C, the state of the electronic device 201 may change to the first state as shown in FIG. 2A.

According to various embodiments, the state of the electronic device 201 may be switched from the first state as shown in FIG. 2A to the state in which the electronic device 201 is folded and a panel is displayed in the second display area 263 as shown in FIG. 2C, instead of going through the second state according to the state in which the electronic device 201 is folded or held, or the posture of the electronic device. In embodiments, the posture may relate to, for example, a position or manner in which the electronic device is held. For example, the electronic device 201 may detect the state in which the electronic device is folded by using at least one sensor, for example at least one of an angle sensor, a tilt sensor, an acceleration sensor, or the like, included in a sensor module of the electronic device. For example, the electronic device 201 may detect the posture of the electronic device by using at least one sensor, for example at least one of an angle sensor, a tilt sensor, an acceleration sensor, or the like, included in a sensor module of the electronic device.

According to an embodiment, when the electronic device detects a change from an unfolded state to a folded state upon the folding and the posture of the electronic device, the electronic device 201 may determine that the first display area 261 is positioned above the second display area 263 and the second display area 263 is positioned under the first display area 261, as shown in FIG. 2C. In this case, when the electronic device (201) identify selection of the panel button in the second state shown in FIG. 2A, the electronic device 201 may perform control to display screens corresponding to the selection of the panel button in the first display area 261 and the second display area 263. For example, the electronic device 201 may display a first application in the first display area 261 positioned above the second display area 263, the first display area 261 corresponding to a position providing an easy view to a user, and display a panel (e.g., a panel including at least one control button capable of controlling the first application and at least one system button capable of controlling a system of the electronic device) in the second display area 263 positioned under the first display area 261, the second display area 263 corresponding to a position allowing a user to easily perform control.

Figure 3:
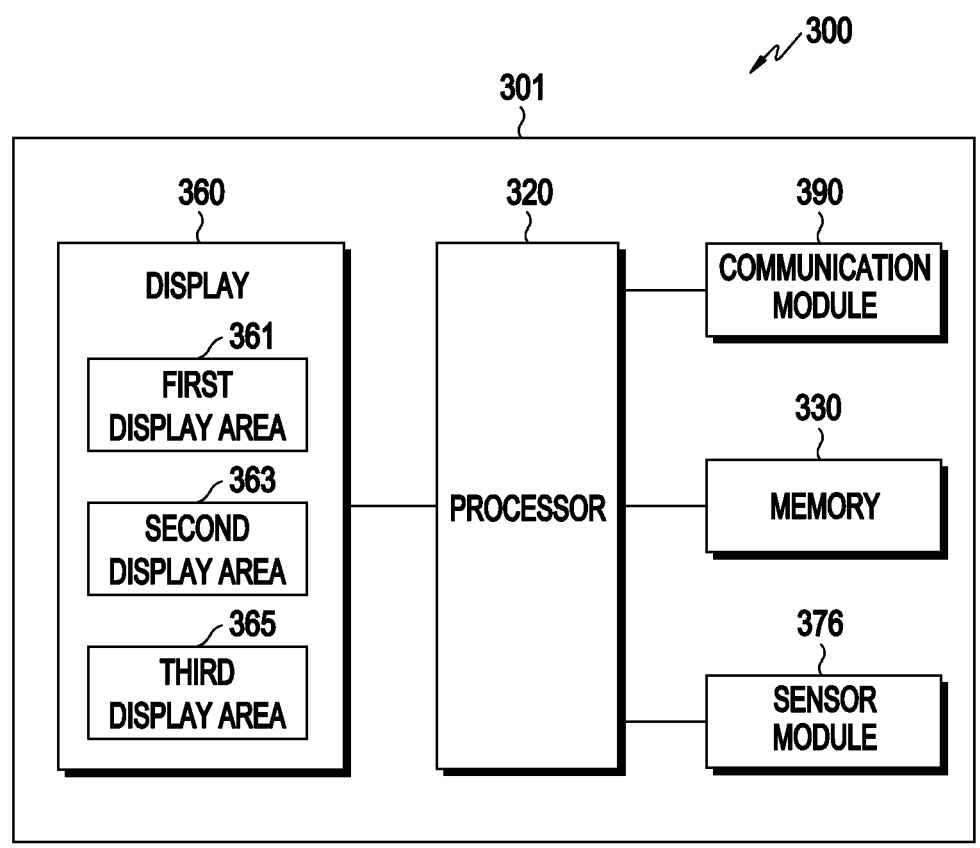
FIG. 3 is a block diagram illustrating an electronic device according to various embodiments.

FIG. 3 is a block diagram 300 illustrating an electronic device according to various embodiments.

Referring to FIG. 3, an electronic device 301, which may correspond to the electronic device 101 of FIG. 1 and/or the electronic device 201 of FIGS. 2A to 2C, may include a processor 320, a memory 330, a display 360, a sensor module 376, and a communication module 390.

According to various embodiments, the processor 320 may use a first display area 361 and a second display area 363 as one screen in a first state (e.g., the first state of the electronic device 201 of FIG. 2A) in which the electronic device 301 is unfolded, additionally display a panel button for a display of a panel in a third display area 365 when the state of the electronic device 301 changes to a second state (e.g., the second state of the electronic device 201 of FIG. 2B) in which the electronic device 301 is folded while an execution screen of a first application is displayed, and display the execution screen of the first application in the first display area 361 and a panel including multiple buttons for control of the electronic device and the first application in the second display area 363 when identifying a selection of the panel button in the second state.

According to an embodiment, the processor 320 may control the display 360 to display an execution screen of a first application by using the first display area 361 and the second display area 363 as one screen in a first state (e.g., the first state of the electronic device 201 of FIG. 2A) in which the electronic device 301 is unfolded, display at least one default button for control of the electronic device in the third display area 365, and display, for example, a navigation bar including a recent app button, a home button, and a back button, in the third display area 365.

According to an embodiment, when the electronic device 301 detects a change from the first state to a second state (e.g., the second state of the electronic device 201 of FIG. 2B) in which the electronic device 301 is folded, by using sensor information received from the sensor module 376 (e.g., at least one of an angle sensor, a tilt sensor, an acceleration sensor, a geomagnetic sensor, a gyro sensor, or a motion sensor), the processor 320 may control the display 360 to display an execution screen of a first application by using the first display area 361 and the second display area 363 as one screen and additionally display a panel button (e.g., the panel button 265b of FIG. 2B) for a display of a panel in the third display area 365.

According to an embodiment, when generating the panel button as a floating button and displaying the same in the third display area 365, the processor 320 may move at least one default button (e.g., the at least one default button 265a of FIG. 2B) for control of the electronic device to the left side, the at least one default button being displayed in the third display area 365, and generate the panel button and display the same on the right side, wherein spaces between at least one default button (e.g., a recent app button, a home button, and a back button) and the panel button are uniformly adjusted.

According to an embodiment, the processor 320 identifies a selection of the panel button in the third display area 365 in the second state (e.g., the second state of FIG. 2B) of the electronic device, control the display 360 to display an execution screen of the first application in the first display area 361, and display, in the second display area 363, a first panel including at least one control button capable of controlling the first application and at least one system button capable of controlling a system of the electronic device.

According to an embodiment, when displaying a floating-type first panel in the second display area 363, the processor 320 may divide the first panel into a first area and a second area, control the display 360 to display, in the first area, at least one control button capable of controlling the first application, and control the display 360 to display, in the second area, at least one system button capable of controlling a system of the electronic device.

According to an embodiment, the processor 320 may control the display 360 to display the first panel by disposing the first area, in which at least one control button capable of controlling the first application is displayed, above the first panel, and disposing the second area, in which at least one system button capable of controlling a system of the electronic device is displayed, under the first panel.

According to an embodiment, the processor 320 may control the display 360 to display the first panel by disposing the second area, in which at least one system button capable of controlling a system of the electronic device is displayed, above the first panel, and disposing the first area, in which at least one control button capable of controlling the first application is displayed, under the first panel.

According to an embodiment, the processor 320 may divide the second area, in which at least one system button capable of controlling a system of the electronic device is displayed, into a first sub-area and a second sub-area, control the display 360 to display the first panel by disposing the first sub-area, in which at least one system button capable of controlling a system of the electronic device is displayed, at the upper side of the first panel, disposing the first area, in which at least one control button capable of controlling the first application is displayed, under the first sub-area, and disposing the second sub-area, in which at least one system button capable of controlling a system of the electronic device is displayed, under the first area.

According to an embodiment, when identifying the selection of the panel button in the second state (e.g., the second state of the electronic device 201 of FIG. 2B), the processor 320 may identify the type of a first application that is being executed, and when identifying the first application as the type of an application for a display of a first panel, may determine at least one control button capable of controlling the first application and control the display 360 to display the at least one determined control button in a first area of the first panel. The processor 320 may identify, based on the type of the application, whether the application corresponds to an application for a display of a first panel including at least one control button capable of controlling the application, or an application for a display of a second panel including at least one common button which can be commonly used in all or a plurality of applications. The type of the application for the display of the first panel and the type of the application for the display of the second panel may be stored in the memory 330.

For example, the processor 320 may identify the type of the first application as a video application, and when the video application is identified as the type of an application for a display of a first panel, may control the display 360 to display a first panel (e.g., a video panel) including a previous video playback button, a playback/stop button, and a next video playback button, which can control the video application, in the first area.

According to an embodiment, when the processor 320 has detected a selection of a button for a display of a next panel included in the first panel while displaying the first panel, the processor 320 may control the display 360 to display a second panel including at least one common button which can be commonly used in all or a plurality of applications and at least one system button capable of controlling a system of the electronic device in the second display area 363, instead of displaying the first panel. For example, the at least one common button which can be commonly used in all or a plurality of applications may include an application list view button, a screen-up button, a notification button, a screen shot button, and a cursor button.

According to an embodiment, when identifying the selection of the panel button in the second state (e.g., the second state of the electronic device 201 of FIG. 2B), the processor 320 may identify the type of the first application that is being executed, and when identifying the first application as the type of an application for a display of a second panel, may control the display 360 to display the second panel including at least one common button which can be commonly used in all or a plurality of applications and at least one system button capable of controlling a system of the electronic device, in the second display area.

According to an embodiment, the processor 320 may divide the second panel into a first area and a second area in the same manner as that for the first panel, control the display 360 to display at least one common button which can be commonly used in all or a plurality of applications, in the first area, and display at least one system button capable of controlling a system of the electronic device, in the second area.

According to an embodiment, the processor 320 may divide the first panel into a first area, a second area, and a third area, according to a display configuration of the first panel, control the display 360 to display at least one control button capable of the first application in the first area, display at least one common button which can be commonly used in all or a plurality of applications, in the second area, and display at least one system button capable of controlling a system of the electronic device, in the third area.

According to an embodiment, when displaying the first panel in the second display area 363, the processor 320 may control the display 360 to display at least one configured or selected system button (e.g., a display brightness adjustment button and a volume adjustment button) capable of controlling a system of the electronic device, in the second area of the first panel.

According to an embodiment, the processor 320 may determine at least one operation button capable of controlling an operation related to the first application, based on state information of the first application or the type of an external electronic device connected to the electronic device, and control the display 360 to display the at least one operation button in the second area of the first panel, together with the at least one system button. For example, when the first application that is being displayed in the first display area is a video application and is currently playing a video, the processor 320 may control the display 360 to additionally display an eye comfort button as at least one operation button, in the second area of the first panel, together with the at least one system button. For example, when an earbud is connected to the electronic device 301 via Bluetooth communication while an execution screen of the first application that is being displayed in the first display area is displayed by controlling the display 360, the processor 320 may control the display 360 to additionally display a Bluetooth function button capable of controlling Bluetooth communication as at least one operation button in the second area of the first panel, together with the at least one system button.

According to various embodiments, while the electronic device 301 displays an execution screen of the first application in the first display area 361 and displays the first panel or the second panel in the second display area 363 based on a selection of a panel button in the second state, the processor 320 may adjust the size and the position of a display of the first panel according to rotation of the electronic device, and control the display 360 to display the same.

According to an embodiment, when detecting the rotation of the electronic device by using sensor information received from the sensor module 376 (e.g., at least one of an angle sensor, a tilt sensor, an acceleration sensor, a geomagnetic sensor, a gyro sensor, or a motion sensor) while controlling the display 360 to display the first panel or the second panel in the second display area 363, the electronic device 301 may adjust the position and the size of the display of the first panel or the second panel may be adjusted based on rotation information (e.g., a rotation value), the position of the third display area, and size information of the second display area, which changes according to the rotation of the electronic device, and display the first panel or the second panel.

For example, when detecting −90 degree rotation of the electronic device while controlling the display 360 to display the first panel in the second display area 363 based on the selection of the panel button in the second state in which the electronic device 301 is folded in a portrait mode, the processor 320 may adjust the position and the size of the display of the first panel, based on rotation information (e.g., −90 degree rotation), the third display area position (e.g., the last area on the right side), and the size of the second display area, which changes according to the rotation of the electronic device, and display the first panel. In embodiments, a −90 degree rotation may correspond to, for example, a rotation from a portrait orientation to a landscape orientation.

According to an embodiment, when detecting rotation of the electronic device while controlling the display 360 to display the first panel or the second panel in the second display area 363, the processor 320 may adjust the position and the size of the first panel or the second panel, based on at least one of rotation information of the electronic device, a holding state of the electronic device according to the result of the rotation of the electronic device, or panel display configuration information for a right-handed user or a left-handed user, and display the first panel or the second panel.

According to various embodiments, while the processor 320 controls the display 360 to display an execution screen of a first application in the first display area 361 and display a first panel or a second panel in the second display area 363 based on a selection of a panel button in a second state (e.g., the second state of the electronic device 201 of FIG. 2B), the processor 320 may move the position of the first panel or the second panel or perform a function of hiding the first panel or the second panel, based on the type of a gesture detected in the second display area.

According to an embodiment, when detecting a first gesture operation, for example, an operation of dragging after a long touch on the first panel or the second panel, from the first panel or the second panel displayed in a floating type, in the second display area 363, the processor 320 may move the first panel or the second panel in a direction corresponding to the drag operation and control the display 360 to display the same. When the first panel or the second panel deviates from a threshold area (e.g., the second display area) while the first panel or the second panel is moved in the direction corresponding to the drag operation according to the first gesture operation, the processor 320 may control the display 360 to display a visual alert.

According to an embodiment, detecting a second gesture operation, for example, a flick operation in a left bezel direction or a right bezel direction of the second display area 363 after a touch on the first panel or the second panel, from the first panel or the second panel displayed in a floating type, in the second display area 363, the processor 320 may perform a function of hiding the first panel or the second panel. When detecting the third gesture operation, for example, a flick operation in the center of the second display area 363 after a touch on a left bezel or a right bezel of the second display area 363, while hiding the first panel or the second panel, the processor 320 may control the display 360 to display the hidden first panel or the second panel again in the second display area 363.

According to an embodiment, when the state of the electronic device 301 is changed to the second state (e.g., the second state of the electronic device 201 of FIG. 2B) upon a selection of a panel button displayed in the third display area 365 while displaying the first panel or the second panel in the second display area 363, the processor 320 may store last position information of the first panel or the second panel displayed in the second display area 363. When the electronic device 301 identifys a selection of a panel button displayed in the third display area 365 in the second state, the processor 320 may control the display 360 to display the first panel or the second panel in the second display area 363, based on the last position information of the first panel or the second panel, that is previously stored.

According to various embodiments, when identifying a selection of a second application while displaying an execution screen of the first application in the first display area 361 and displaying an execution screen of the second application in the second display area 363 based on a selection of a panel button in the second state of the electronic device by controlling the display 360, the processor 320 may control the display 360 to display the execution screen of the second application in the first display area 361 and display a panel (e.g., a first panel or a second panel) including multiple buttons for control of the electronic device and the second application in the second display area 363.

According to an embodiment, based on detecting a selection of an application list provision button among at least one common button which can be commonly used in all or a plurality of applications included in the second panel while displaying the execution screen of the first application in the first display area 361 and displaying the second panel in the second display area 363, the processor 320 may display types of multiple applications in the second display area 363. While controlling the display 360 to display the execution screen of the first application in the first display area 361, the processor 320 may display the second application selected from among the multiple applications, in the second display area 363. Based on detecting a selection of the second application that is being displayed in the second display area 363 while controlling the display 360 to display the execution screen of the first application in the first display area 361 and displaying the execution screen of the second application in the second display area 363, the processor 320 may control the display 360 to display the execution screen of the second application in the first display area 361 and display a panel (e.g., the first panel or the second panel) including multiple buttons for control of the electronic device and the second application in the second display area 363.

According to various embodiments, the processor 320 may control the display 360 to display the execution screen of the first application in the first display area 361 and provide a touch pad panel or a cursor function panel capable of controlling the first application in the second display area 363 based on a selection of a panel button in the second state of the electronic device.

According to an embodiment, based on detecting a selection of the touch pad button for touch pad provision, among at least one common button which can be commonly used in all or a plurality of applications included in the second panel while controlling the display 360 to display the execution screen of the first application in the first display area 361 and displaying the second panel in the second display area 363, the processor 320 may provide a touch pad panel capable of controlling the first application, in the second display area. The processor 320 may perform various functions capable of controlling a screen of the first application by using a control icon displayed in the first display area 361, based on types of various gestures (e.g., a short touch, a long touch, a double touch, a multi-touch, a pinch zoom in/out, and a drag after a multi-touch) detected from the touch pad panel provided in the second display area 363, and may perform, for example, a function of enlarging/reducing a screen of the first application and a function of moving the screen of the first application.

According to an embodiment, based on detecting a selection of a cursor button for cursor function provision from among at least one common button which can be commonly used in all or a plurality of applications included in the second panel while controlling the display 360 to display the execution screen of the first application in the first display area 361 and displaying the second panel in the second display area 363, the processor 320 may control the display 360 to display a cursor icon in the first display area 361 and provide a cursor function panel capable of controlling the first application in the second display area 363. The processor 320 may perform various functions capable of controlling the first application displayed in the first display area 361 while moving and controlling the cursor icon displayed in the first display area 361, based on the types of various gestures (e.g., a short touch, a long touch, and a double touch) detected from the cursor function panel provided in the second display area 363. The processor 320 may move a screen of the first application displayed in the first display area 361 by using a page up/down button provided in the cursor function panel.

According to various embodiments, the memory 330 may be implemented to be substantially identical or similar to the memory 130 of FIG. 1.

According to various embodiments, the display 360, which may correspond to the display 260 of FIGS. 2A to 2C, may include a first display area 361, which may correspond to the first display area 261 of FIGS. 2A to 2C, a second display area 363, which may correspond to the second display area 263 of FIGS. 2A to 2C, and a third display area 365, which may correspond to the third display area 265 of FIGS. 2A to 2C. The position of the first display area 361 may change according to folding of a hinge (e.g., the hinge 281 of FIG. 2A) by a predetermined angle.

According to an embodiment, the display 360 may be identical to the display module 160 of FIG. 1, or may perform at least one function or operation performed by the display module 160.

According to various embodiments, the sensor module 376 may be implemented to be substantially identical or similar to the sensor module 176 of FIG. 1.

According to an embodiment, the sensor module 376 may include various sensors capable detecting an unfolding state (e.g., a first state) of the electronic device, a folding state (e.g., a second state) of the electronic device, a posture state (or a holding state) of the electronic device, and a rotation state of the electronic device.

According to an embodiment, the sensor module 376 may include an angle sensor, a tilt sensor, an acceleration sensor, a geomagnetic sensor, a gyro sensor, a motion sensor, a gravity sensor, a proximity sensor, and the like. For example, the sensor module 376 may detect an unfolding state (e.g., a first state) of the electronic device, a folding state (e.g., a second state) of the electronic device, a posture state (or a holding state) of the electronic device, and a rotation state of the electronic device by using sensor information received from at least one of an angle sensor, a tilt sensor, an acceleration sensor, a geomagnetic sensor, a gyro sensor, or a motion sensor.

According to various embodiments, the communication module 390 may be implemented to be substantially identical or similar to the communication module 190 of FIG. 1, and may include multiple communication circuits using different communication technologies from each other.

According to an embodiment, the communication module 390 may include at least one of a wireless LAN module and a short-distance communication module, and the short-distance communication module may include a ultra-wide band (UWB) communication module, a Wi-Fi communication module, an NFC communication module, a Bluetooth legacy communication module, and/or a BLE communication module.

Figure 4:
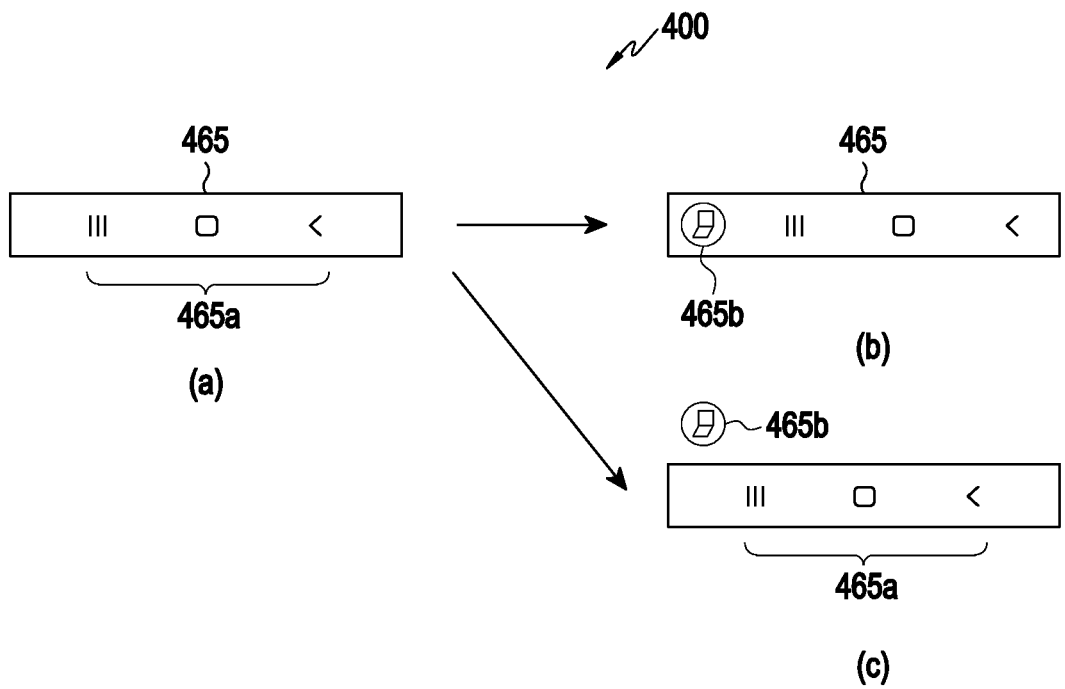
FIG. 4 illustrates an operation of displaying a panel button in a third display area in an electronic device according to various embodiments.

Drawing 400 in FIG. 4 illustrates an operation of displaying a panel button in a third display area in an electronic device according to various embodiments.

Referring to FIG. 4, an electronic device (e.g., the electronic device of FIG. 1, the electronic device 201 of FIGS. 2A to 2C, or the electronic device 310 of FIG. 3) may display at least one default button 465a (e.g., at least one default button 265a of FIG. 2A) for control of the electronic device in a third display area 465 (e.g., the third display area 265 of FIGS. 2A to 2C) as shown in part (a) in FIG. 4, in a first state (e.g., the first state of the electronic device 201 of FIG. 2A) in which the electronic device is unfolded.

When detecting a change from a first state of the electronic device to a second state (e.g., the second state of the electronic device in FIG. 2B) in which the electronic device is folded, by using sensor information received from a sensor module (e.g., the sensor module 376 of FIG. 3) of the electronic device, the electronic device may generate a panel button as a floating button, and as shown in FIG. 4B, may move at least one default button 465a (e.g., the at least one default button 265a of FIG. 2B) for control of the electronic device to the right side, the at least one default button 465a being displayed in the third display area 465, and display the panel button 465b (e.g., the panel button 265b of FIG. 2B) on the left side, wherein spaces between the panel button 465b and the at least one default button 465a are uniformly adjusted.

According to an embodiment, the positions or display methods of the panel button and the at least one default button may be variously changed in the third display area 465, and may be designated as the positions or display methods pre-configured as an initial configuration of the electronic device. In addition, the positions or the display methods of the at least default button and the panel button may be changed by a user of the electronic device in the third display area 465.

When detecting a change in the first state of the electronic device to a second state (e.g., the second state of the electronic device 201 of FIG. 2B) in which the electronic device is folded, by using sensor information received from a sensor module (e.g., the sensor module 376 of FIG. 3) of the electronic device, the electronic device may generate the panel button as a floating button, and as shown in part (c) of FIG. 4, may display the panel button 465b in a range, for example, at a predetermined position in the second display area, wherein the range does not interfere with at least one default button 465a (e.g., the at least one default button 265a of FIG. 2B) for control of the electronic device, the at least one default button 465a being displayed in the third display area 465.

According to an embodiment, in consideration of an area allowing a user to easily perform control, the panel button may be displayed in one of the third display area 465, the second display area (e.g., the second display area 363 of FIG. 3), and the first display area (e.g., the first display area 361 of FIG. 3), based on the posture and a folding state of the electronic device.

According to an embodiment, the electronic device may omit a panel button for a display of a panel, and according to the posture or a folding state of the electronic device, may control a panel to be automatically displayed in one of display of the second display area (e.g., the second display area 363 of FIG. 3) and the first display area (e.g., the first display area 361 of FIG. 3), without a user input for displaying the panel.

According to an embodiment, the electronic device may provide a configuration option allowing a user to select a mode in which a user input is received through the panel button so that the panel is displayed, and a mode allowing the panel is automatically displayed.

Figure 5A:
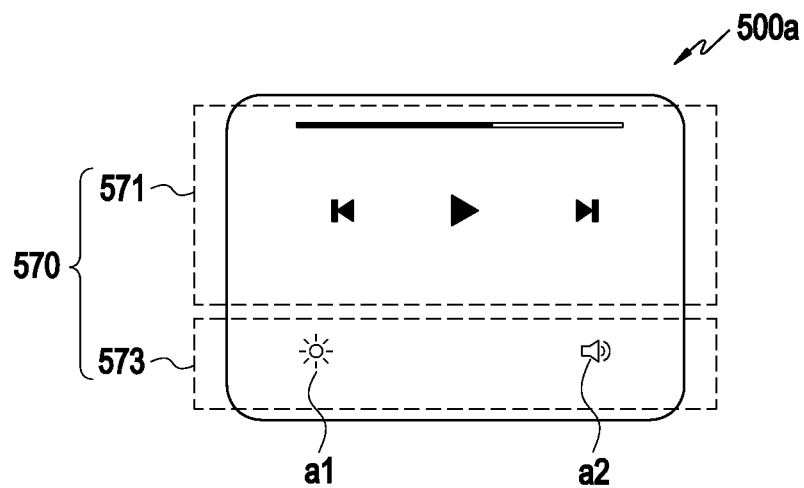
FIGS. 5A to 5C illustrate configuration of a panel displayed in a second display area in an electronic device according to various embodiments.
Figure 5B:
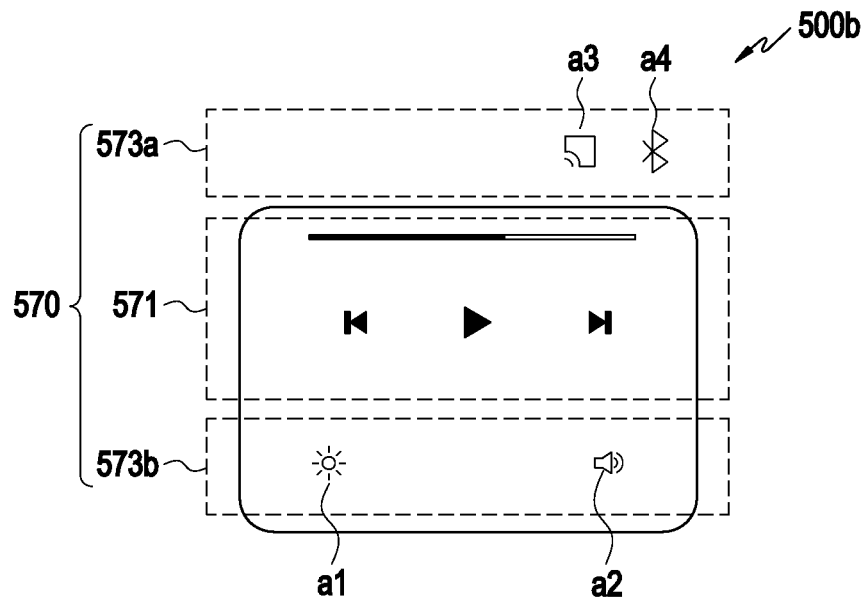
Figure 5C:
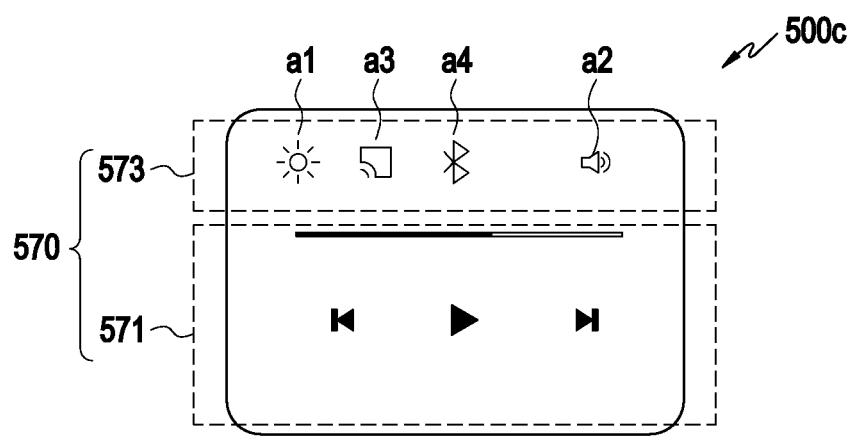

Drawings 500a to 500c in FIGS. 5A to 5C illustrate configuration of a panel displayed in a second display area in an electronic device according to various embodiments.

Referring to FIG. 5A, an electronic device (e.g., the electronic device of FIG. 1, the electronic device 201 of FIGS. 2A to 2C, or the electronic device 310 of FIG. 3) may display a first panel or a second panel in a second display area (e.g., the second display area 263 of FIG. 2C) based on a selection of a panel button displayed in a third display area in a second state (e.g., the second state of the electronic device of FIG. 2B) in which the electronic device is folded.

As shown in FIG. 5A, when displaying a first panel 570 in the second display area, the electronic device may display the first panel by dividing the first panel 570 into a first area 571 and a second area 573, disposing, at the upper side of the first panel 570, the first area 571 including at least one control button (e.g., a previous video playback button, a playback/stop button, and a next video playback button) capable of controlling a first application (e.g., a video application) that is being displayed in a first display area, and disposing, at the lower side of the first panel 570, the second area 573 including at least one system button (e.g., a display brightness adjustment button a1 and a volume adjustment button a2) capable of controlling a system of the electronic device.

As described in FIG. 5B, when displaying a first panel 570 in the second display area, the electronic device may divide the first panel 570 into a first area 571 and a second area, and divide the second area into a first sub-area 573a and a second sub-area 573b. The electronic device may dispose, at the upper side of the first panel 570, the first sub-area 573a including at least one operation button (e.g., a mirroring function button a3 and a Bluetooth function button a4)

capable of controlling an operation related to a first application (e.g., a video application) that is being displayed in a first display area. The electronic device may dispose, under the first sub-area 573a, a first area 571 including at least one control button (e.g., a previous video playback button, a playback/stop button, and a next video playback button) capable of controlling the first application (e.g., a video application). The electronic device may dispose and display, at the lower side of the first area 571, a second sub-area 573b including at least one system button (e.g., a brightness adjustment button a1 and a volume adjustment button a2) capable of controlling a system of the electronic device.

As shown in FIG. 5C, when displaying a first panel 570 in the second display area, the electronic device may display the first panel by dividing the first panel into a first area 571 and a second area 573, disposing, at the upper side of the first panel 570, the second area 573 including at least one system button (e.g., a brightness adjustment button a1 and a volume adjustment volume a2) capable of controlling a system of the electronic device and at least one operation button (e.g., a mirroring function button a3 and a Bluetooth function button a4) capable of controlling an operation related to the first application (e.g., a video application), and disposing, at the lower side of the first panel 570, the first area 571 including at least one control button (e.g., a previous video playback button, a playback/stop button, and a next video playback button) capable of controlling a first application (e.g., a video application) that is being displayed in a first display area.

Figure 6A:
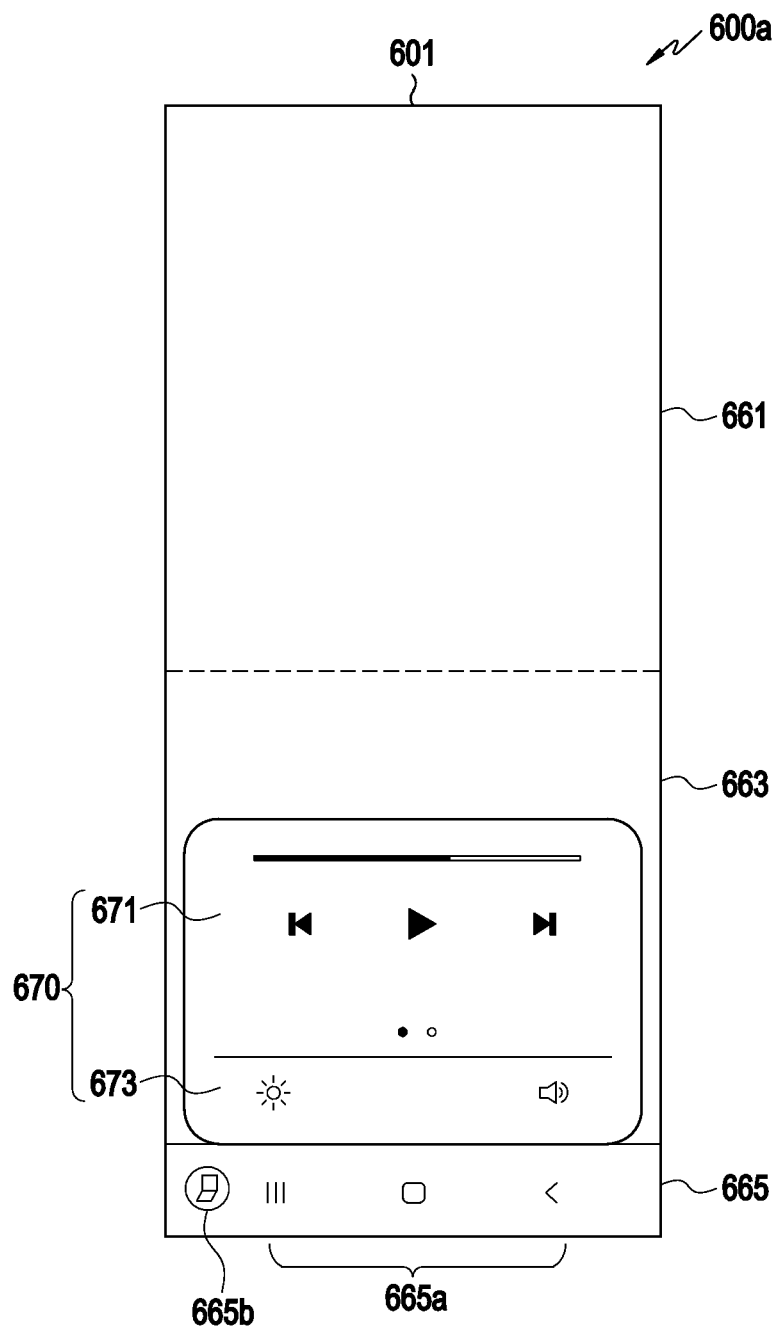
FIGS. 6A to 6B illustrate types of panels displayed in a second display area in an electronic device according to various embodiments.
Figure 6B:
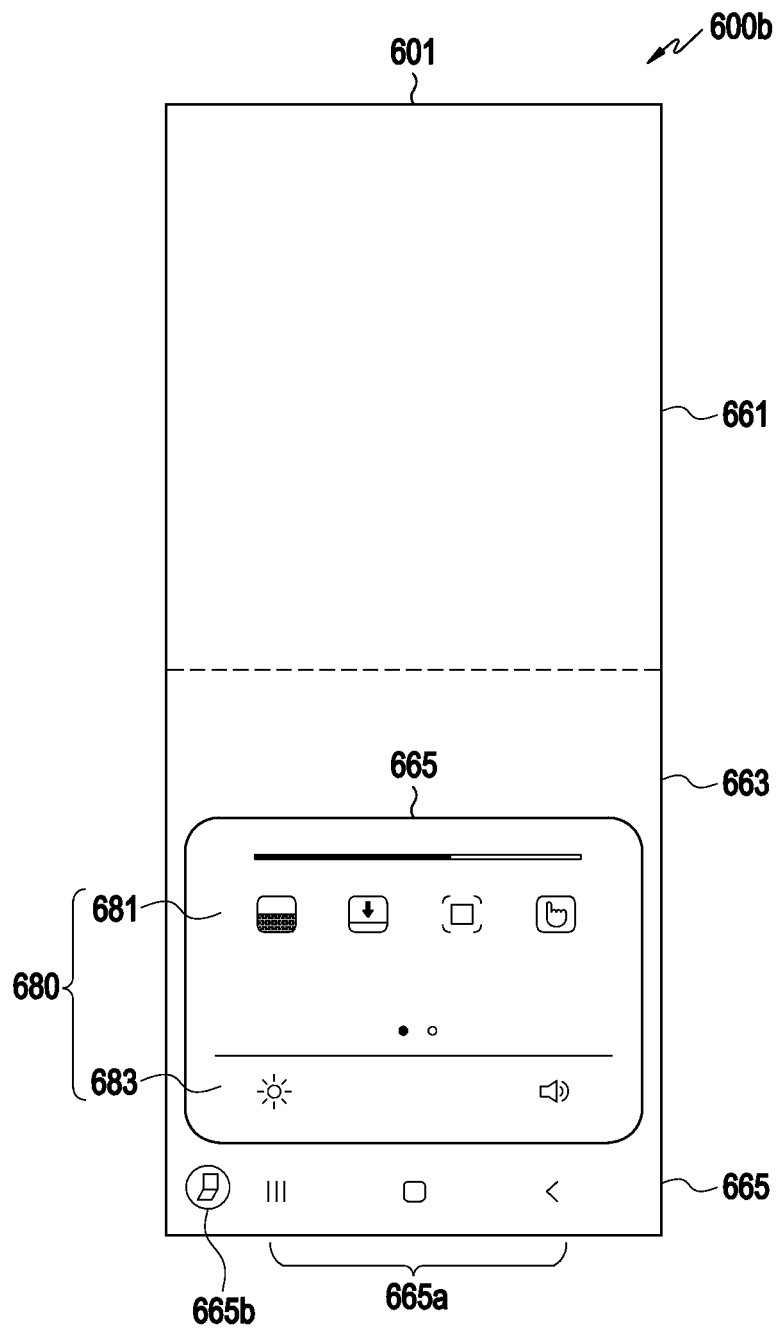

Drawings 600a to 600b in FIGS. 6A to 6B illustrate types of panels displayed in a second display area in an electronic device according to various embodiments.

Referring to FIG. 6A, an electronic device 601 (e.g., the electronic device 101 of FIG. 1, the electronic device 201 of FIGS. 2A to 2C, or the electronic device 301 of FIG. 3) may display, based on a selection of a panel button in a second state (e.g., the second state of the electronic device 201 of FIG. 2B) in which the electronic device is folded and division into a first display area 661 and a second display area 663 is made, an execution screen of a first application in a first display area 661. The electronic device 601 may identify the type (e.g., a video application) of the first application that is being executed in the first display area 661, determine at least one control button (e.g., a previous video playback button, a playback/stop button, and a next video playback button) capable of controlling the first application when identifying the first application as a type of an application for a display of a first panel, and display the at least one determined control button in a first area 671 of the first panel 670. The electronic device 601 may display, in a second area 673 of the first panel 670, at least one configured or selected system button (e.g., a display brightness adjustment button and a volume adjustment button) capable of controlling a system of the electronic device. In addition, according to an embodiment, the at least one system button may be configured as a function button related to the type of the first application (or a function button related to the first application), from among function buttons capable of controlling a system of the electronic device. For example, the electronic device may identify the type of an application that is being executed, and control at least one system button corresponding to the identified type of the application to be displayed in the first panel 670. In addition, at least one system button included in the first panel 670 may be automatically configured and displayed as a function button related to the type of the first application, or may be displayed as a function button identified/selected by a user.

The electronic device 601 may display at least one default button 665a for control of the electronic device and a panel button 665b in a third display area 665.

Referring to FIG. 6B, an electronic device 601 (e.g., the electronic device 101 of FIG. 1, the electronic device 201 of FIGS. 2A to 2C, or the electronic device 301 of FIG. 3) may display, based on a selection of a panel button in a second state (e.g., the second state of the electronic device 201 of FIG. 2B) in which the electronic device is folded and division into a first display area 661 and a second display area 663 is made, an execution screen of a first application in a first display area 661. The electronic device 601 may identify the type of the first application that is being executed in the first display area 661, display, in a first area 681 of the second panel 680, at least one common button (e.g., a screen up button, a notification button, a screen shot button, and a cursor button) which can be commonly used in all or a plurality of applications when identifying the first application as the type of an application for a display of the second panel, and display, in a second area 683 of the second panel 680, at least one configured or selected system button (e.g., a display brightness adjustment button and a volume adjustment button) capable of controlling a system of the electronic device. The electronic device 601 may display at least one default button 665a for control of the electronic device and a panel button 665b in a third display area 665.

Drawings 700a to 700e in FIGS. 7A to 7F illustrate operations of providing a panel based on a selection of a panel button in a second state of an electronic device according to various embodiments.

Figure 7A:
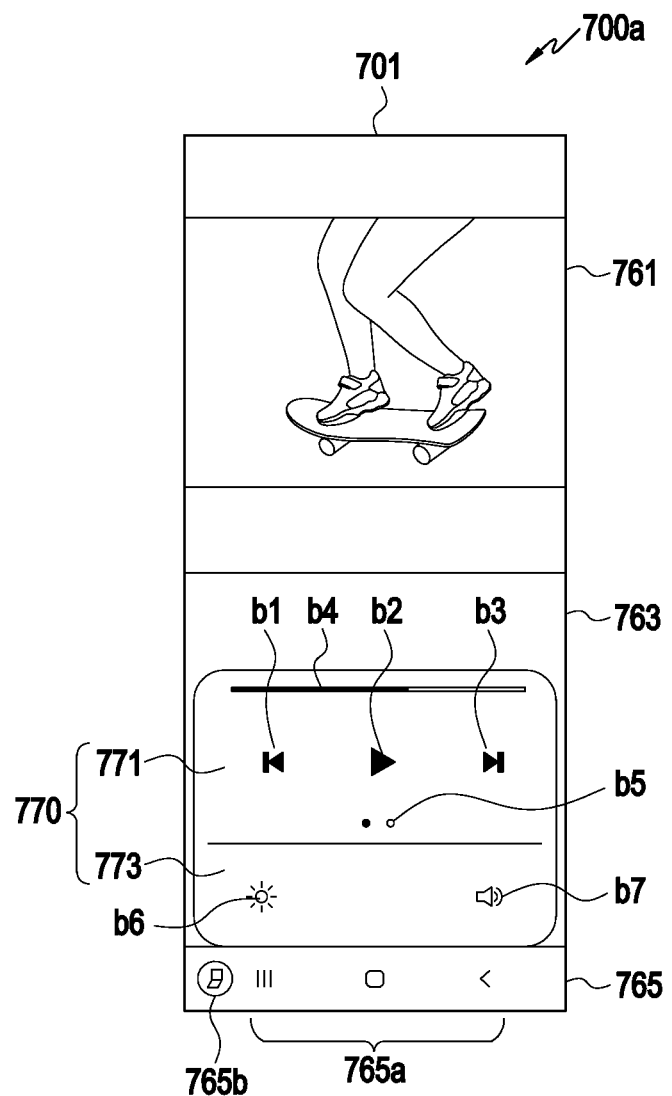
FIGS. 7A to 7F illustrate operations of providing a panel based on a selection of a panel button in a second state of an electronic device according to various embodiments.

Referring to FIG. 7A, an electronic device 701 (e.g., the electronic device 101 of FIG. 1, the electronic device 201 of FIGS. 2A to 2C, or the electronic device 301 of FIG. 3) may playback and display a first video upon execution of a video application in a first display area 761, and display, in a second display area 763, a first a panel 770 (e.g., a video panel) including at least one control button capable of controlling the video application and at least one system button capable of controlling the system of the electronic device, based on a selection of a panel button in a second state (e.g., the second state of the electronic device 201 of FIG. 2B) in which the electronic device is folded and division into the first display area 761 and the second display area 763 is made.

The electronic device 701 may display, in a first area 771 of the first panel 770, a previous video playback button b1, a playback/stop button b2, a next video playback button b3, a navigation bar b4, and a next panel display button b5, as the least one control button capable of controlling the video application. The electronic device 701 may display, in a second area 773 of the first panel 770, a brightness adjustment button b6 and a volume adjustment button b7, as the at least one system button capable of controlling a system of the electronic device. The electronic device 701 may display at least one default button 765a for control of the electronic device and a panel button 765b in a third display area 765.

Figure 7B:
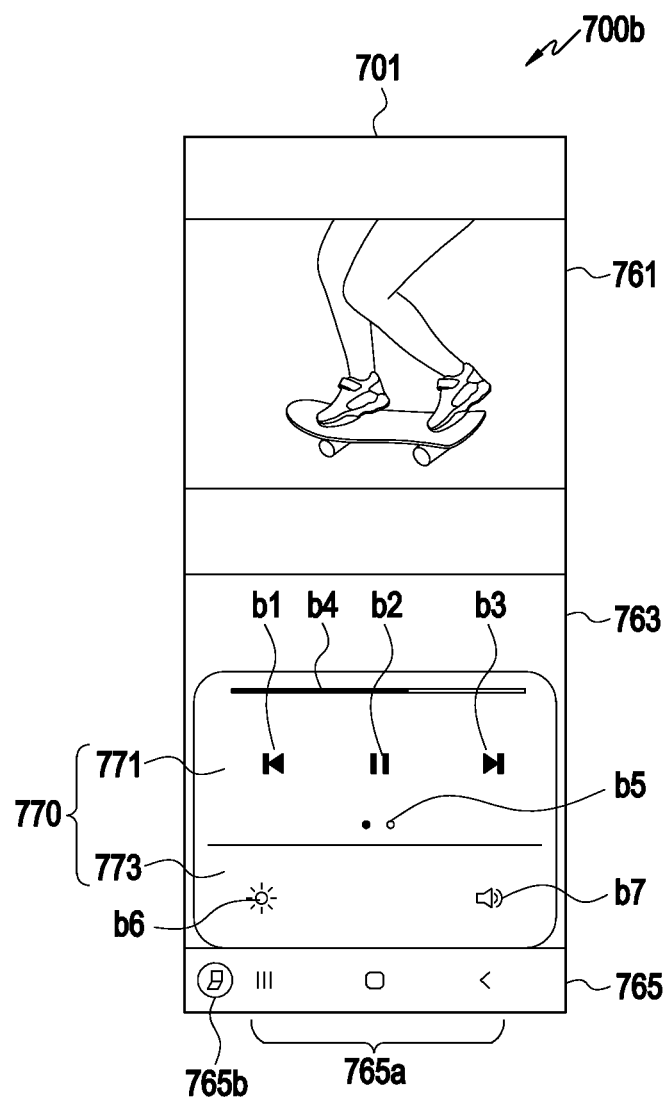

Referring to FIG. 7A, based on detecting a selection of the navigation bar b4 displayed in the first area 771 of the first panel 770 displayed in the second display area 763, the electronic device 701 may playback a first video from a frame corresponding to a moving position of the selected navigation bar b4, in the first display area 761 as shown in FIG. 7B.

Figure 7C:
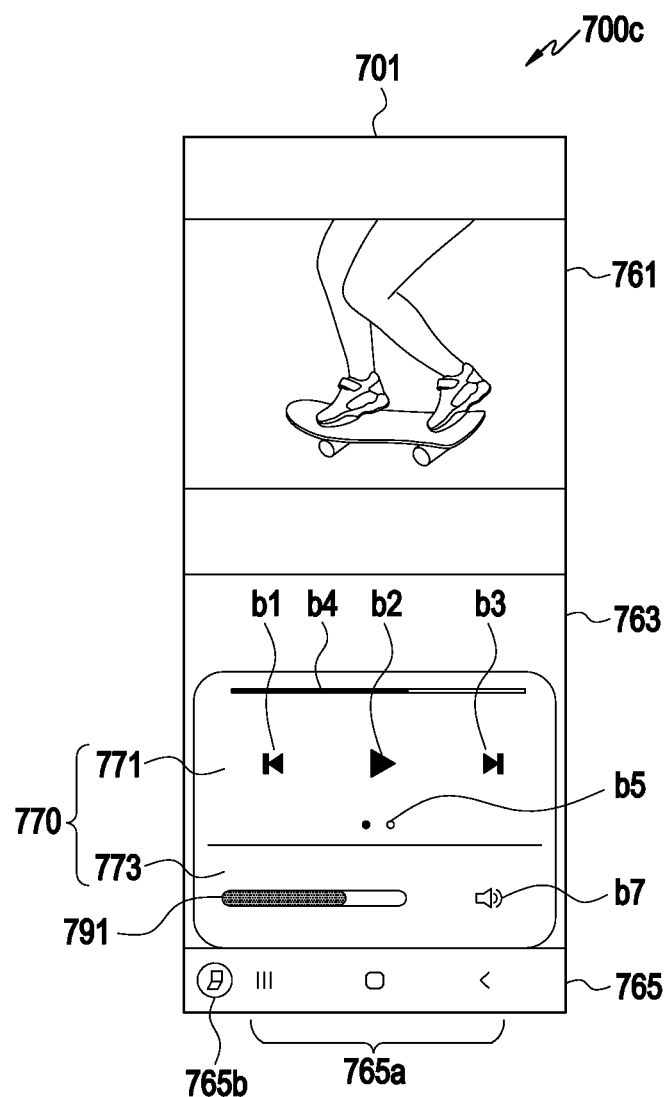

In FIG. 7A, based on detecting a selection of the volume adjustment button displayed in the second area 773 of the first panel 770 displayed in the second display area 763, the electronic device 701 may display, in the second area 773 of the first panel 770, the volume adjustment button b7 and a volume adjustment bar 791 as a detailed control button for volume adjustment, as shown in FIG. 7C. When an area other than the volume adjustment bar 791 is touched, an area other than the second area 773 of the first panel 770 is touched, or a predetermined time passes without detection of an operation of touching the volume adjustment bar 791 while the volume adjustment bar 791 is being displayed, the electronic device 701 may display the brightness adjustment button b6 and the volume adjustment button b7 in the second area 773 of the first panel 770, as shown in FIG. 7A. When a detailed control button is needed among multiple buttons provided in the first panel or the second panel and a selection of button such as the volume adjustment button b7 is detected, the electronic device 701 may display, in an area where the button is being displayed, the detailed control button together with the button.

Figure 7D:
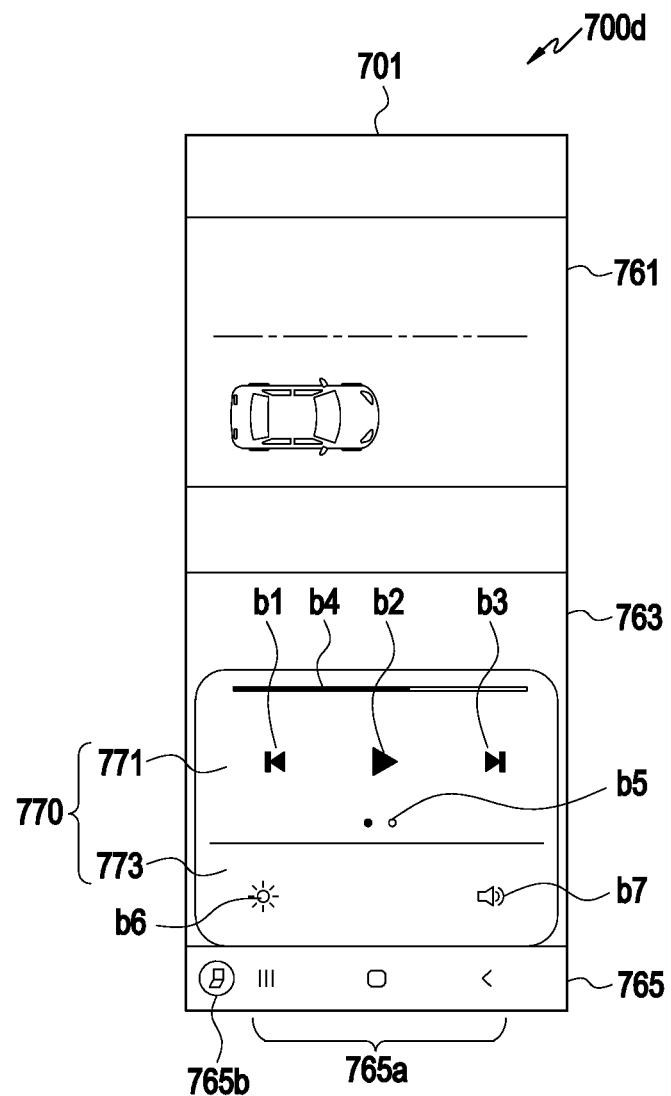
Figures 7E, 7F:
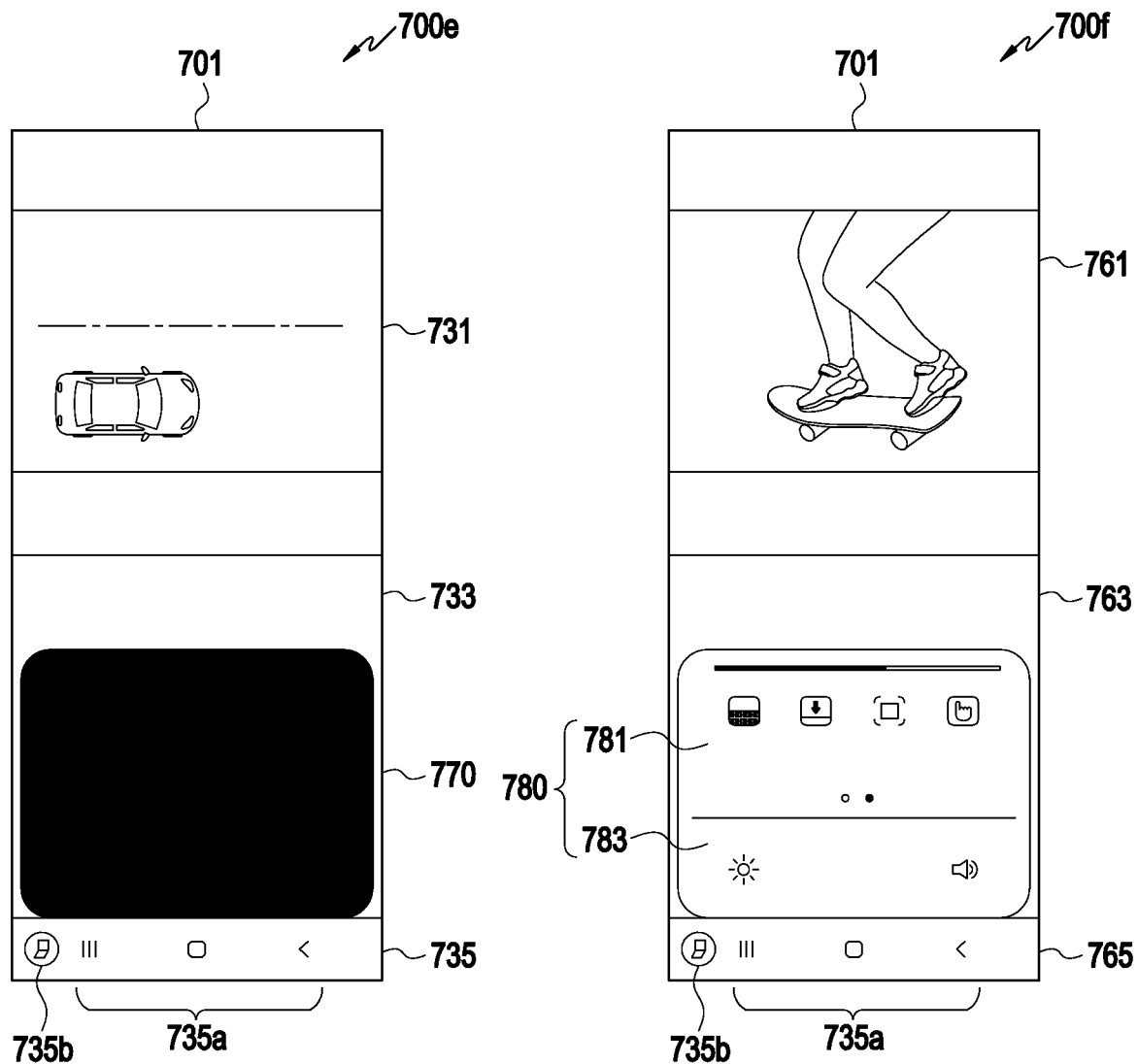

In FIG. 7A, based on detecting a selection of the next video playback button b3 displayed in the second area 773 of the first panel 770 displayed in the second display area 763, the electronic device 701 may display the playback of a second video in the first display area 761, as shown in FIG. 7D. In FIG. 7D, when a predetermined time passes after detection of an operation or an event from the electronic device 701 while the playback of the second video is being displayed in the first display area 761, the electronic device 701 may adjust the brightness of the first panel displayed in the second display area 763 so that buttons included in the first panel 770 are not to be displayed, as shown in FIG. 7E. When an operation or an event is detected, as shown in FIG. 7E, from the electronic device 701 while the playback of the second video is being displayed in the first display area 761 in a state in which buttons included in the first panel 770 displayed in the second display area 763 are not displayed, the electronic device 701 may display the buttons included in the first panel 770 by adjusting the brightness of the first panel displayed in the second display area 763, as shown in FIG. 7D.

In FIG. 7A, based on detecting a selection of the next panel display button b5 displayed in the first area 771 of the first panel 770 displayed in the second display area 763, the electronic device 701 may display, in the second display area 763, a second panel 780 including a first area 781 displaying at least one common button (e.g., a screen up button, a notification button, a screen shot button, and a cursor button) which can be commonly used in all or a plurality of applications and a second area 783 displaying at least one system button (e.g., a brightness adjustment button and a volume adjustment button) capable of controlling a system of the electronic device, as shown in FIG. 7F.

Drawings 800a to 800d in FIGS. 8A to 8D illustrate operations of providing a panel based on a selection of a panel button in a second state of an electronic device according to various embodiments.

Figure 8A:
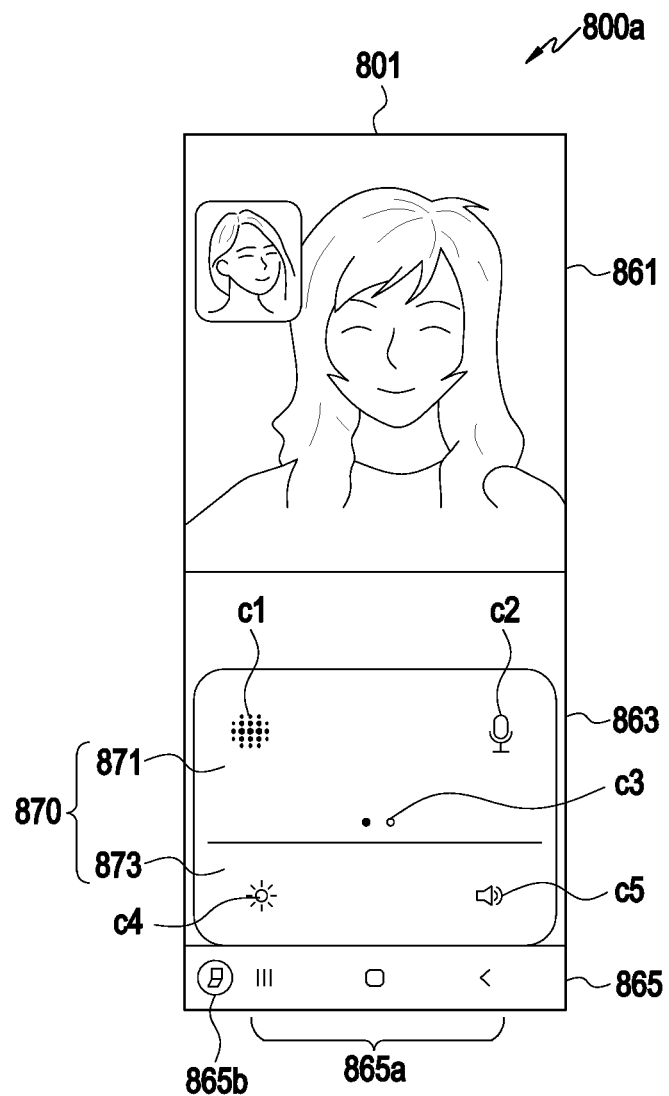
FIGS. 8A to 8D illustrate operations of providing a panel based on a selection of a panel button in a second state of an electronic device according to various embodiments.

Referring to FIG. 8A, based on a selection of a panel button in a second state (e.g., the second state of the electronic device 201 of FIG. 2B) in which the electronic device is folded and division to a first display area 861 and a second display area 863 is made, an electronic device 801 (e.g., the electronic device 101 of FIG. 1, the electronic device 201 of FIGS. 2A to 2C, or the electronic device 301 of FIG. 3) may display an execution screen of a video call application in a first display area 861, and display, in the second display area 863, a first panel 870 (e.g., a video call panel) including at least one control button capable of controlling the video call application and at least one system button capable of controlling a system of the electronic device.

The electronic device 801 may display, in a first area 871 of the first panel 870, a microphone mute button c1, a microphone volume adjustment button c2, and a next panel display button c3 as the at least one control button capable of controlling the video call application. The electronic device 801 may provide, in a first area 871 of the first panel 870, a camera on/off button, a background blur button capable of blurring a background, and a call end button as the at least one control button capable of controlling the video call application.

The electronic device 801 may display, in the second area 873 of the first panel 870, a brightness adjustment button c4 and a volume adjustment button c5 as the at least one system button capable of controlling the system of the electronic device. The electronic device 801 may display at least one default button 885a for control of the electronic device and a panel button 885b in a third display area 885.

Figure 8B:
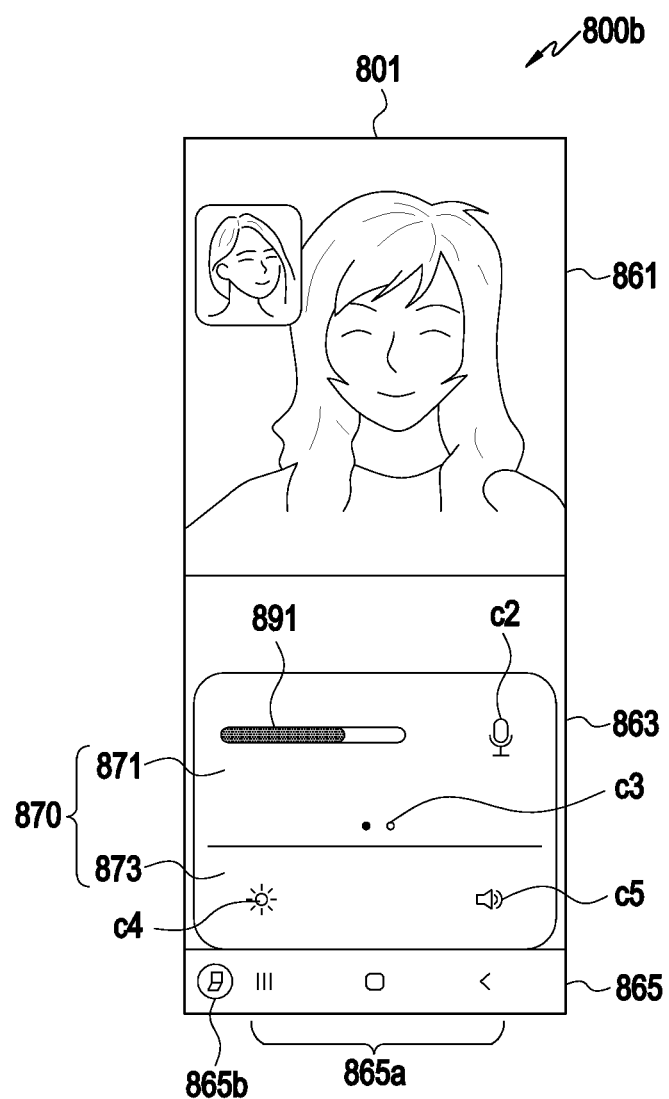

Based on detecting, in FIG. 8A, a selection of the microphone volume adjustment button c2 displayed in the first area 871 of the first panel 870 displayed in the second display area 863, the electronic device 801 may display, in the first area 871 of the first panel 870, the microphone volume adjustment button c2 and a microphone volume adjustment bar 891 as a detailed control button for adjusting the volume of a microphone, as shown in FIG. 8B. When an area other than the microphone volume adjustment bar 891 is touched while displaying the microphone volume adjustment bar 891, an area other than the first area 871 of the first panel 870 is touched, or a predetermined time passes without detection of an operation of touching the microphone volume adjustment bar 891, the electronic device 801 may display the microphone mute button c1, the microphone volume adjustment button c2, and the next panel display button c3 in the first area 871 of the first panel 870 as shown in FIG. 8A.

Figure 8C:
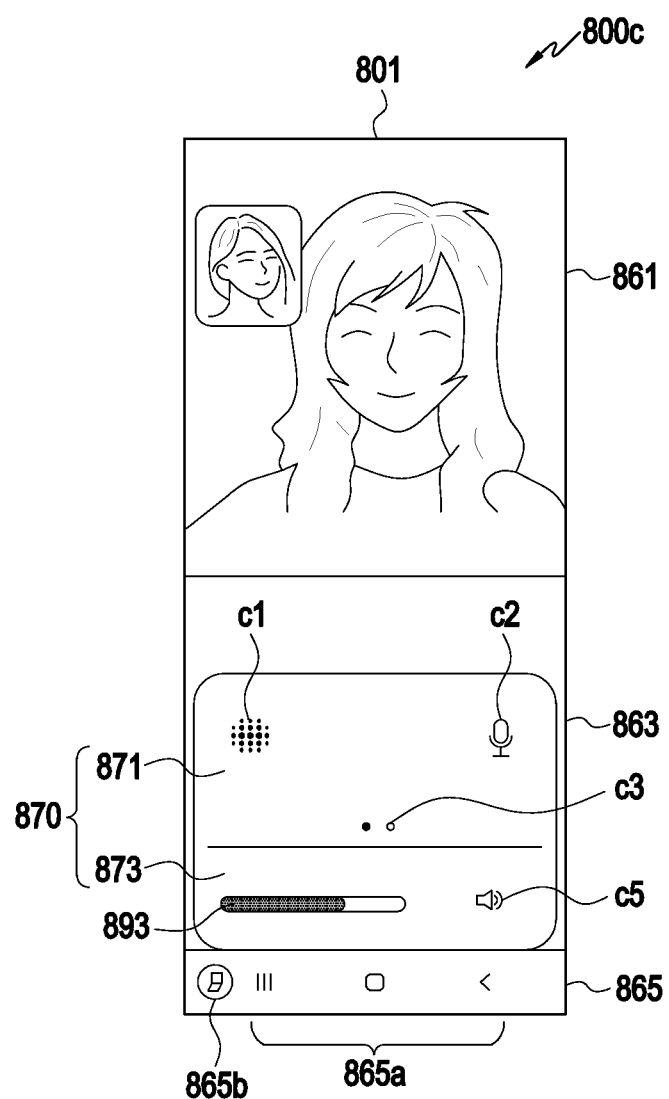

Based on detecting, in FIG. 8A, a selection of the volume adjustment button c5 displayed in the second area 873 of the first panel 870 displayed in the second display area 863, the electronic device 801 may display, in the second area 873 of the first panel 870, the volume adjustment button c5 and the volume adjustment bar 891 as a detailed control button for volume adjustment as shown in FIG. 8C. When an area other than the volume adjustment bar 891 is touched, an area other than the second area 873 of the first panel 870 is touched, or a predetermined time passes without detection of an operation of touching the volume adjustment bar 891 while the volume adjustment bar 891 is being displayed, the electronic device 801 may display the brightness adjustment button c4 and the volume adjustment button c5 in the second area 873 of the first panel 870, as shown in FIG. 8A.

Figure 8D:
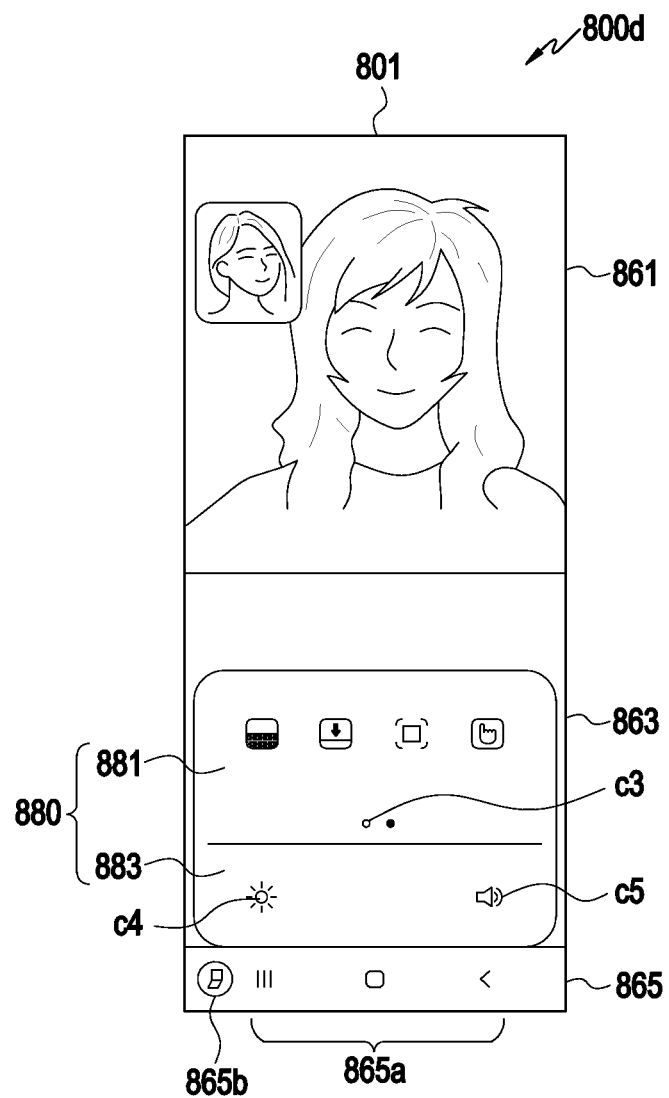

Based on detecting, in FIG. 8A, a selection of the next panel display button c3 displayed in the first area 871 of the first panel 870 displayed in the second display area 863, the electronic device 801 may display, in the second display area 863, a second panel 880 including a first area 881 displaying at least one common button (e.g., a screen up button, a notification button, a screen shot button, and a cursor button) which can be commonly used in all or a plurality of applications and a second area 883 displaying at least one system button (e.g., a brightness adjustment button and a volume adjustment button) capable of controlling a system of the electronic device, as shown in FIG. 8D.

Drawings 900a to 900d in FIGS. 9A to 9D illustrate operations of providing a panel based on a selection of a panel button in a second state of an electronic device according to various embodiments.

Figure 9A:
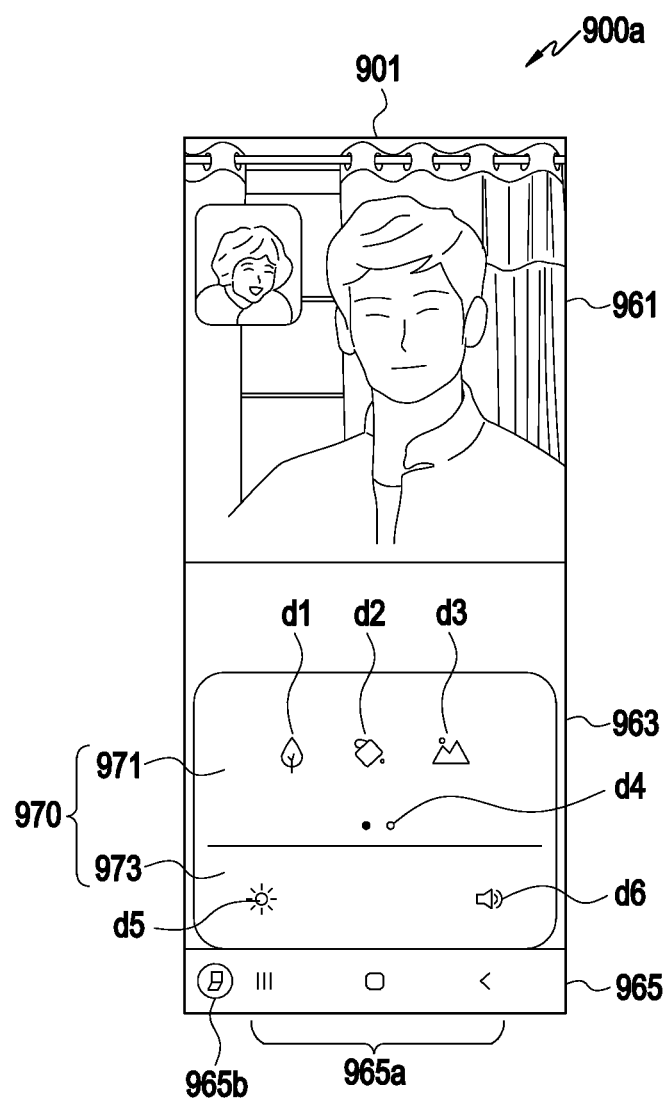
FIGS. 9A to 9D illustrate operations of providing a panel based on a selection of a panel button in a second state of an electronic device according to various embodiments.

Referring to FIG. 9A, an electronic device 901 (e.g., the electronic device 101 of FIG. 1, the electronic device 201 of FIGS. 2A to 2C, or the electronic device 301 of FIG. 3) may display an execution screen of a video call application in a first display area 961, and display, in a second display area 963, a first panel 970 (e.g., a video call panel) including at least one control button capable of controlling the video call application and at least one system button capable of controlling a system of the electronic device, based on a selection of a panel button in a second state (e.g., the second state of the electronic device 201 of FIG. 2b) in which the electronic device is folded and division into the first display area 961 and the second display area 963 is made.

The electronic device 901 may display, in the first area 971 of the first panel 970, a background blur button d1, a background color button d2, a background image button d3, and a next panel display button d4 as the at least one control button capable of controlling the video call application.

The electronic device 901 may display, in the second area 973 of the first panel 970, a brightness adjustment button d5 and a volume adjustment button d6 as the at least one system button capable of controlling the system of the electronic device. The electronic device 901 may display at least one default button 965a for control of the electronic device and a panel button 965b in a third display area 965.

Figure 9B:
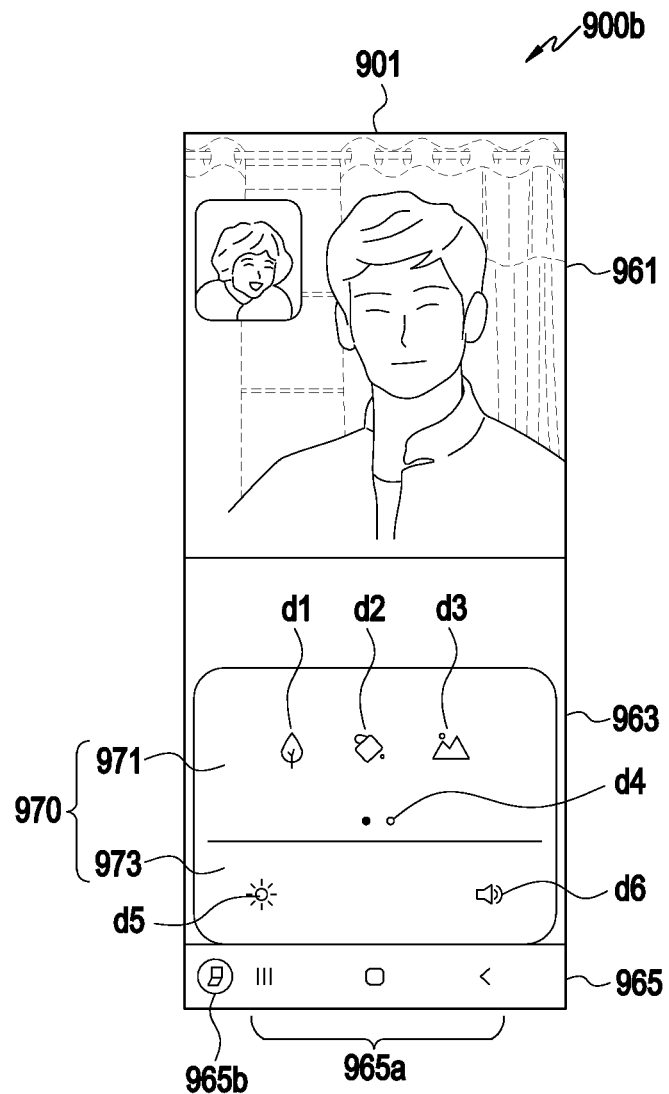

Based on detecting, in FIG. 9A, a selection of the background blur button d1 displayed in the first area 971 of the first panel 970 displayed in the second display area 963, the electronic device 901 may blur a background of an image displayed in the first display area 961 and display the blurred background, as shown in FIG. 9B.

Figure 9C:
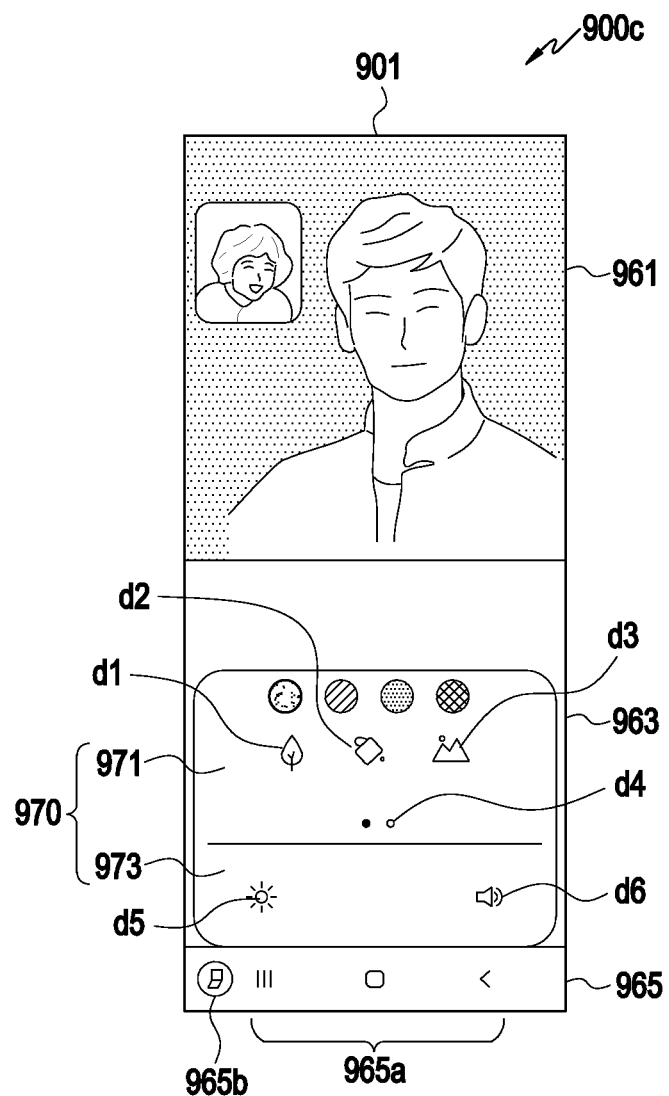

Based on detecting, in FIG. 9A, a selection of the background color button d2 displayed in the first area 971 of the first panel 970 displayed in the second display area 963, the electronic device 901 may change the color of the background of the image displayed in the first display area 961 to a color selected by a user and display the same, as shown in FIG. 9C.

Figure 9D:
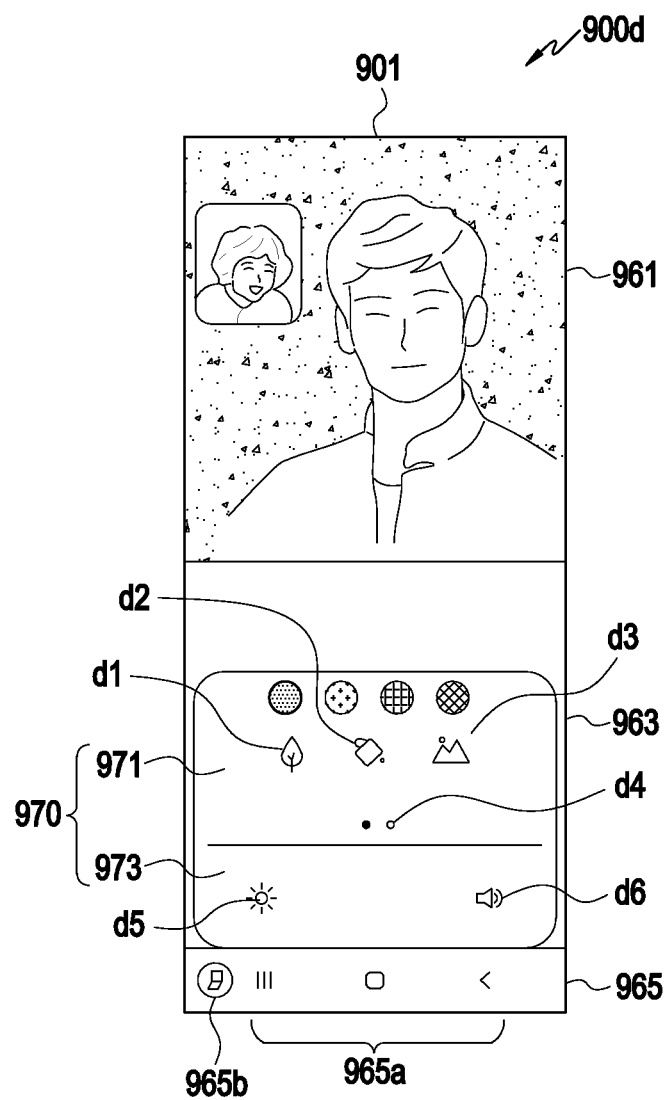

Based on detecting, in FIG. 9A, a selection of the background image button d3 displayed in the first area 971 of the first panel 970 displayed in the second display area 963, the electronic device 901 may change the background of the image displayed in the first display area 961 to an image selected by a user from among images stored in the electronic device 901 and display the same, as shown in FIG. 9D.

Drawings 1000a to 1000d in FIGS. 10A to 10D illustrate operations of providing a panel based on a selection of a panel button in a second state of an electronic device according to various embodiments.

Figure 10A:
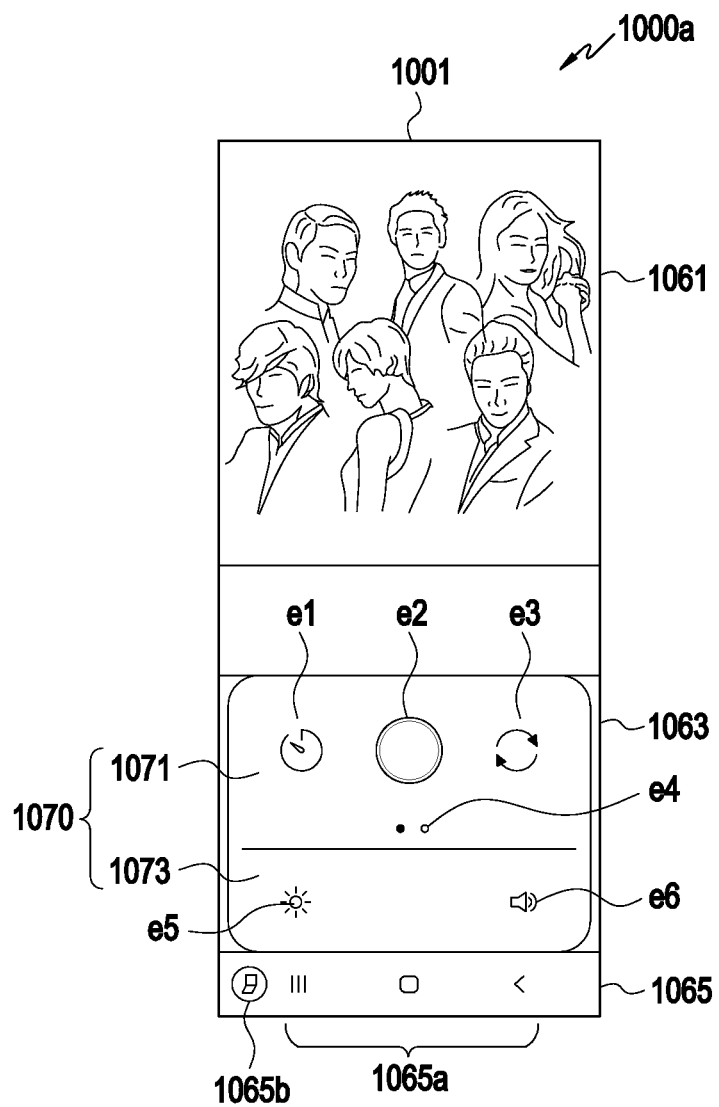
FIGS. 10A to 10D illustrate operations of providing a panel based on a selection of a panel button in a second state of an electronic device according to various embodiments.

Referring to FIG. 10A, an electronic device 1001 (e.g., the electronic device 101 of FIG. 1, the electronic device 201 of FIGS. 2A to 2C, or the electronic device 301 of FIG. 3) may display an execution screen of a camera application in a first display area 1061, and display, in a second display area 1063, a first panel 1070 (e.g., a camera panel) including at least one control button capable of controlling a camera application and at least one system button capable of controlling a system of the electronic device, based on a selection of a panel button in a second state (e.g., the second state of the electronic device 201 of FIG. 2B) in which the electronic device is folded and division into the first display area 1061 and the second display area 1063 is made.

The electronic device 1001 may display, in a first area 1071 of the first panel 1070, a timer button e1, a photographing button e2, a camera conversion button e3, and a next panel display button e4 as the at least one control button capable of controlling the camera application.

The electronic device 1001 may display, in a second area 1073 of the first panel 1070, a brightness adjustment button e5 and a volume adjustment button e6 as the at least one system button capable of controlling the system of the electronic device. The electronic device 1001 may display at least one default button 1065a for control of the electronic device and a panel button 1065b in a third display area 1065.

Figure 10B:
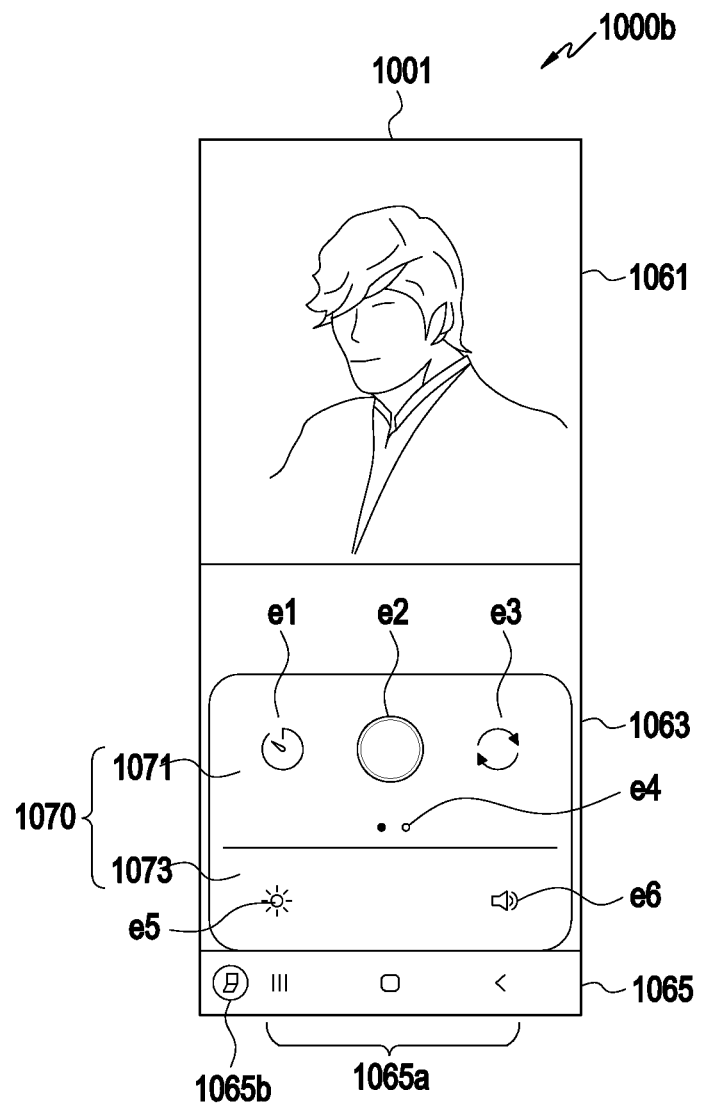

Based on detecting, in FIG. 10A, a selection of the camera conversion button e3 displayed in the first area 1071 of the first panel 1070 displayed in the second display area 1063, the electronic device 1001 may display an image captured through a front camera in the first display area 1061, as shown in FIG. 10B.

Figure 10C:
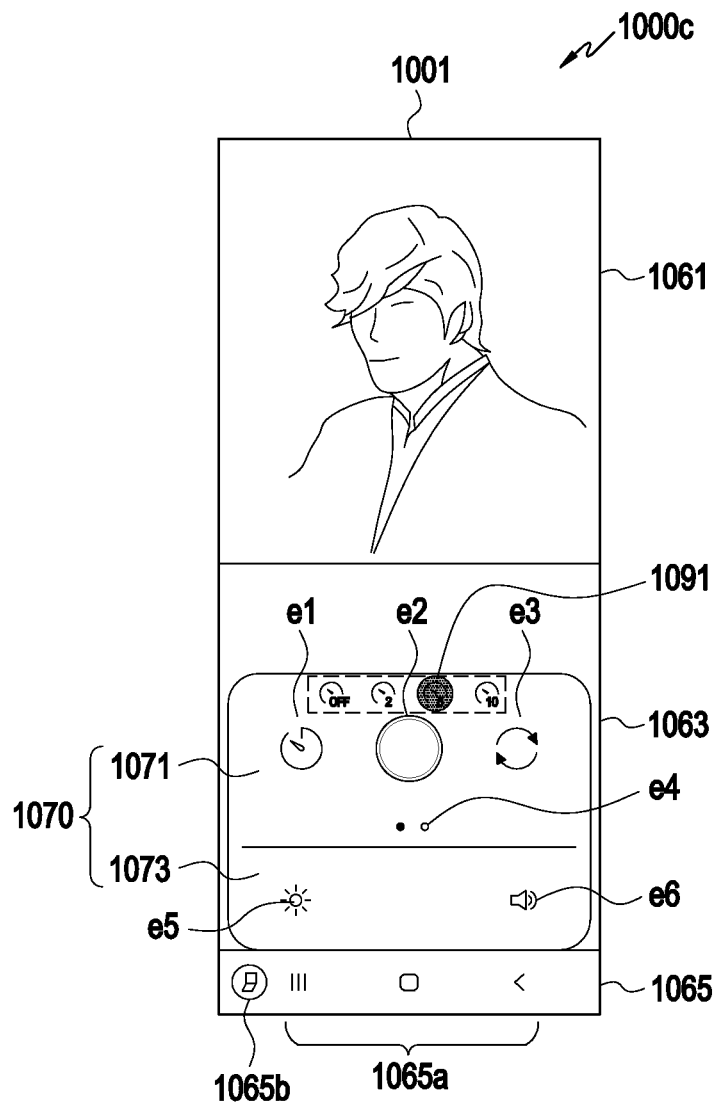
Figure 10D:
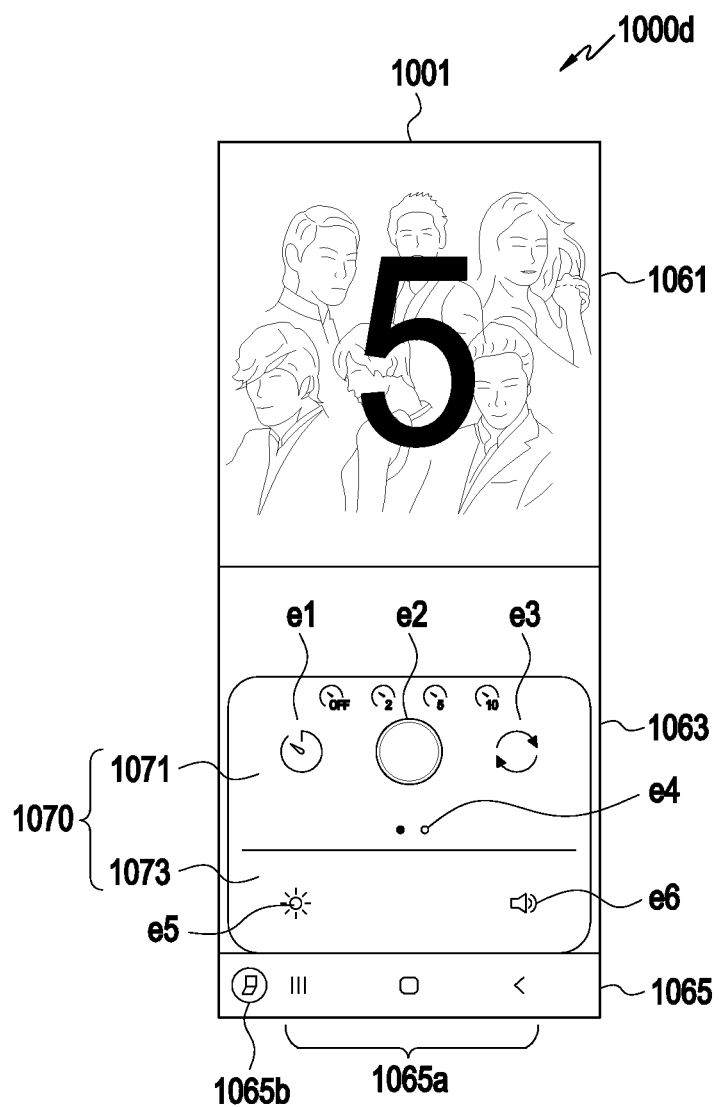

Based on detecting, in FIG. 10A, a selection of the timer button e3 displayed in the first area 1071 of the first panel 1070 displayed in the second display area 1063, the electronic device 1001 may display, at a predetermined position of the first area 1071 of the first panel 1070 displayed in the second display area 1063, multiple buttons 1091 indicating types of timers, as shown in FIG. 10C. When a timer is selected from among the multiple buttons 1091 indicating the types of timers in FIG. 10C, the electronic device 1001 may operate a timer for photographing as shown in FIG. 10D.

Drawings 1100a to 1100g in FIGS. 11A to 11G illustrate operations of providing a panel based on a selection of a panel button in a second state of an electronic device according to various embodiments.

Figure 11A:
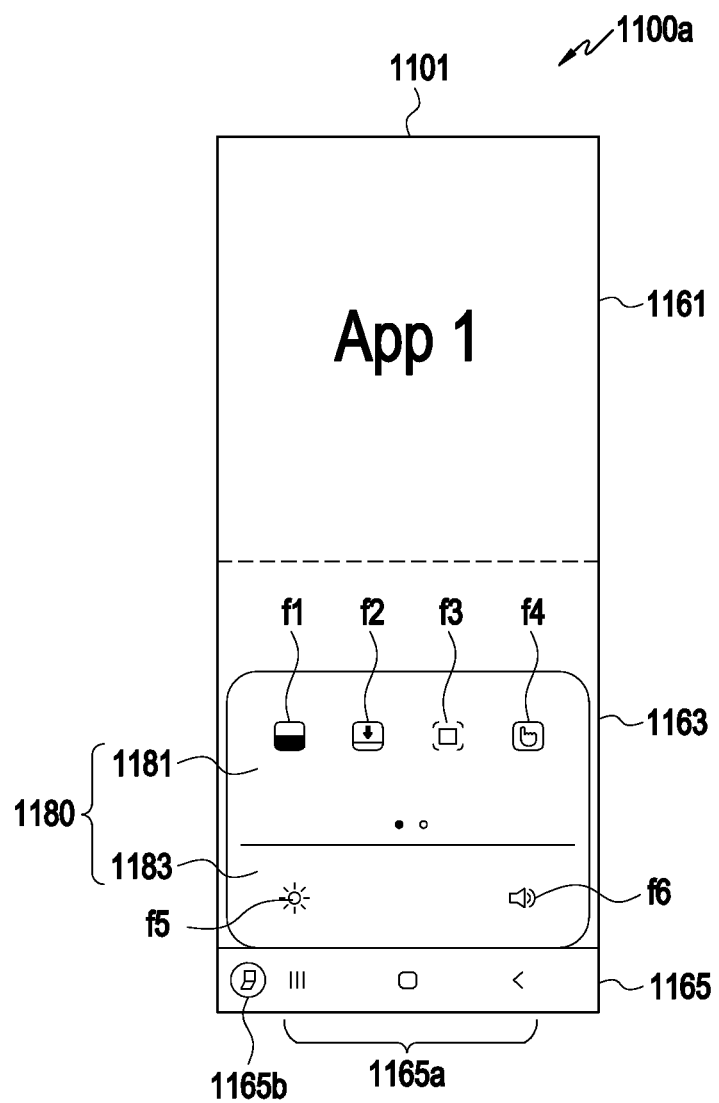

Referring to FIG. 11A, an electronic device 1101 (e.g., the electronic device 101 of FIG. 1, the electronic device 201 of FIGS. 2A to 2C, or the electronic device 301 of FIG. 3) may display an execution screen of a first application in a first display area 1161 and display, in a first area 1181 of a second panel 1180 displayed in a second display area 1163, at least one common button which can be commonly used in all or a plurality of applications, based on a selection of a panel button in a second state (e.g., the second state of the electronic device 201 of FIG. 2B) in which the electronic device is folded and division into the first display area 1161 and the second display area 1163 is made. The electronic device 1101 may display, in the first area 1181 of the second panel 1180, a screen up button f1, a notification button f2, a screen shot button f3, a cursor button f4 as at least one common button. The electronic device 1101 may display, in a second area 1183 of the second panel 1180, a brightness adjustment button f5 and a volume adjustment button f6 as at least one system button capable of controlling a system of the electronic device. The electronic device 1101 may display at least one default button 1165a for control of the electronic device and a panel button 1165b in a third display area 1165.

Figure 11B:
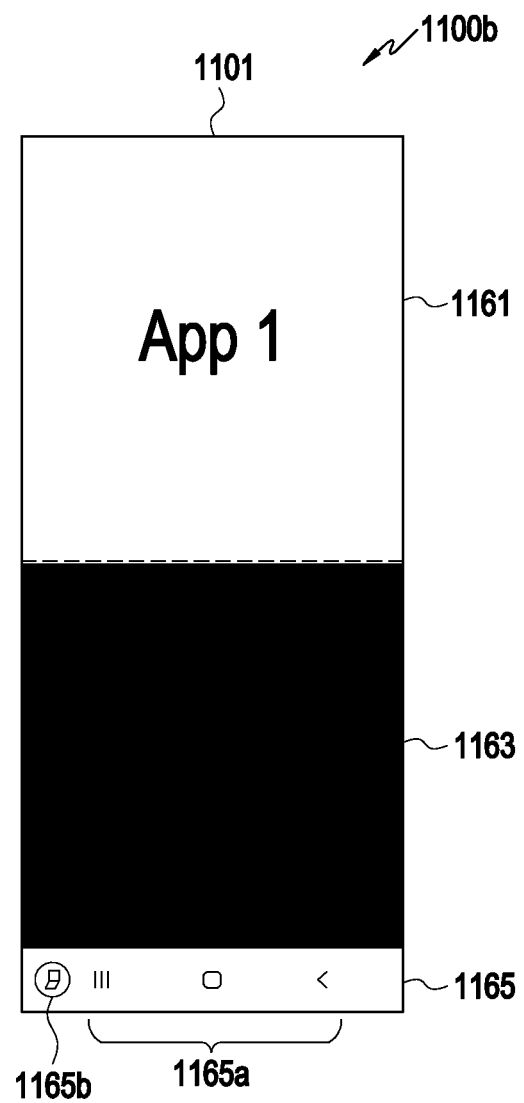

Based on detecting a selection of the screen up button f1 displayed in the first area 1181 of the second panel 1180 displayed in the second display area 1163 in FIG. 11A, the electronic device 1101 may adjust the brightness of the second panel displayed in the second display area 1163, in order to process and display the second panel in gray, as shown in FIG. 11B. A screen up function corresponds to a function of moving a screen upward, wherein when it is impossible to move the screen upward, the brightness of each of buttons included in the second panel may be adjusted so that the second panel is processed and displayed in gray, or displayed as grayed-out.

Figure 11C:
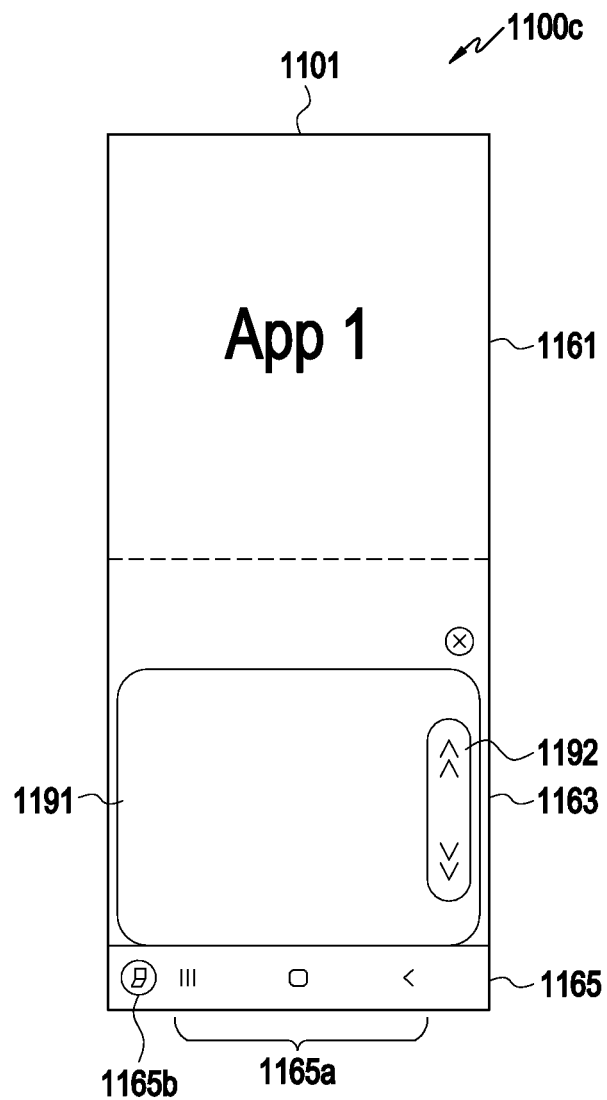

Based on detecting a selection of the cursor button f4 displayed in the first area 1181 of the second panel 1180 displayed in the second display area 1163 in FIG. 11A, the electronic device 1101 may display a cursor in the first display area 1161 in which the execution screen of the first application is displayed, and provide, in the second display area 1163, a cursor function pad 1191 capable of controlling the cursor displayed in the first display area 1161, instead of the second panel 1180, as shown in FIG. 11C. The electronic device 1101 may control the first application displayed in the first display area 1161 by using the cursor, based on various types of gestures detected in the cursor function pad 1191. The electronic device 1101 may provide a scroll up/down button 1192 in the cursor function pad 1191.

Figure 11D:
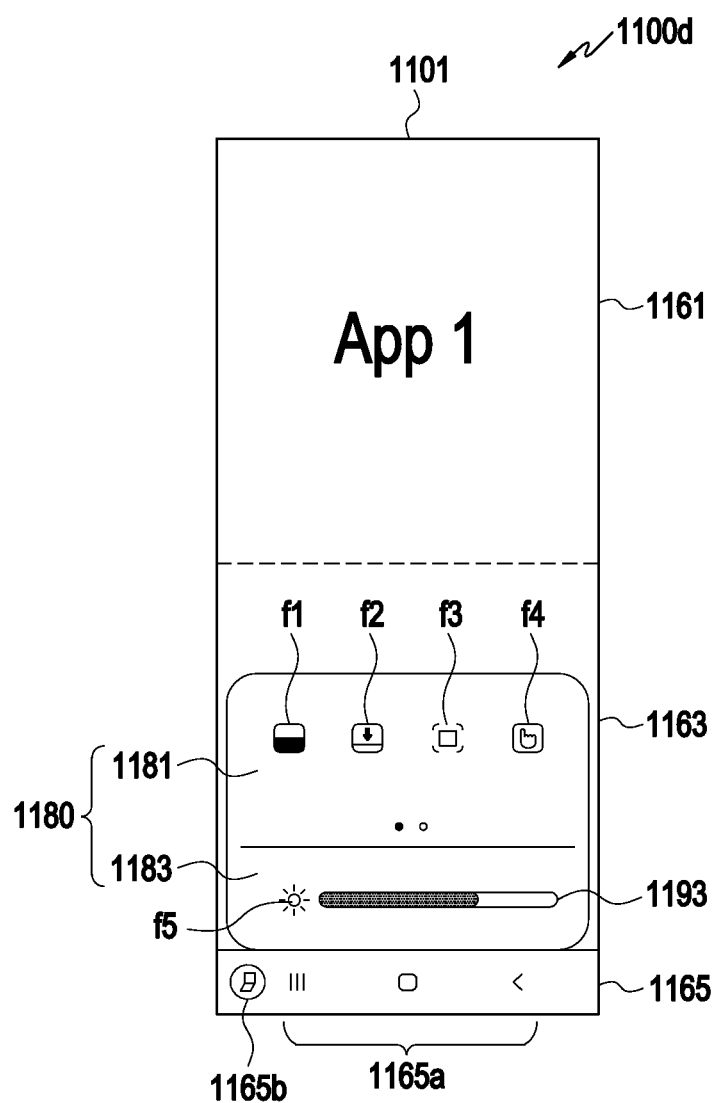

Based on detecting a selection of the brightness adjustment button f5 displayed in the second area 1183 of the second panel 1180 displayed in the second display area 1163 in FIG. 11A, the electronic device 1101 may display, in the second area 1183 of the second panel 1180, the brightness adjustment button f5 and a brightness adjustment bar 1193 as a detailed control button for control the brightness of a display as shown in FIG. 11D. When an area other than the brightness adjustment bar 1193 is touched, an area other than the second area 1183 of the second panel 1180 is touched, or a predetermined time passes without detection of an operation of touching the brightness adjustment bar 1193 while the brightness adjustment bar 1193 is being displayed, the electronic device 1101 may display the brightness adjustment button f5 and the volume adjustment button f6 in the second area 1183 of the second panel 1180, as shown in FIG. 11A.

Based on detecting a selection of the notification button f2 displayed in the first area 1181 of the second panel 1180 displayed in the second display area 1163 in FIG. 11A, the electronic device 1101 may display a notification panel 1144 in the first display area 1161 and the second display area 1163 and display notification details, as shown in FIG. 11E.

Figure 11G:
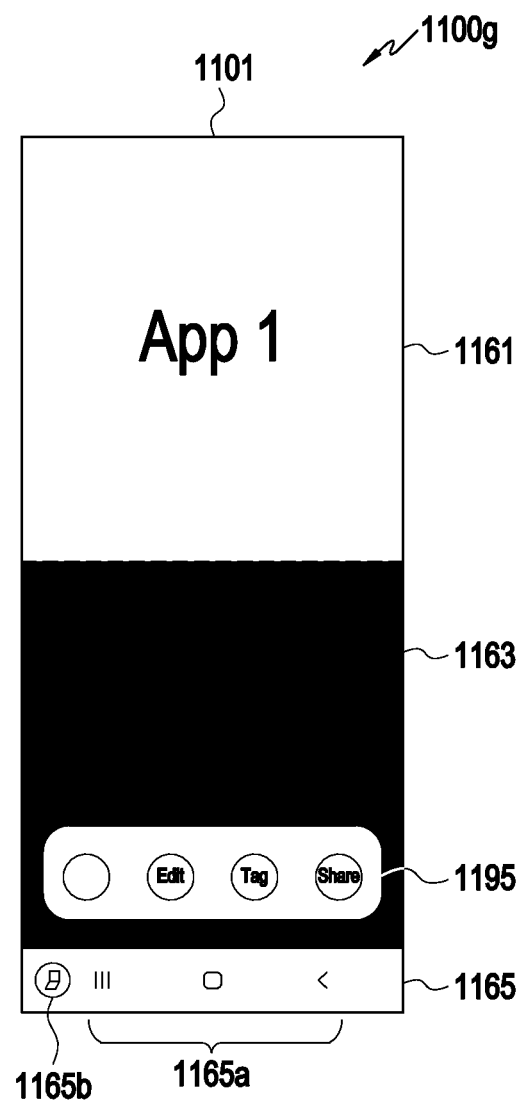

Based on detecting a selection of the screen shot button f3 displayed in the first area 1181 of the second panel 1180 displayed in the second display area 1163 in FIG. 11A, the electronic device 1101 may release the display of the second panel 1180 displayed in the second display 1163, capture an image of an execution screen of the first application that is currently being executed, except for the second panel 1180, and display the same, as shown in FIG. 11F. When the image of the execution screen of the first application that is currently being executed is captured as shown in FIG. 11F, the electronic device 1101 may display, in the second display area 1163, various buttons 1195 enabling the captured image of the screen to be edited or shared as shown in FIG. 11G.

Drawings 1200a to 1200d in FIGS. 12A to 12D illustrate operations of adding an operation button in a panel based on a selection of a panel button in a second state of an electronic device according to various embodiments.

Figure 12A:
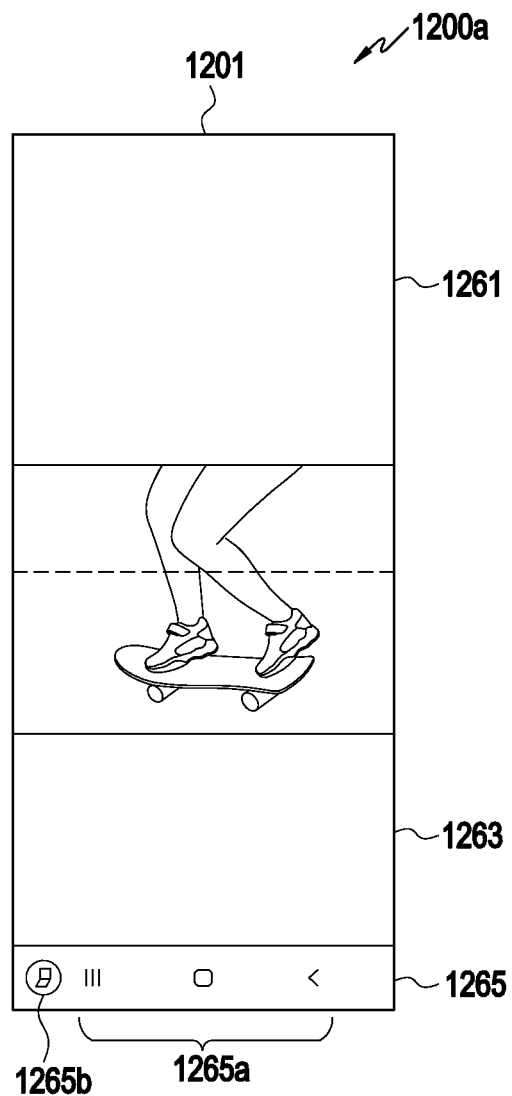
FIGS. 12A to 12D illustrate operations of adding an operation button based on a selection of a panel button in a second state of an electronic device according to various embodiments.

Referring to FIG. 12A, when an electronic device 1201 (e.g., the electronic device 101 of FIG. 1, the electronic device 201 of FIGS. 2A to 2C, or the electronic device 301 of FIG. 3) identifies a selection of a panel button 1265b in a second state (e.g., the second state of the electronic device 201 of FIG. 2B) in which the electronic device is folded, playback of a first video selected upon execution of a video application is displayed by using a first display area 1261 and a second display area 1263 as one screen, and the panel button 1265b is displayed in a third display area 1265, may display the playback of the first video in the first display area 1261, and display, in a first area 1271 of a first panel 1270 displayed in the second display area 1263, at least one control button (e.g., a previous video playback button, a playback/stop button, a next video playback button, and a next panel display button) capable of controlling the video application. The electronic device 1201 may display, in a second area 1273 of the first panel 1270 displayed in the second display area 1263, at least one operation button g3 and g4 capable of controlling an operation related to the video application, together with a brightness adjustment button g1 and a volume adjustment button g2 as at least one system button capable of controlling a system of the electronic device. Here, the at least one system button included in the first panel 1270 corresponds to a function related to the video application, among system functions of the electronic device, and may be pre-configured. When identifying through state information of the video application that a first video is playing in the first display area 1261, the electronic device 1201 may additionally display, in the second area 1273 of the first panel 1270, an eye comfort button g3 capable of providing an eye comfort function, as the at least one operation button. When an external electronic device is connected to the electronic device 1201 and the connected external electronic device corresponds to a Bluetooth speaker, the electronic device 1201 may additionally display, in the second area 1273 of the first panel 1270, a Bluetooth function button g4 capable of controlling a Bluetooth speaker, as the at least one operation button.

Figure 12B:
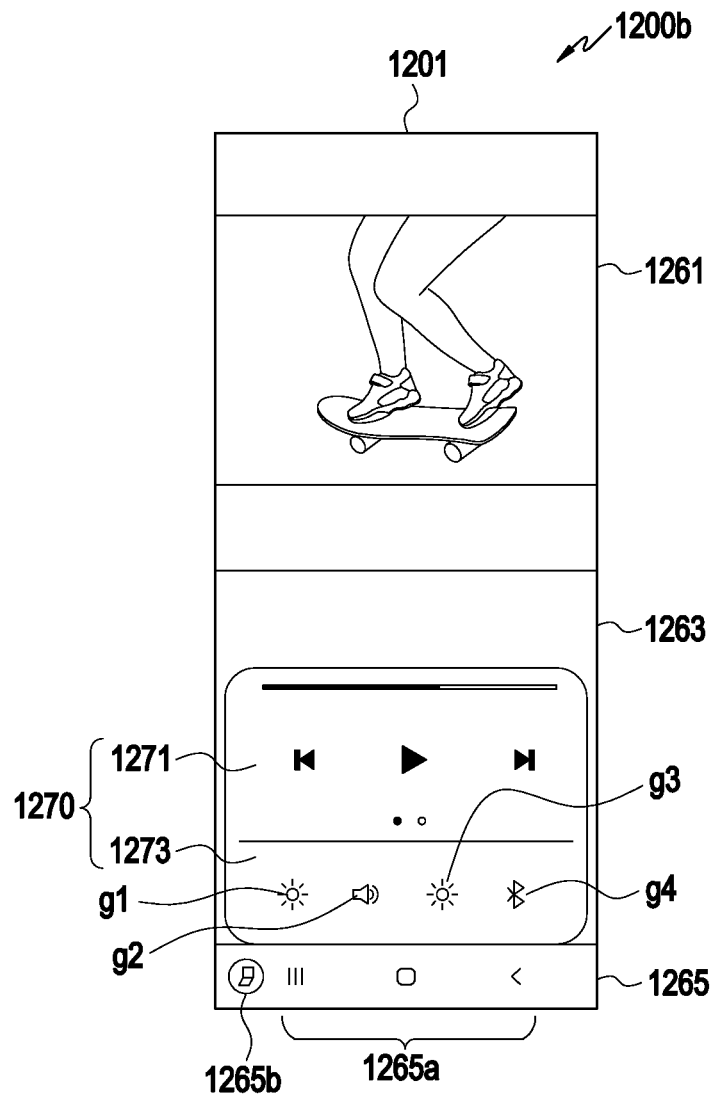
Figure 12C:
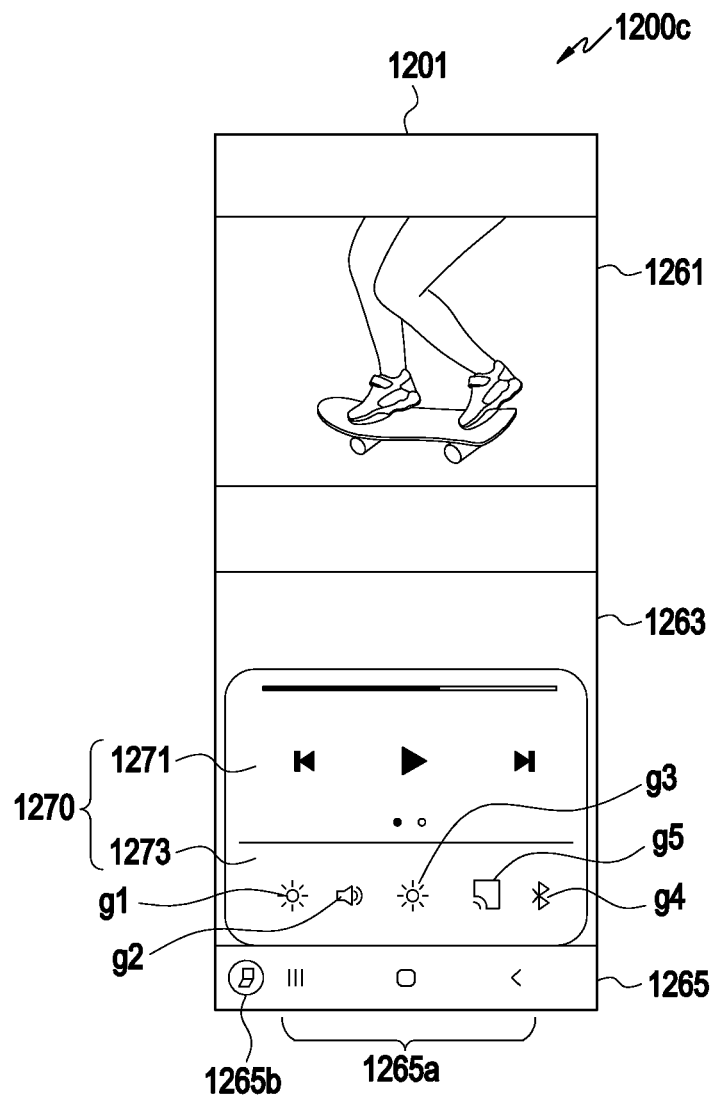

When identifying a connection of a mirroring function with the external electronic device in FIG. 12B, the electronic device 1201 may additionally display, in the second area 1273 of the first panel 1270 displayed in the second display area 1263, a mirroring function button g4 capable of controlling a mirroring function, as the least one operation button as shown in FIG. 12C.

Figure 12D:
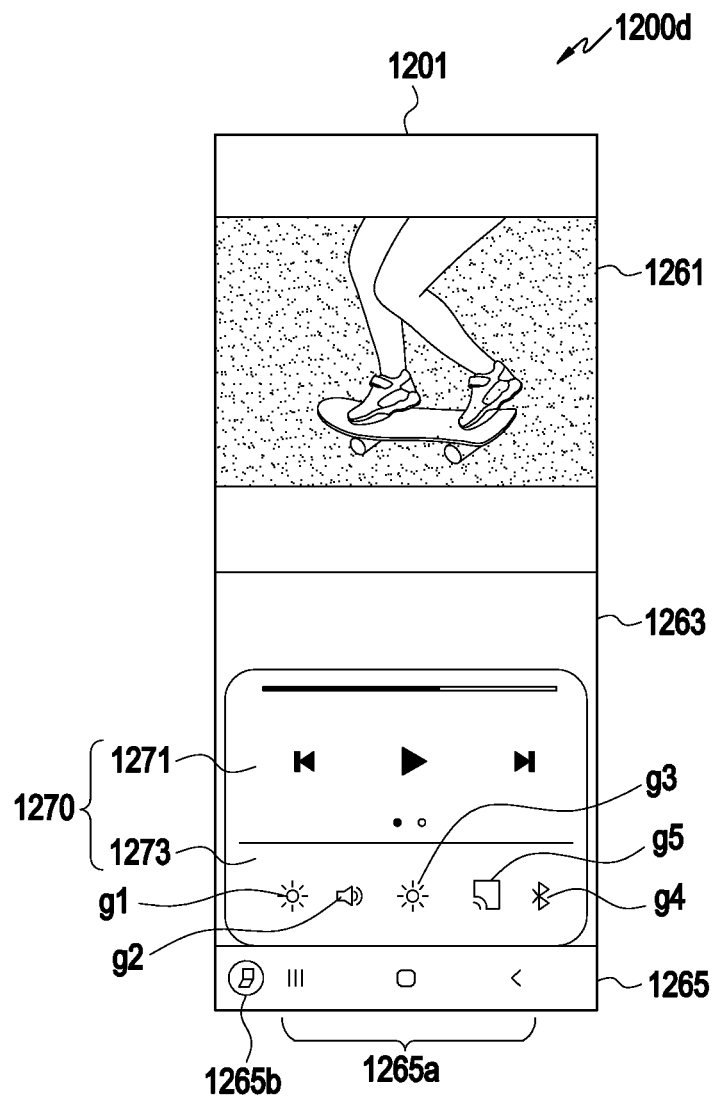

Based on detecting a selection of the eye comfort button g3 displayed in the second area 1273 of the first panel 1270 displayed in the second display area 1263 in FIG. 12C, the electronic device 1201 may display, in the first display area 1261, playback of a first video to which an eye comfort function is applied, as shown in FIG. 12D.

Figure 13A:
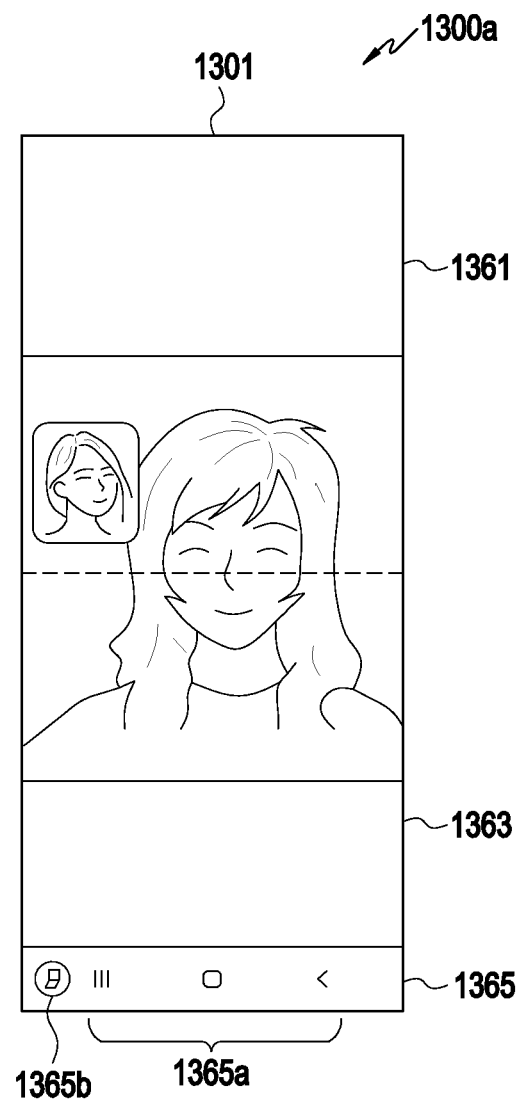
FIGS. 13A to 13C illustrate operations of adding an operation button based on a selection of a panel button in a second state of an electronic device according to various embodiments.
Figure 13B:
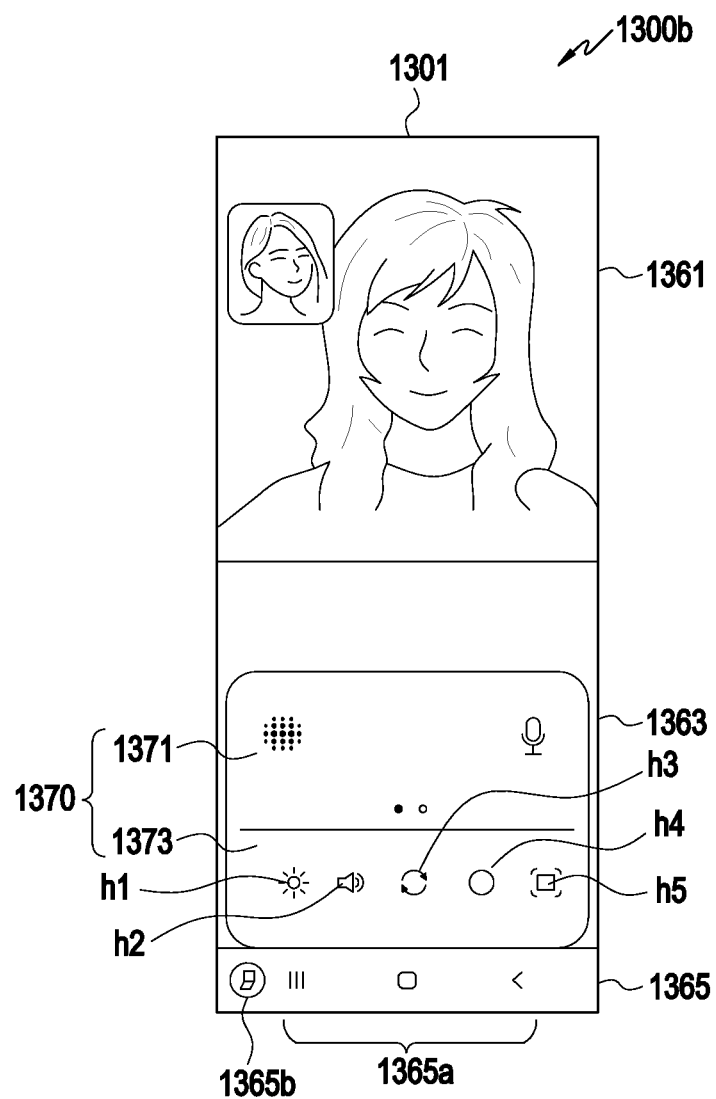
Figure 13C:
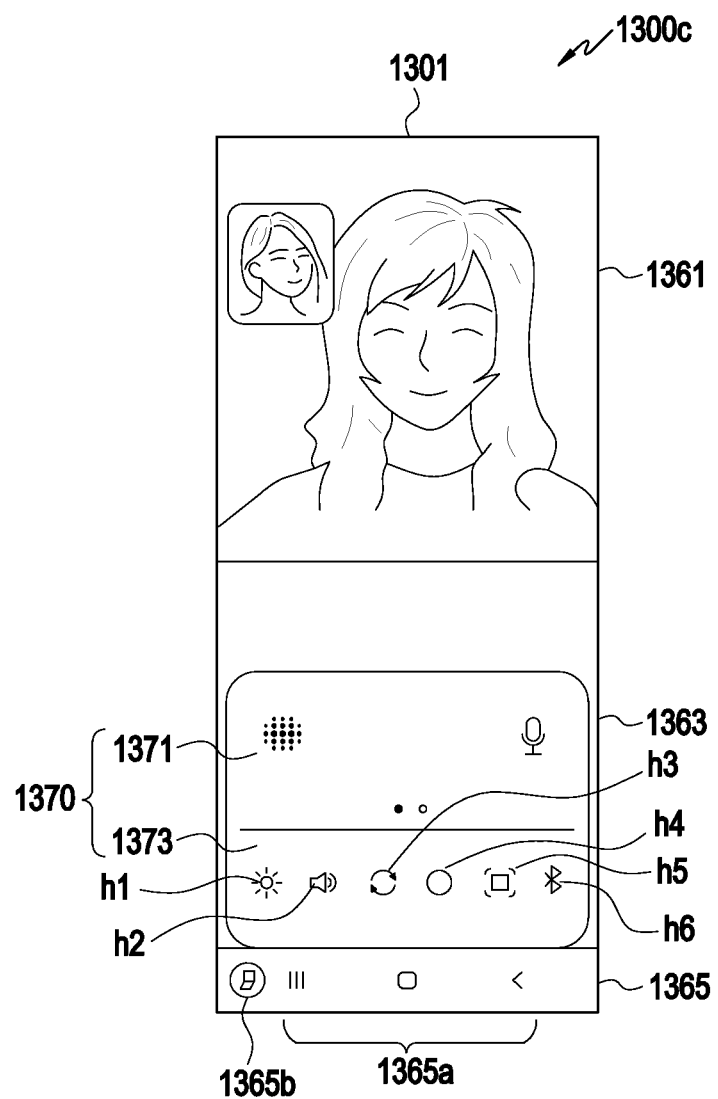

Drawings 1300a to 1300c in FIGS. 13A to 13C illustrate operations of adding an operation button in a panel based on a selection of a panel button in a second state of an electronic device according to various embodiments.

Referring to FIG. 13A, when an electronic device 1301 (e.g., the electronic device 101 of FIG. 1, the electronic device 201 of FIGS. 2A to 2C, or the electronic device 301 of FIG. 3) identifies a selection of a panel button 1365b in a second state (e.g., the second state of the electronic device 201 of FIG. 2B) in which the electronic device 1301 is folded, an execution screen of a video call application is displayed by using a first display area 1361 and a second display area 1363 as one screen, and the panel button 1365b is displayed in a third display area 1365, may display the execution screen of the video call application in the first display area 1361, and display, in a first area 1371 of a first panel 1370 displayed in the second display 1363, at least one control button (e.g., a microphone mute button, a microphone volume adjustment button, and a next panel display button) capable of controlling the video call application. The electronic device 1301 may display, in a second area 1373 of the first panel 1370 displayed in the second display 1363, at least on operation button h3, h4, and h5 capable of controlling an operation related to the video call application, together with a brightness adjustment button h1 and a volume adjustment button h2 as at least one system button of controlling a system of the electronic device. Here, the least one system button included in the first panel 1370 corresponds to a function related to a video call application, among system functions of the electronic device, and may be pre-configured. When the electronic device 1201 identifies through state information of the video call application that a video call is being performed in the first display area 1361, the electronic device 1301 may additionally display, in the second area 1373 of the first panel 1370, a sharing button h3 capable of sharing data with a counterpart during a video call, a do-not-disturb button h4, and a recording button h5 capable of recording a screen, as the at least one operation button.

Referring to FIG. 13C, when an external electronic device is connected to the electronic device 1301 and the connected external electronic device corresponds to a Bluetooth speaker, the electronic device 1301 may additionally display, in the second area 1373 of the first panel 1370, a Bluetooth function button h6 capable of controlling a Bluetooth speaker, as the at least one operation button.

Figure 14A:
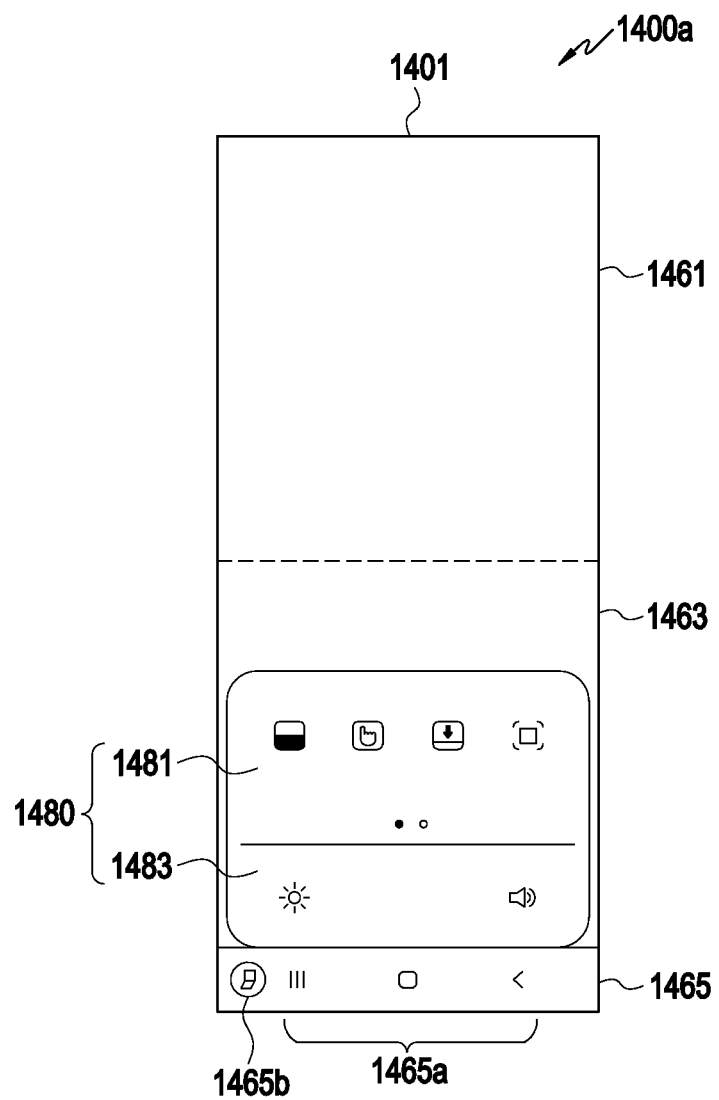
FIGS. 14A and 14B illustrate operations of providing a panel according to rotation of an electronic device, in an electronic device according to various embodiments.
Figure 14B:
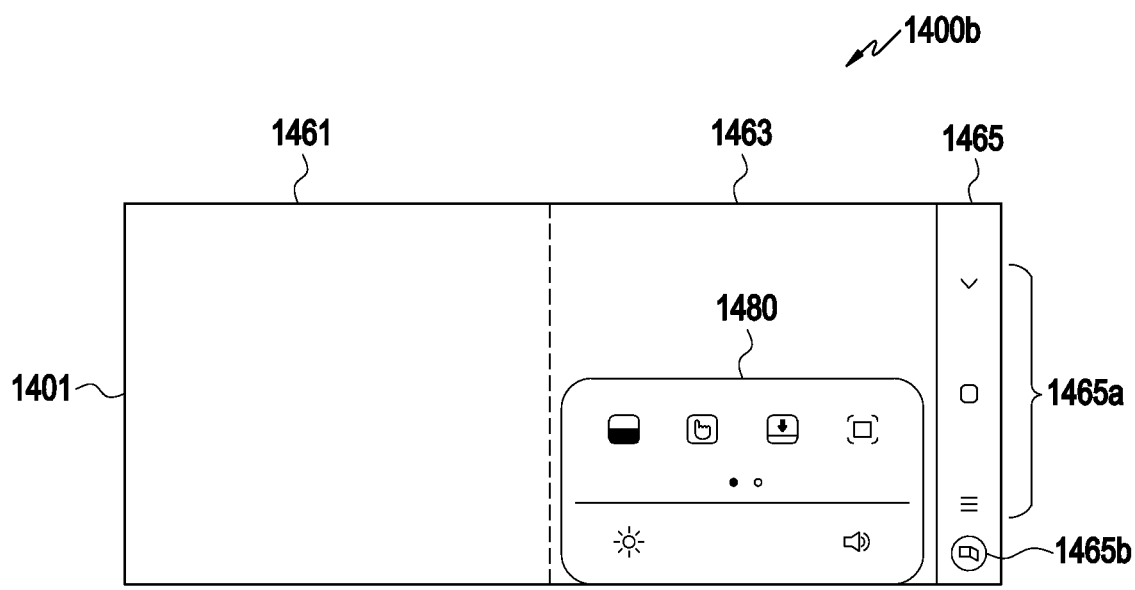

Drawings 1400a to 1400b in FIGS. 14A and 14B illustrate operations of providing a panel according to rotation of an electronic device, in an electronic device according to various embodiments.

Referring to FIG. 14A, based on a selection of a panel button in a second (e.g., the second state of the electronic device 201 of FIG. 2B) in which an electronic device 1401 (e.g., the electronic device 101 of FIG. 1, the electronic device 201 of FIGS. 2A to 2C, or the electronic device 301 of FIG. 3) is folded in a vertical direction in a portrait mode and division into a first display area 1461 and a second display area 1463 is made, the electronic device 1401 may display an execution screen of a first application in the first display area 1461, and display a second panel 1480 including at least one common button which can be commonly used in all or a plurality of applications and at least one system button capable of controlling a system of the electronic device, in the second display area 1463.

When the electronic device 1401 detects −90 degree rotation of the electronic device 1401 by using sensor information received from a sensor module (e.g., a sensor module 376 of FIG. 3) (e.g., at least one of an angle sensor, a tilt sensor, an acceleration sensor, a geomagnetic sensor, a gyro sensor, or a motion sensor) of the electronic device in FIG. 14A, the electronic device 1401 may adjust the size or a display position of the second panel 1480, based on rotation information (e.g., −90 degree rotation) of the electronic device 1401, the position (e.g., the last area on the right side) of a third display area 1465, and size information of the second display area 1463, which changes according to the rotation of the electronic device, and display the second panel 1480 at the bottom of the second display area 1463 as shown in FIG. 14B.

Figure 15A:
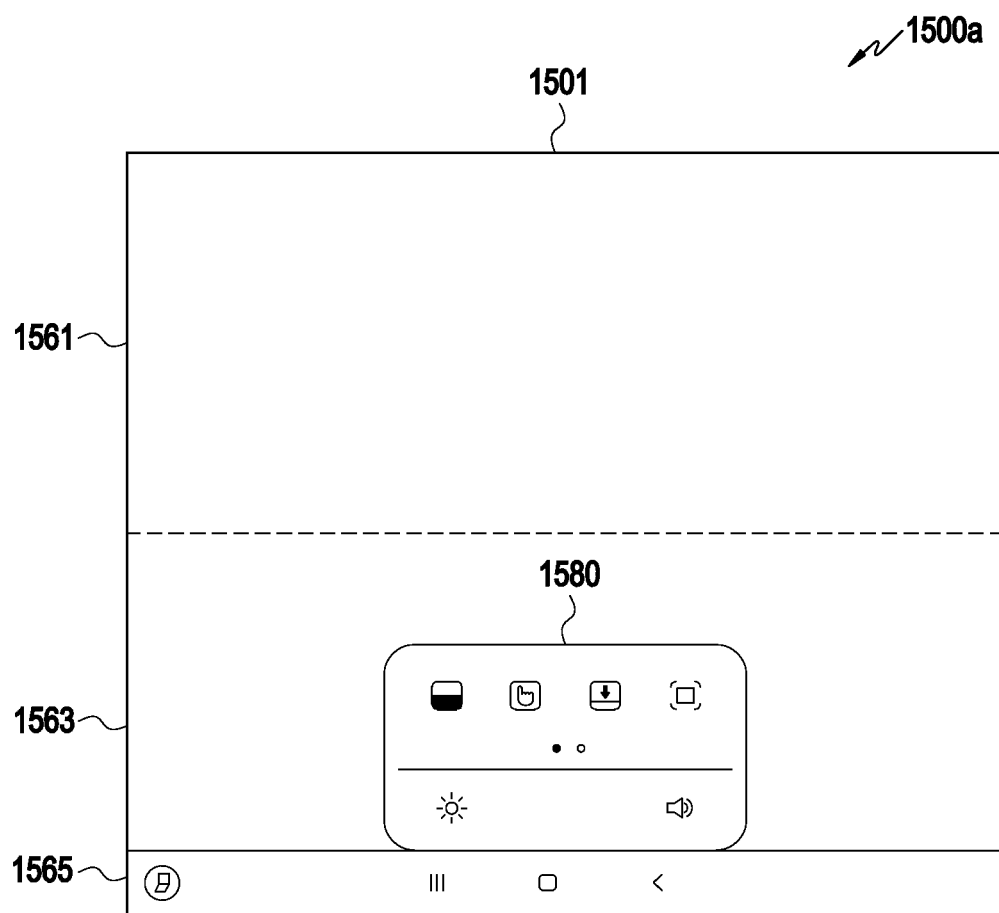
FIGS. 15A to 15B illustrate operations of providing a panel according to rotation of an electronic device, in an electronic device according to various embodiments.
Figure 15B:
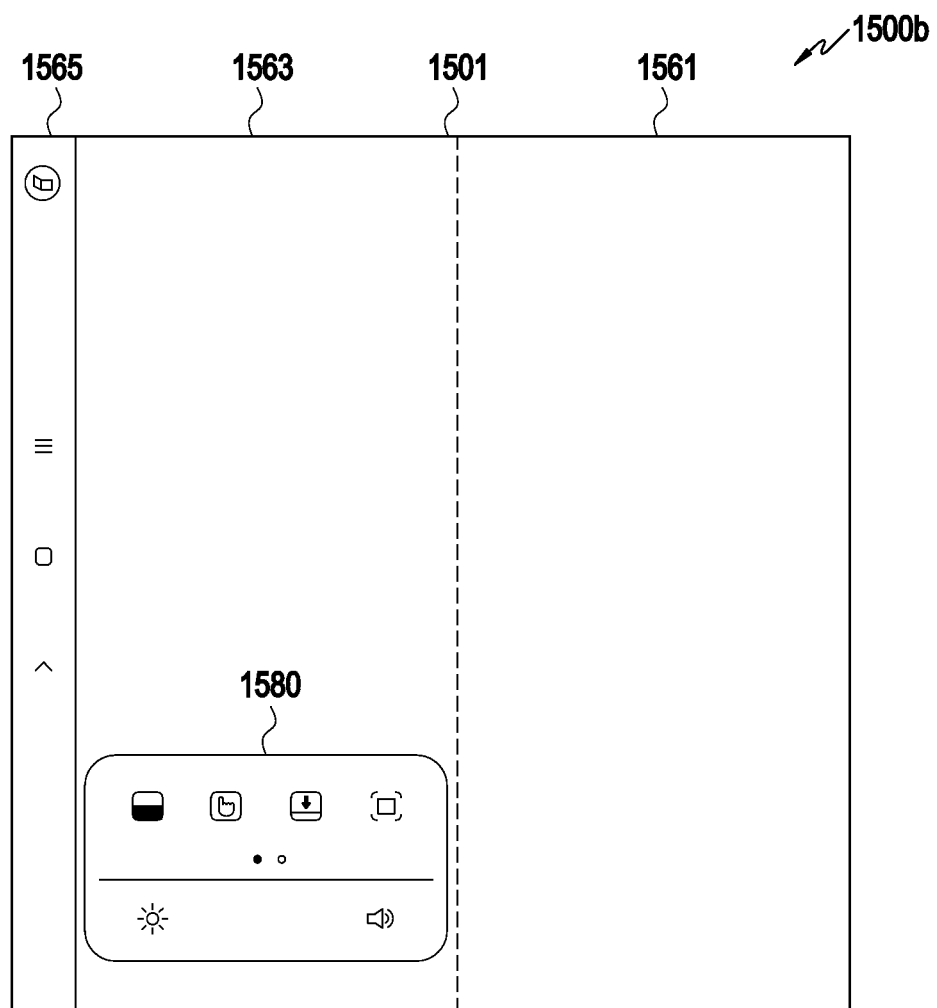

Drawings 1500a to 1500b in FIGS. 15A and 15B illustrate operations of providing a panel according to rotation of an electronic device, in an electronic device according to various embodiments.

Referring to FIG. 15A, based on a selection of a panel button in a second state in which an electronic device 1501 (e.g., the electronic device 101 of FIG. 1, the electronic device 201 of FIGS. 2A to 2C, or the electronic device 301 of FIG. 3) is folded in a vertical direction in a landscape mode and division into a first display area 1561 and a second display area 1563 is made, the electronic device 1501 may display an execution screen of a first application in the first display area 1561 and display, in the second display area 1563, a second panel 1580 including at least one common button which can be commonly used in all or a plurality of applications and at least one system button capable of controlling a system of the electronic device.

When the electronic device 1501 detects 90 degree rotation of the electronic device 1501 in FIG. 15A, the electronic device 1501 may adjust the size or a display position of the second panel 1580, based on rotation information (e.g., 90 degree rotation) of the electronic device 1501, the position (e.g., the last area on the left side) of a third display area 1565, and size information of the second display area 1563, which changes according to the rotation of the electronic device, and display the second panel 1580 at the bottom of the second display area 1563 as shown in FIG. 15B. In embodiments, a 90 degree rotation may correspond to, for example, a rotation from a landscape orientation to a portrait orientation.

Figure 16A:
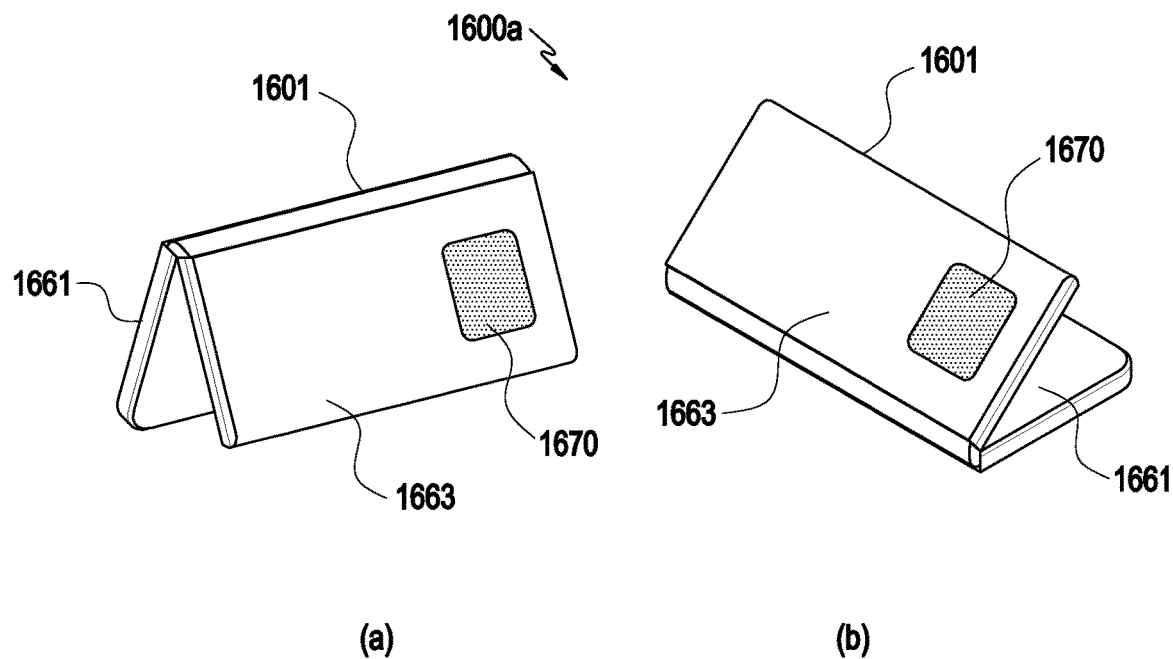
FIGS. 16A to 16C illustrate operations of providing a panel according to a holding state of an electronic device, in an electronic device according to various embodiments.
Figure 16B:
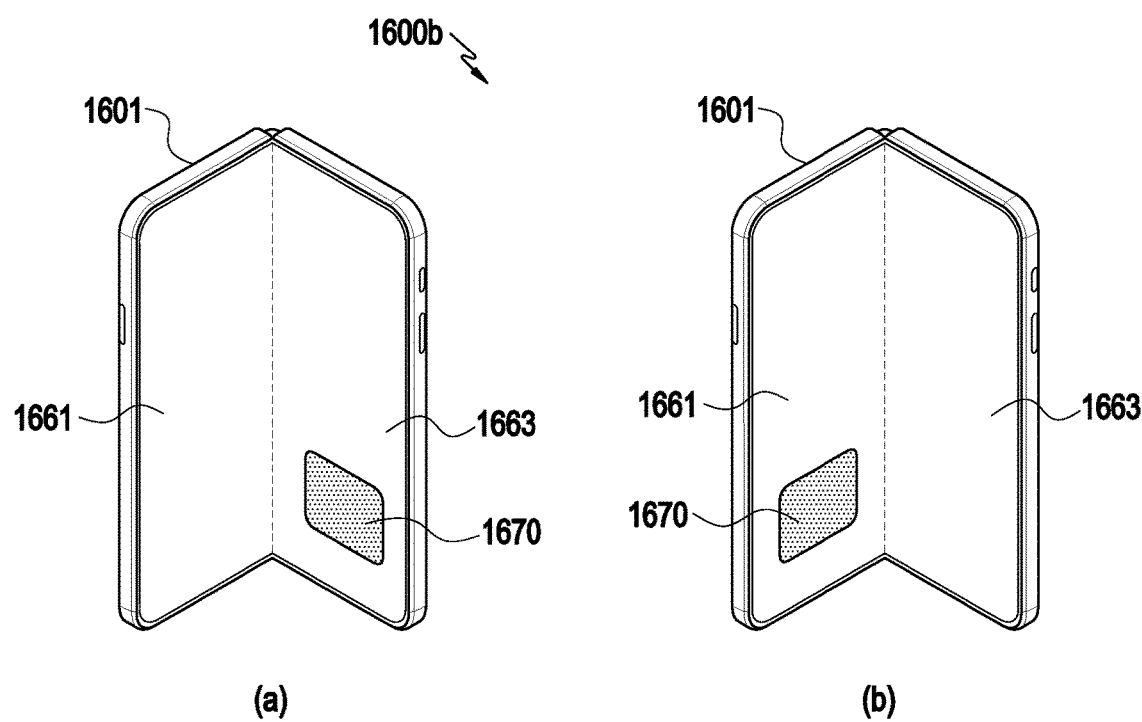
Figure 16C:
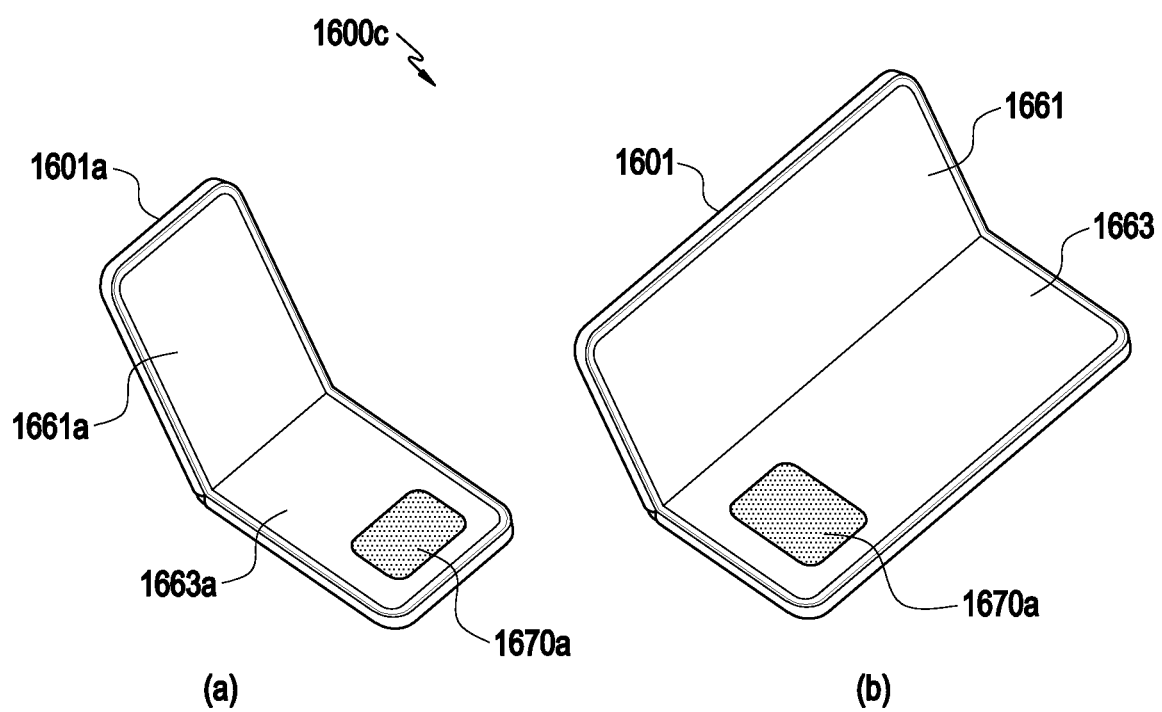

Drawings 1600a to 1600c in FIGS. 16A to 16C illustrate operations of providing a panel according to a holding state of an electronic device, in an electronic device according to various embodiments.

Referring to part (a) in FIG. 16A, when an electronic device 1601 identifies that the electronic device 1601 is in an out-folded state in a vertical direction in a landscape mode and a holding state (or a posture state) of the electronic device 1601 is a first holding state, by using sensor information received from a sensor module (e.g., the sensor module 376 of FIG. 3) of the electronic device, the electronic device 1601 may display an execution screen of a first application in a first display area 1661, and display, on the right side of a second display area 1663, a panel 1670 including multiple buttons for control of a system of the electronic device and the first application, upon a selection of a panel button displayed in a third display area.

Referring to part (b) of FIG. 16A, when the electronic device 1601 identifies that the electronic device 1601 is out-folded in a vertical direction in a landscape mode and a holding state (or a posture state) of the electronic device 1601 is a second holding state, by using sensor information received from a sensor module of the electronic device, the electronic device 1601 may display, on the right side of the second display area 1663, a panel 1670 including multiple buttons for control of a system of the electronic device and the first application displayed in the first display area 1661, upon a selection of a panel button displayed in the third display area.

Referring to part (a) of FIG. 16B, the electronic device 1601 may identify that the electronic device 1601 is in an in-folded state in a vertical direction in a landscape mode and a holding state (or a posture state) of the electronic device 1601 is a third holding state, by using sensor information received from a sensor module of the electronic device (e.g., a sensor module 376 of FIG. 3). When the electronic device 1601 identifies panel display configuration information for a right-handed user and identifies a selection of a panel button displayed in the third display area, the electronic device 1601 may display an execution screen of a first application in the first display area 1661, and display, at the lower side of the second display area 1663, a panel 1670 including multiple buttons for control of a system of the electronic device and the first application.

Referring to part (b) of FIG. 16B, the electronic device 1601 may identify that the electronic device 1601 is in in-folded state in a vertical direction in a landscape mode and a holding state (or a posture state) of the electronic device 1601 is a third holding state, by using sensor information received from a sensor module of the electronic device (e.g., a sensor module 376 of FIG. 3). When the electronic device 1601 may identify panel display configuration information for a left-handed user and identify a selection of a panel button displayed in the third display area, the electronic device 1601 may display an execution screen of a first application in the second display area 1663 and display, at the lower side of the first display area 1661, a panel 1670 including multiple buttons for control of a system of the electronic device and the first application.

Referring to part (a) of FIG. 16C, when an electronic device 1601a identifies that the electronic device 1601a is in an in-folded state in a vertical direction in a portrait mode and a holding state (or a posture state) of the electronic device 1601a is a fourth holding state, by using sensor information received from a sensor module of the electronic device (e.g., a sensor module 376 of FIG. 3), the electronic device 1601a may display an execution screen of a first application in a first display area 1661a and display, at the lower side of a second display area 1663a, a panel 1670a including multiple buttons for control for a system of the electronic device and the first application, upon a selection of a panel button displayed in a third display area.

Referring to part (b) of FIG. 16C, the electronic device 1601 may identify that the electronic device 1601 is in an in-folded state in a vertical direction in a landscape mode and a holding state (or a posture state) of the electronic device 1601 is a fourth holding state, by using sensor information received from a sensor module of the electronic device (e.g., a sensor module 376 of FIG. 3). The electronic device 1601 may identify display configuration information for a right-handed user, and based on detecting a selection of a panel button displayed in a third display area, the electronic device 1601 may display an execution screen of a first application in the first display area 1661 and display, on the left side of the second display area 1663, a panel 1670 including multiple buttons for control of a system of the electronic device and the first application.

Drawings 1700a to 1700f in FIG. 17A to 17F illustrate operations of providing a panel based on a selection of a panel button in a second state of an electronic device according to various embodiments.

Figure 17A:
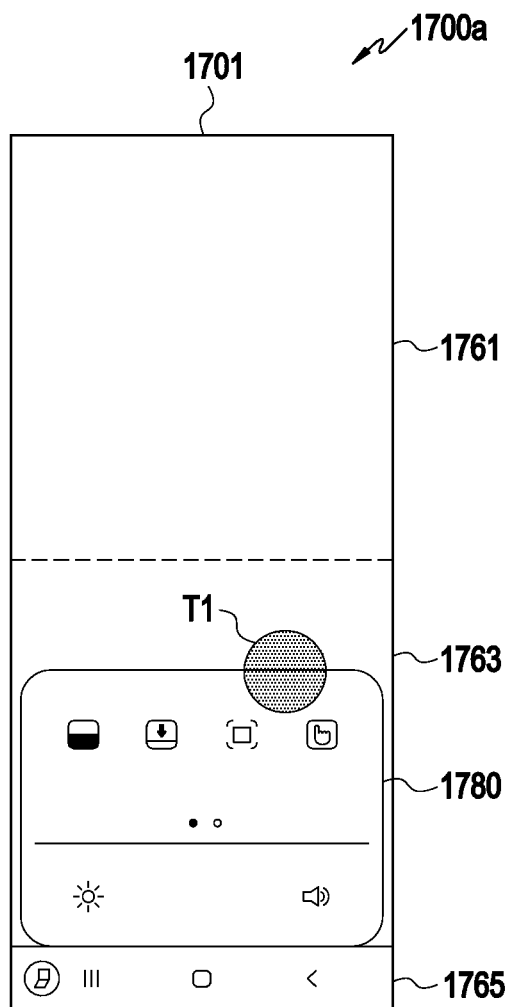
FIGS. 17A to 17F illustrate operations of providing a panel based on a selection of a panel button in a second state of an electronic device according to various embodiments.
Figure 17B:
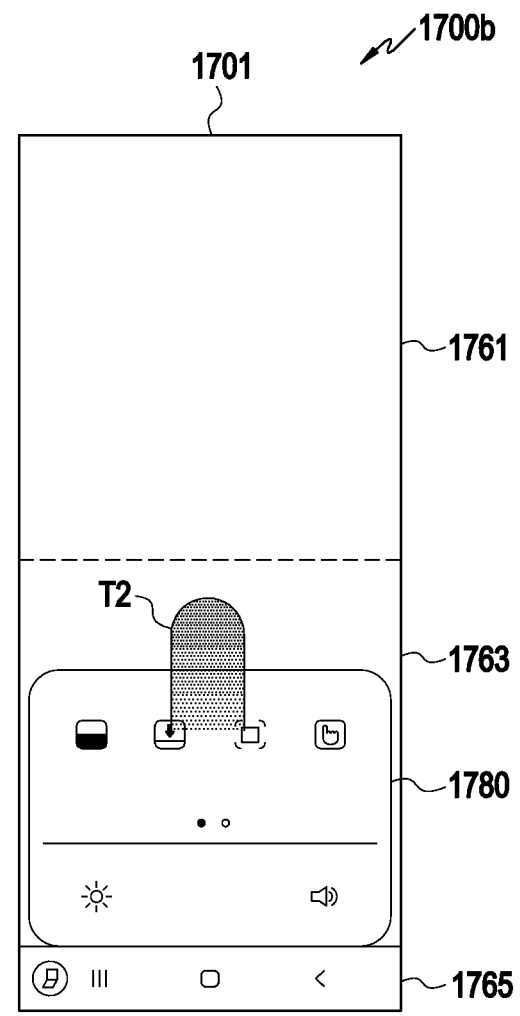
Figure 17C:
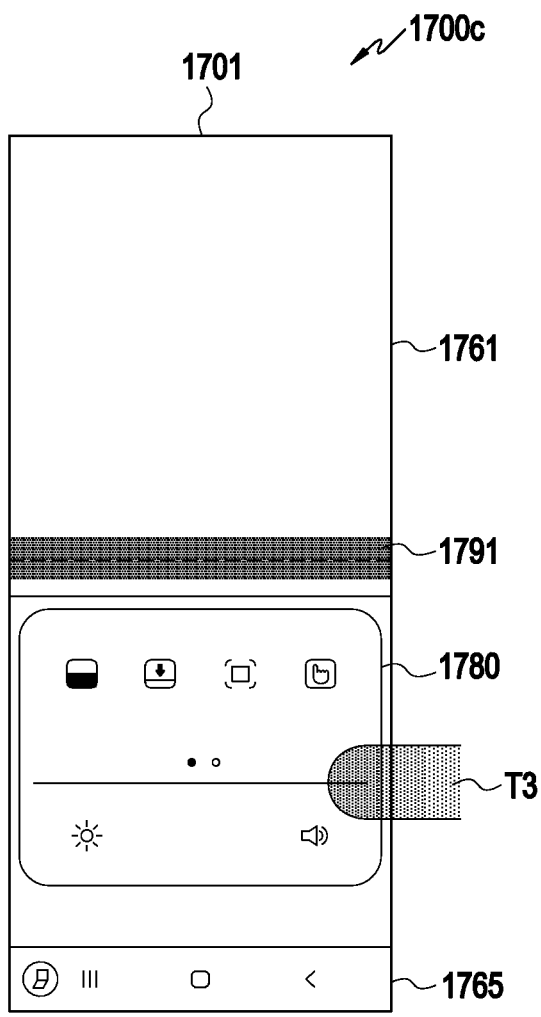

Referring to FIG. 17A, an electronic device 1701 (e.g., the electronic device 101 of FIG. 1, the electronic device 201 of FIGS. 2A to 2C, or the electronic device 301 of FIG. 3) may display an execution screen of a first application in a first display area 1761, and display, in a second display area 1763, a second panel 1780 including at least one common button (e.g., a screen up button, a notification button, a screen shot button, and a cursor button) which can be commonly used in all or a plurality of applications and at least one system button (a brightness adjustment button and a volume adjustment button) capable of controlling a system of the electronic device, based on a selection of a panel button in a second state (e.g., the second state of the electronic device 201 of FIG. 2B) in which the electronic device 1701 is folded in a vertical direction in a portrait mode and division into the first display area 1761 and the second display area 1763 is made. When detecting, an upper side drag operation T2 as shown in FIG. 17B after detection of a long touch T1 on the second panel 1780 displayed in a floating type in the second display area 1763, the electronic device 1701 may display the second panel 1780 by moving the same in the upper direction corresponding to the upper side drag operation as shown in FIG. 17C. As shown in FIG. 17C, when the upper side drag operation detected after the long touch deviates from the second display area 1763, the electronic device 1701 may display a visual alert 1791 indicating that deviation from the second display area 1763 is not allowed.

Figure 17D:
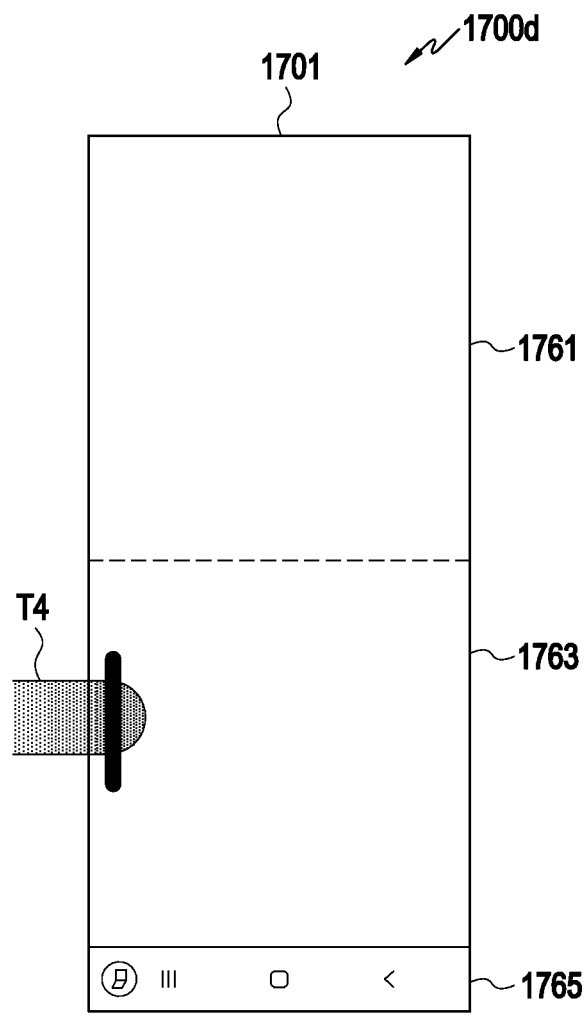

When detecting a flick operation in a left bezel direction of the second display area 1763 after a touch T3 on the second panel 1780 in FIG. 17C, the electronic device 1701 may perform a function of hiding the second panel 1780 as shown in FIG. 17D. When detecting a flick operation in a direction to the center of the second display area 1763 after a touch T4 on a left bezel of the second display area 1763 while hiding the second panel in FIG. 17D, the electronic device 1701 may display the hidden second panel again in the second display area 1763 as shown in FIG. 17E.

Figure 17E:
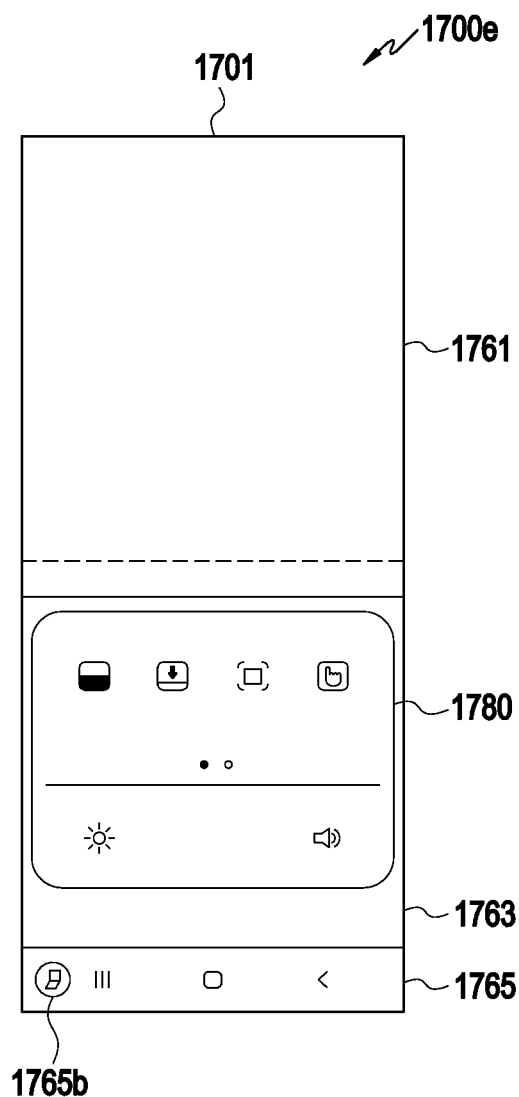
Figure 17F:
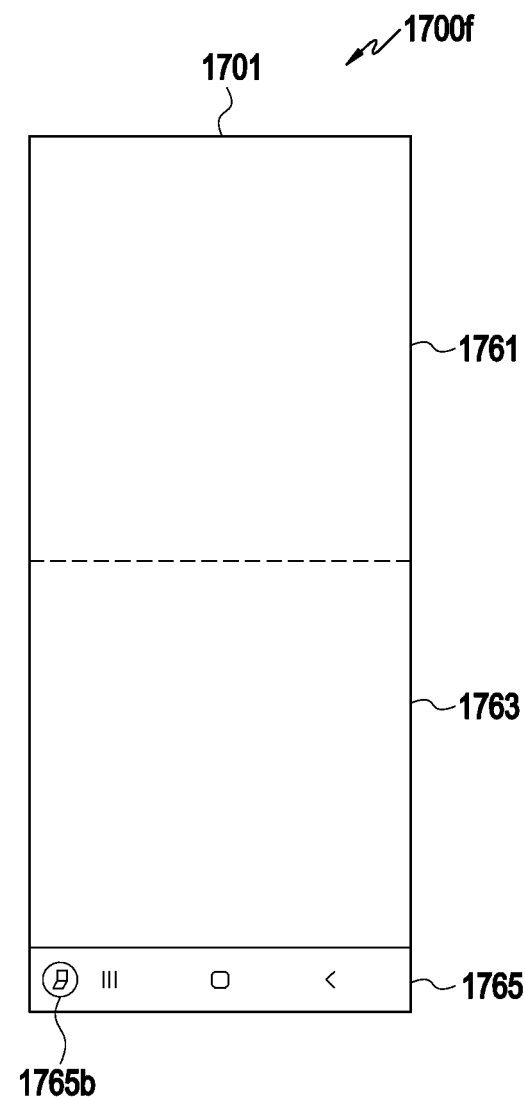

Based on detecting a selection of a panel button 1765b displayed in a third display area 1765 in FIG. 17E, the electronic device 1701 may store last position information of the second panel 1780 displayed in the second display area 1763 as shown in FIG. 17E and change the state to a second state (e.g., the second state of the electronic device 201 of FIG. 2B) in which no second panel 1780 is displayed in the second display area 1763 as shown in FIG. 17F. When identifying a selection of the panel button 1765b displayed in the third display area 1765 in the second state as shown in FIG. 17F, the electronic device 1701 may display the second panel 1780 in the second display area 1763, based on the last position information of the second panel as shown in FIG. 17E.

Drawings 1800a to 1800h in FIGS. 18A to 18H illustrate operations of providing a panel based on a selection of a panel button in a second state of an electronic device according to various embodiments.

Figure 18A:
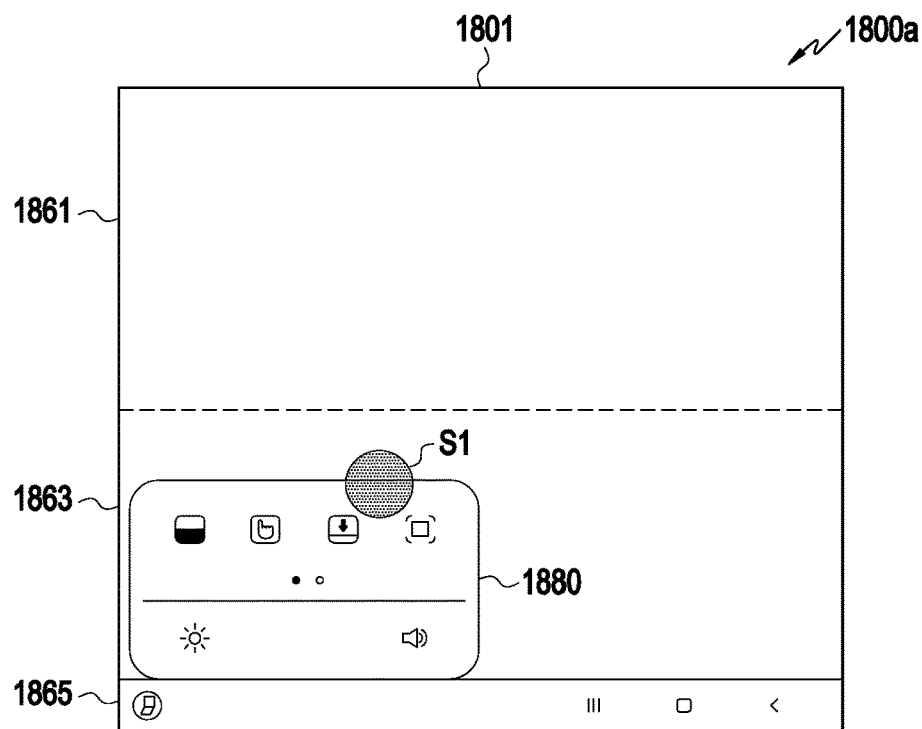
FIGS. 18A to 18H illustrate operations of providing a panel based on a selection of a panel button in a second state of an electronic device according to various embodiments.
Figure 18B:
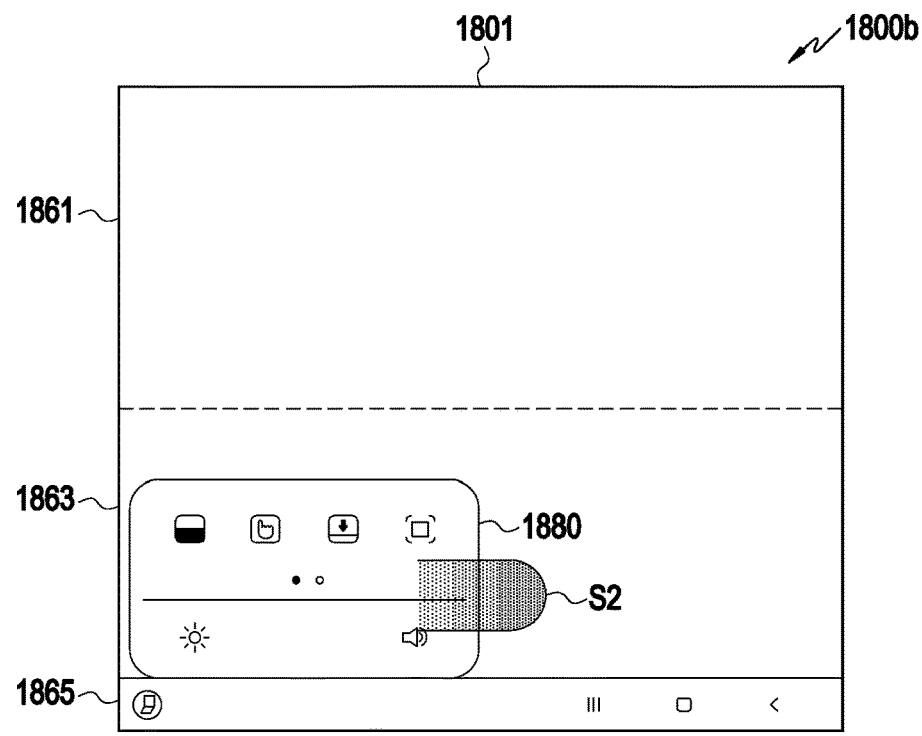
Figure 18C:
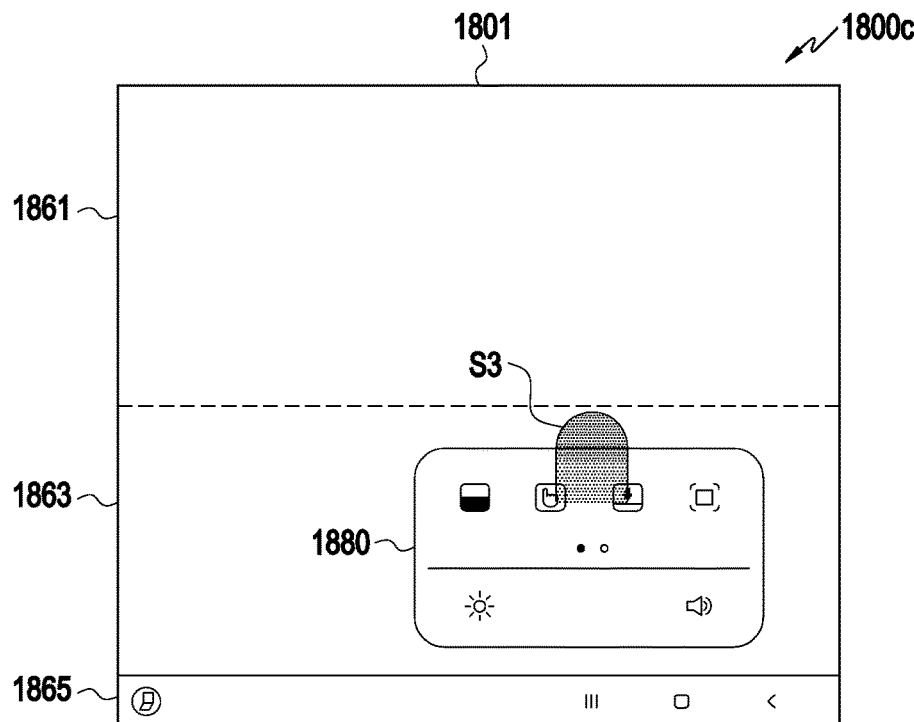
Figure 18D:
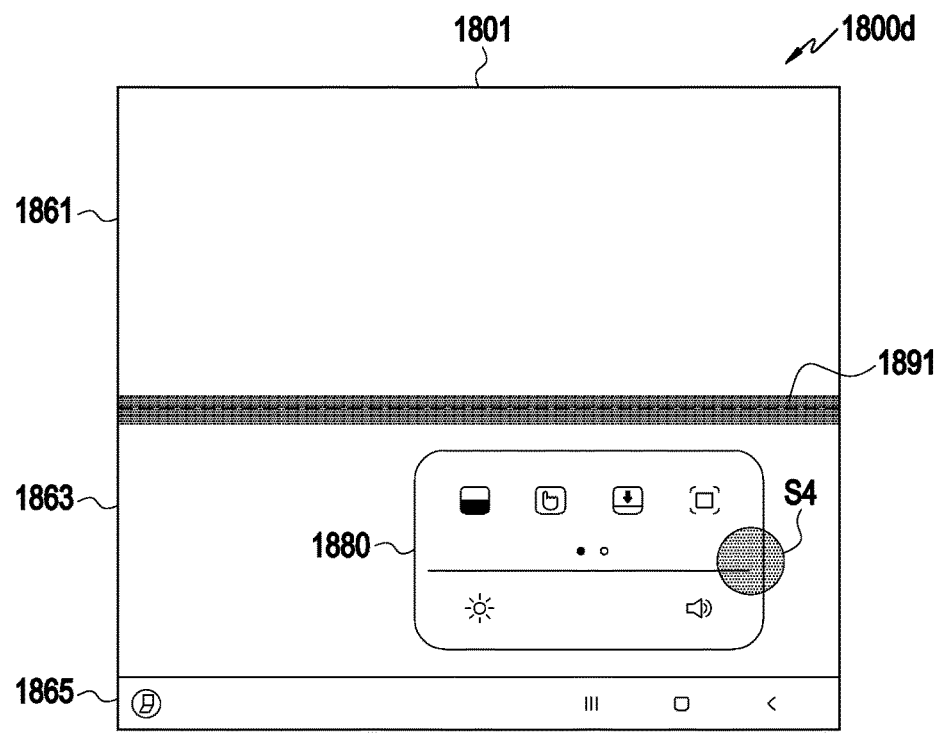

Referring to FIG. 18A, an electronic device 1801 (e.g., the electronic device 101 of FIG. 1, the electronic device 201 of FIGS. 2A to 2C, or the electronic device 301 of FIG. 3) may display an execution screen of a first application in a first display area 1861 and display, in a second display area 1863, a second panel 1880 including at least one common button (e.g., a screen up button, a notification button, a screen shot button, and a cursor button) which can be commonly used in all or a plurality of applications and at least one system button (a brightness adjustment button and a volume adjustment button) capable of controlling a system of the electronic device, based on a selection of a panel button in a second state (e.g., the second state of the electronic device 201 of FIG. 2B) in which the electronic device 1801 is folded in a vertical direction in a landscape mode and division into the first display area 1861 and the second display area 1863 is made. When detecting, a right side drag operation S2 as shown in FIG. 18B after detection of a long touch 51 on the second panel 1880 displayed in a floating type in the second display area 1863, the electronic device 1801 may display the second panel 1880 by moving the same in the right direction corresponding the right side drag operation as shown in FIG. 18C. When detecting the right drag operation followed by an upper side drag operation S3 of the second panel 1880 in FIG. 18C, the electronic device 1801 may display the second panel 1880 by moving the same in the upper direction corresponding to the upper side drag operation as shown in FIG. 18D. When the upper side drag operation S3 deviates from the second display area 1863 as shown in FIG. 18D, the electronic device 1801 may display a visual alert 1891 indicating that deviation from the second display area 1863 is not allowed.

Figure 18E:
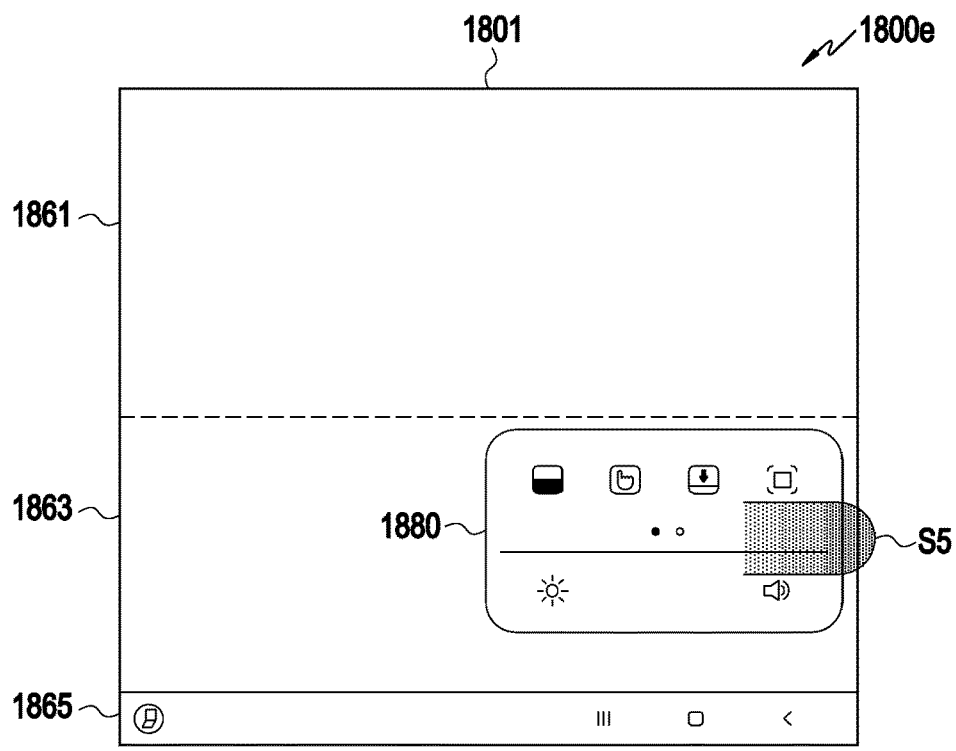
Figure 18F:
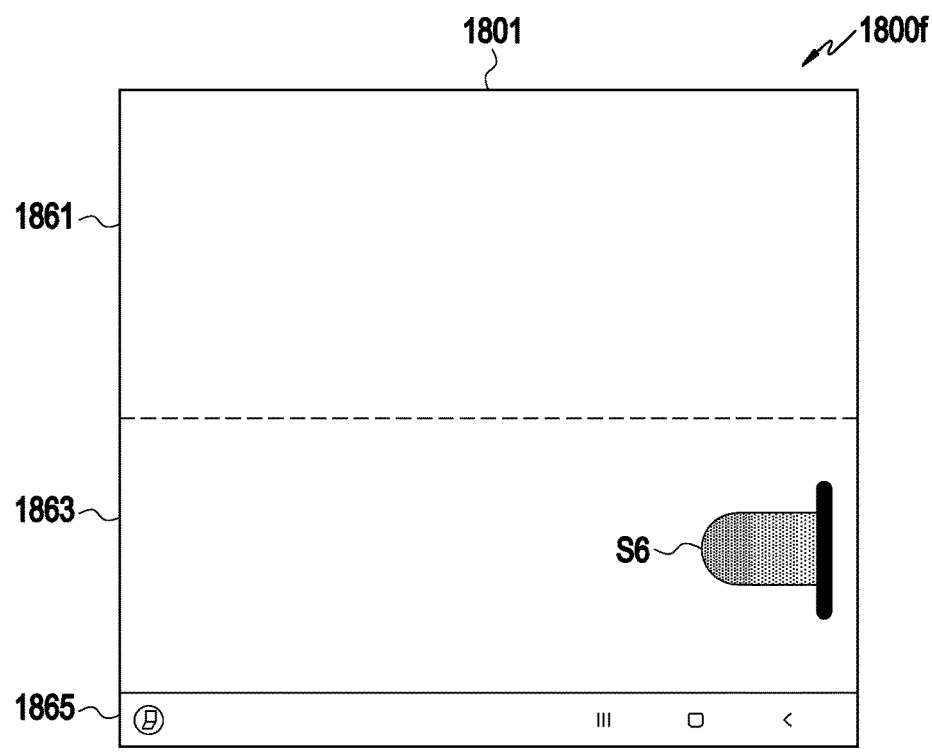

When detecting a flick operation S5 in a right bezel direction of the second display area 1863 as shown in FIG. 18E after detection of a touch S4 on the second panel 1880 in FIG. 18D, the electronic device 1801 may perform a function of hiding the second panel 1880 as shown in FIG. 18F. When detecting a flick operation S6 in a direction to the center of the second display area 1863 after a touch on a right bezel of the second display area 1863 while hiding the second panel in FIG. 18F, the electronic device 1801 may display the hidden second panel 1880 again in the second display area 1863 as shown in FIG. 18G.

Figure 18G:
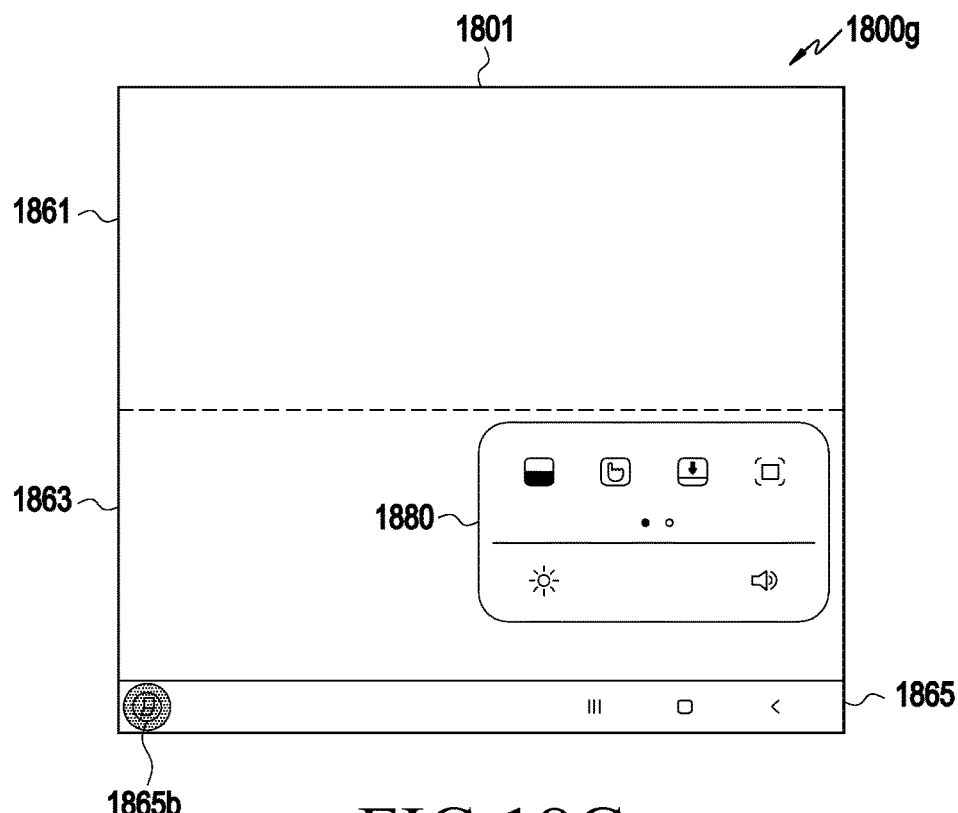
Figure 18H:
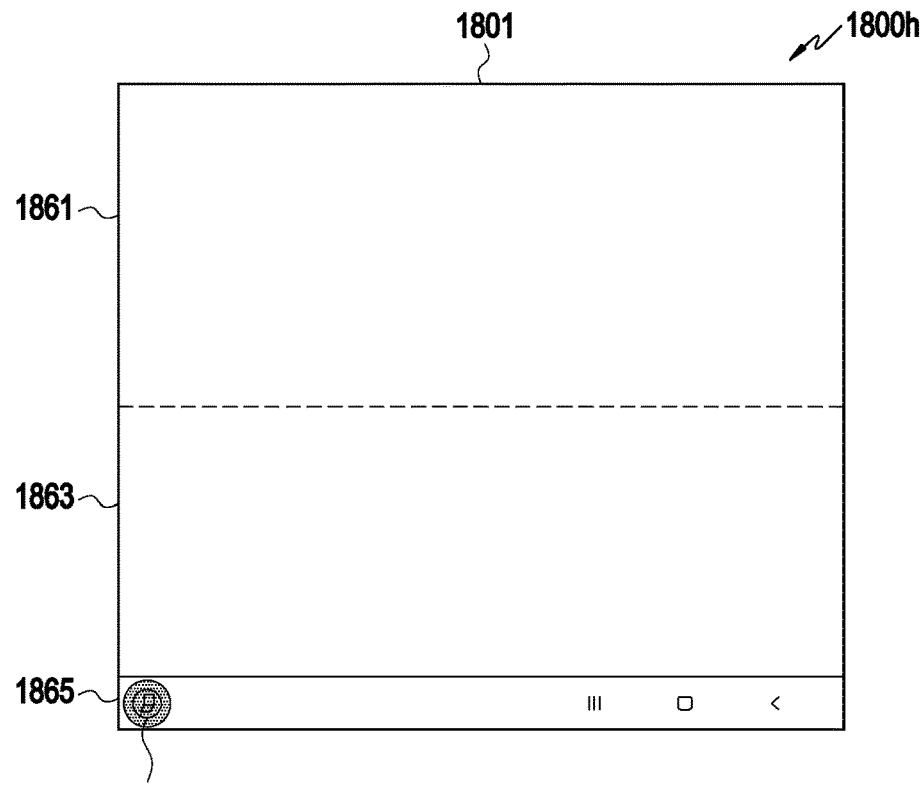

Based on detecting a selection on the panel button 1865b displayed in the third display area 1865 in FIG. 18G, the electronic device 1801 may store last position information of the second panel 1880 displayed in the second display area 1863 as shown in FIG. 18G, and may change the state to a second state (e.g., the second state of the electronic device 201 of FIG. 2B) in which no second panel 1880 is displayed in the second display area 1863 as shown in FIG. 18H. When identifying a selection of the panel button 1865b displayed in the third display area 1865 in the second state in FIG. 18H, the electronic device 1801 may display the second panel 1880 in the second display area 1863, based on the last position information of the second panel as shown in FIG. 18G.

Drawings 1900a and 1900j in FIGS. 19A to 19J illustrate operations of providing a panel based on a selection of a panel button in a second state of an electronic device, in an electronic device according to various embodiments.

Figure 19A:
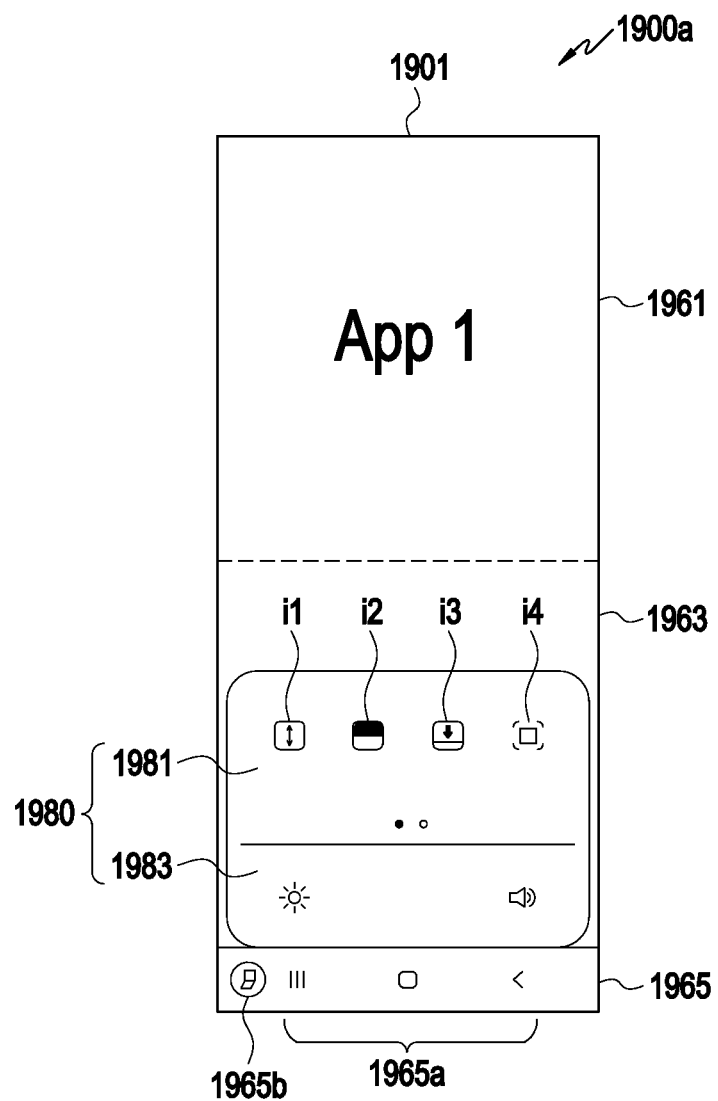

Referring to FIG. 19A, an electronic device 1901 (e.g., the electronic device 101 of FIG. 1, the electronic device 201 of FIGS. 2A to 2C, the electronic device 301 of FIG. 3) may display an execution screen of a first application in a first display area 1961 and display a second panel 1980 including a first area 1981 displaying, in a second display area 1963, at least one common button which can be commonly used in all or a plurality of applications and a second area 1983 displaying at least one system button (e.g., a brightness adjustment button and a volume adjustment button) capable of controlling a system of the electronic device, based on a selection of a panel button in a secondstate (e.g., the second state of the electronic device 201 of FIG. 2B) in which the electronic device 1901 is folded in a vertical direction in a portrait mode and division into the first display area 1961 and the second display area 1963 is made. The electronic device 1901 may include, in the first area 1981 of the second panel 1980, an application list view button i1, a screen up button i2, a notification button i3, and a screen shot button i4 as at least one common button.

Figure 19D:
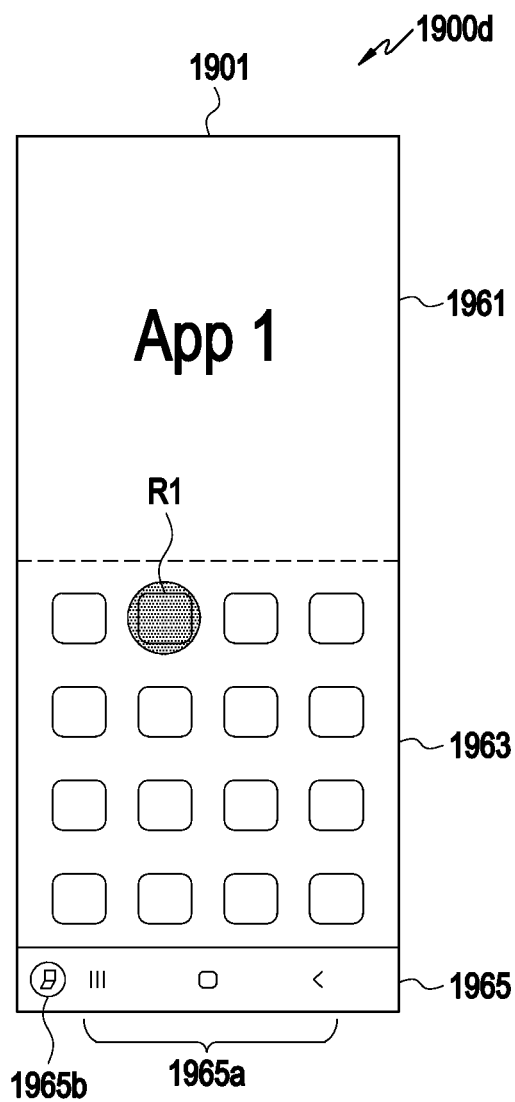
Figure 19E:
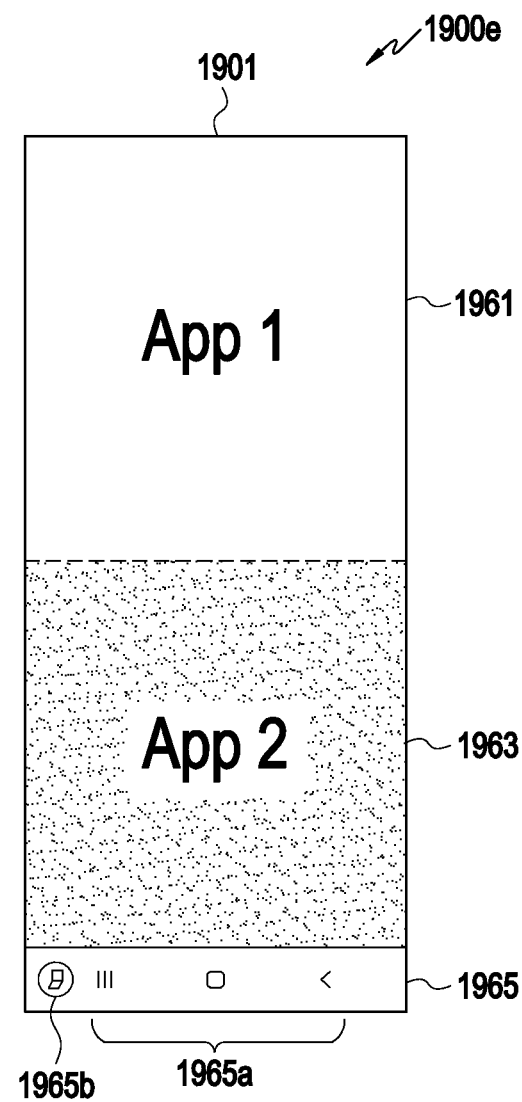

Based on detecting a selection of the screen up button i2 displayed in the first area 1981 of the second panel 1980 in FIG. 19A, the electronic device 1901 may adjust the brightness of each of multiple buttons included in the second panel in order to process and display the second panel in gray as shown in FIG. 19B. Based on detecting a selection of a panel button 1965b displayed in the third display area 1965 in FIG. 19B, the electronic device 1901 may display the second panel 1980 including multiple buttons as shown in FIG. 19C. Based on detecting a selection of the application list view button i1 displayed in the first area 1981 of the second panel 1980 in FIG. 19C, the electronic device 1901 may display, in the second display area 1963, an application list including types of applications stored in the electronic device 1901 as shown in FIG. 19D. Based on detecting a selection R1 of a second application from the application list as shown in FIG. 19E, the electronic device 1901 may display an execution screen of the second application in the second display area 1963 while displaying the execution screen of the first application in the first display area 1961 as shown in FIG. 19E. Based on detecting a selection of the panel button 1965a displayed in the third display area 1965 in FIG. 19E, the electronic device 1901 may display the second panel 1980 in the second display area 1963 as shown in FIG. 19F. Based on detecting a selection of the application list view button it displayed in the first area 1981 of the second panel 1980 in FIG. 19F, the electronic device 1901 may display an application list including types of applications stored in the electronic device 1901, in the second display area 1963 as shown in FIG. 19G. Based on detecting a selection R2 of a third application from the application list, the electronic device 1901 may display an execution screen of the third application in the second display area 1963 while displaying the execution screen of the first application in the first display area 1961 as shown in FIG. 19H. In FIG. 19H, the electronic device 1901 may identify a selection (focus) of the third application displayed in the second display area 1963 while displaying the execution screen of the first application in the first display area 1961 and displaying the execution screen of the third application in the second display area 1963, and may determine whether to display the first panel or the second panel, based on the type of the third application. When identifying that the third application corresponds to an application for a display of the first panel, the electronic device 1901 may display the execution screen of the selected third application in the first display area 1901 and display, in the second display area 1963, a first panel 1970 (e.g., a video panel) including a first area 1971 displaying at least one control button (e.g., a previous video playback button, a playback/stop button, a next video playback button, and a next panel view button) for control of the third application (e.g., a video application), and a second area 1973 displaying at least one system button (e.g., a brightness adjustment button and a volume adjustment button) for control of a system of the electronic device, as shown in FIG. 19I.

Figure 19J:
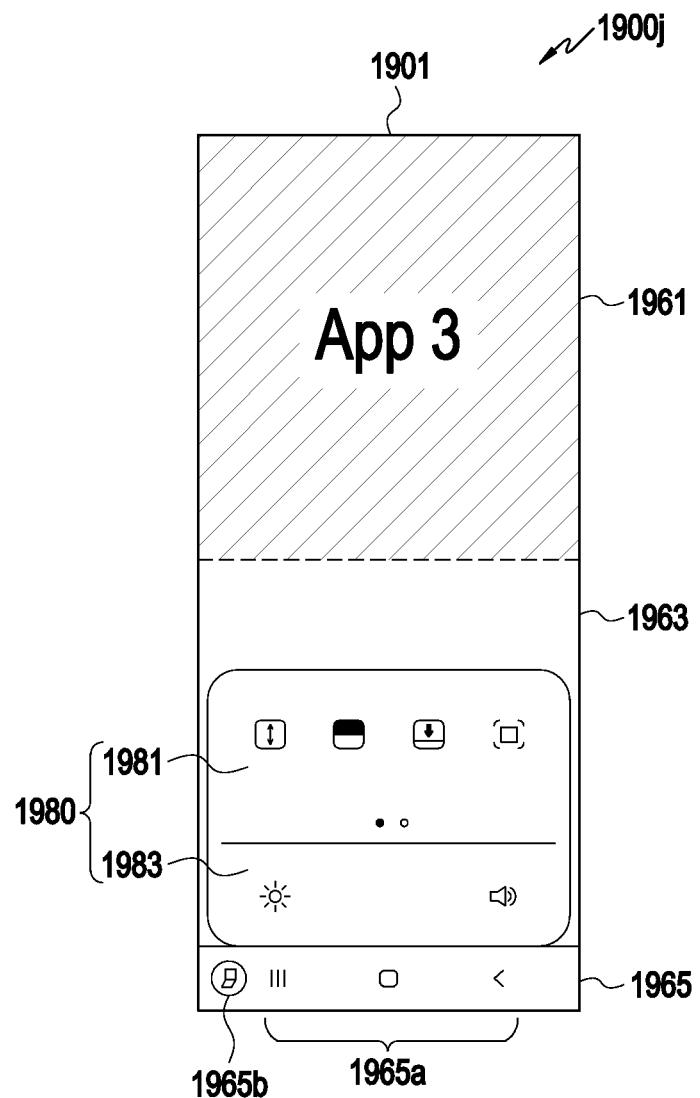

When identifying that the third application corresponds to an application for a display of the second panel, the electronic device 1901 may display the execution screen of the selected third application in the first display area 1901 and display, in the second display area 1963, a second panel 1980 including a first area 1981 displaying at least one common button which can be commonly used in all or a plurality of applications and a second area 1983 displaying at least one system button (e.g., a brightness adjustment button and a volume adjustment button) capable of controlling a system of the electronic device, as shown in FIG. 19J.

Drawings 2000a to 2000f in FIGS. 20A to 20F illustrate operations of providing a panel based on a selection of a panel button in a second state of an electronic device, in an electronic device according to various embodiments.

Figure 20A:
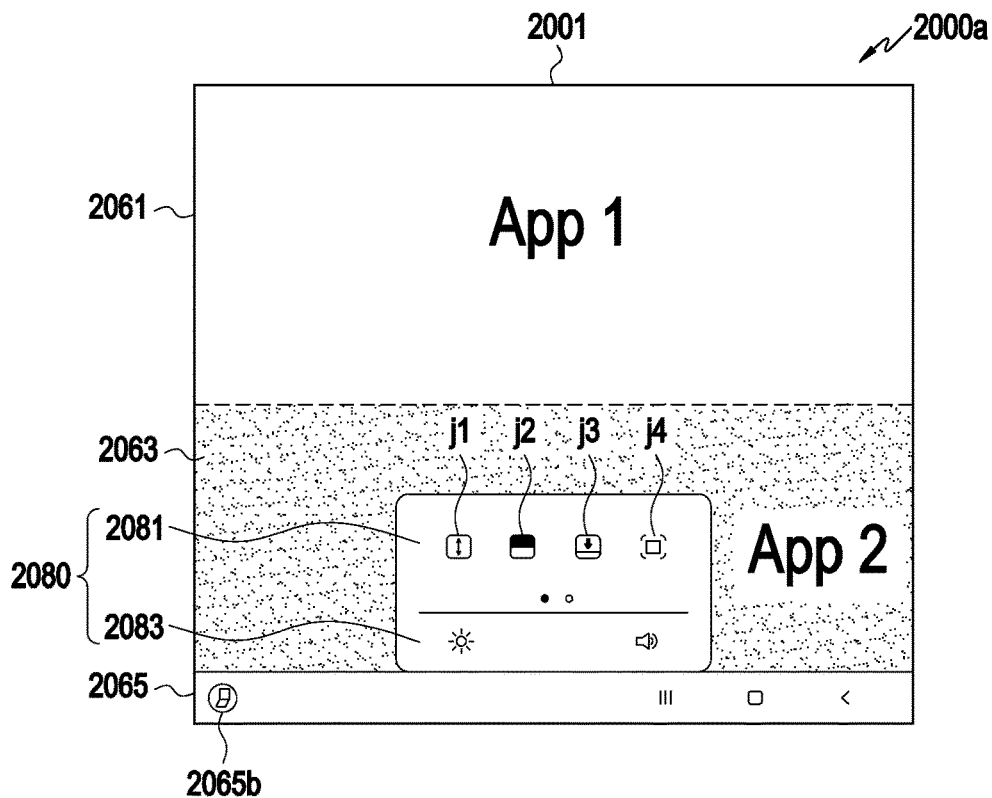
FIGS. 20A to 20F illustrate operations of providing a panel based on a selection of a panel button in a second state of an electronic device, in an electronic device according to various embodiments.

Referring to FIG. 20A, when an electronic device 2001 (e.g., the electronic device 101 of FIG. 1, the electronic device 201 of FIGS. 2A to 2C, or the electronic device 301 of FIG. 3) identifies a selection of a panel button 2065b displayed in a third display area 2065 while displaying an execution screen of a first application in a first display area 2061 and displaying an execution screen of a second application in a second display area 2063, based on a selection of a panel button in a second state in which the electronic device 2001 is folded in a vertical direction in a landscape mode and division into the first display area 2061 and the second display area 2063 is made, the electronic device 2001 may display a second panel 2080 including a first area 2081 displaying at least one common button (e.g., an application list view button j1, a screen up button j2, a notification button j3, and a screen shot button j4) which can be commonly used in all or a plurality of applications and a second area 2083 displaying at least one system button (e.g., a brightness adjustment button and a volume adjustment button) capable of controlling a system of the electronic device, so that the second panel 2080 and the second application displayed in the second display area 2063 overlap with each other.

Figure 20B:
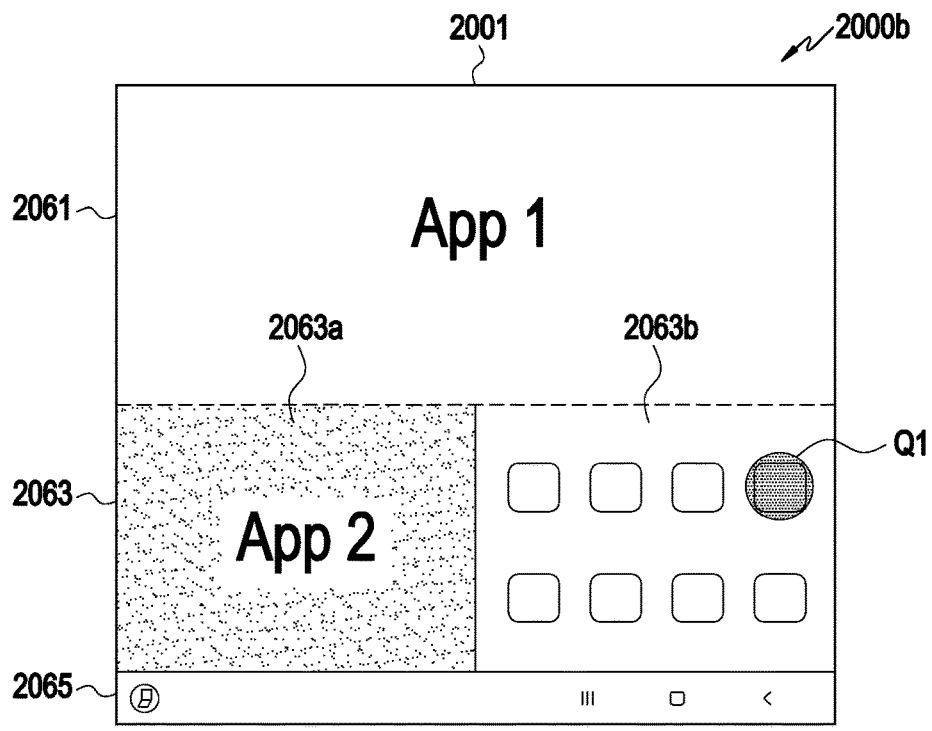

Based on detecting a selection of the application list view button j1 displayed in the first area 2081 of the second panel 2080 in FIG. 20A, the electronic device 2001 may divide the second display area 2063 into a first area 2063*a* and a second area 2063*b*, display the execution screen of the second application in the first area 2063*a* of the second display area 2063, and display, in the second area 2063*b* of the second display area 2063, an application list including types of applications stored in the electronic device 2001, as shown in FIG. 20B. Based on detecting a selection Q1 of a third application from the application list, the electronic device 2001 may display the execution screen of the second application in the first area 2063*a* of the second display area 2063 and display the execution screen of the selected third application in the second application 2063*b* of the second display area 2063 while displaying the execution screen of the first application in the first display area 2061, as shown in FIG. 20C.

Figure 20C:
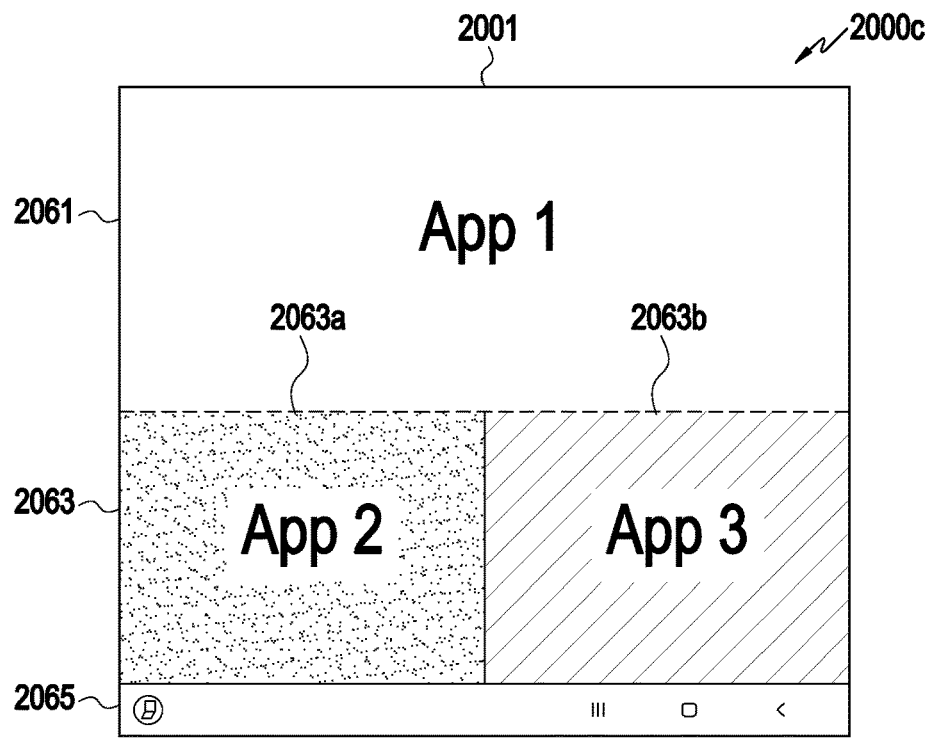
Figure 20D:
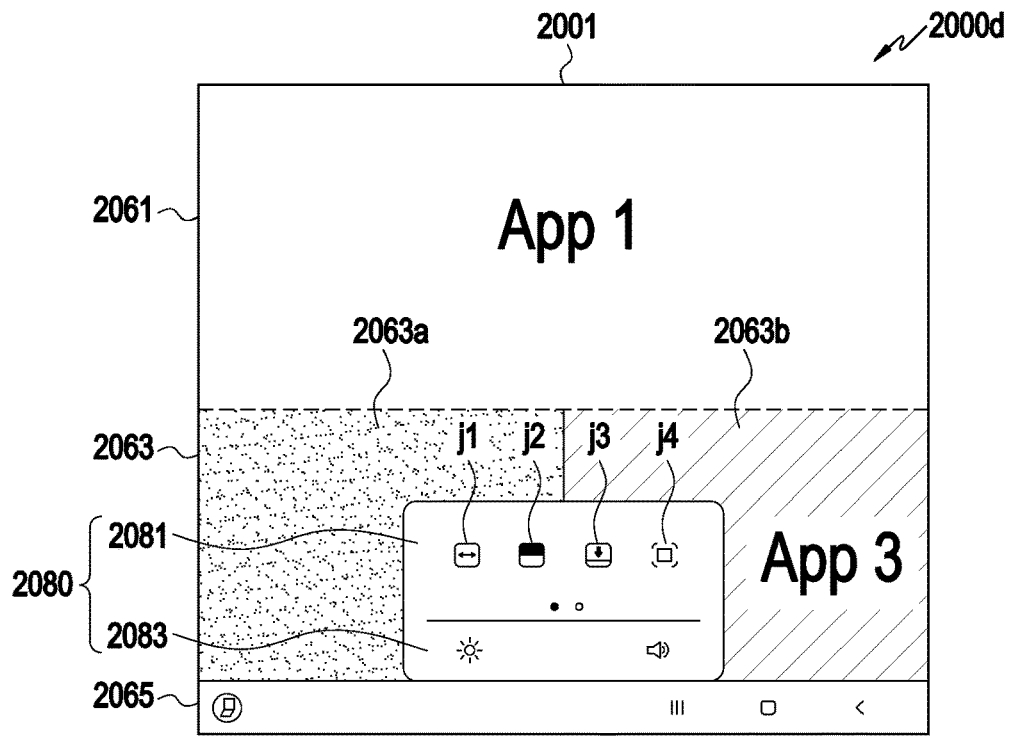

Based on detecting a selection of a panel button 2065*b* displayed in the third display area 2065 in FIG. 20C, the electronic device 2001 may display a second panel 2080 including a first area 2081 displaying at least one common button (e.g., an application list view button j1, a screen up button j2, a notification button j3, and a screen shot button j4) which can be commonly used in all or a plurality of applications and a second area 2083 displaying at least one system button (e.g., a brightness adjustment button and a volume adjustment button) capable of controlling a system of the electronic device, so that the second panel 2080 overlaps with a part of the second application and a part of the third application, displayed in the second display area 2063, as shown in FIG. 20D.

Figure 20E:
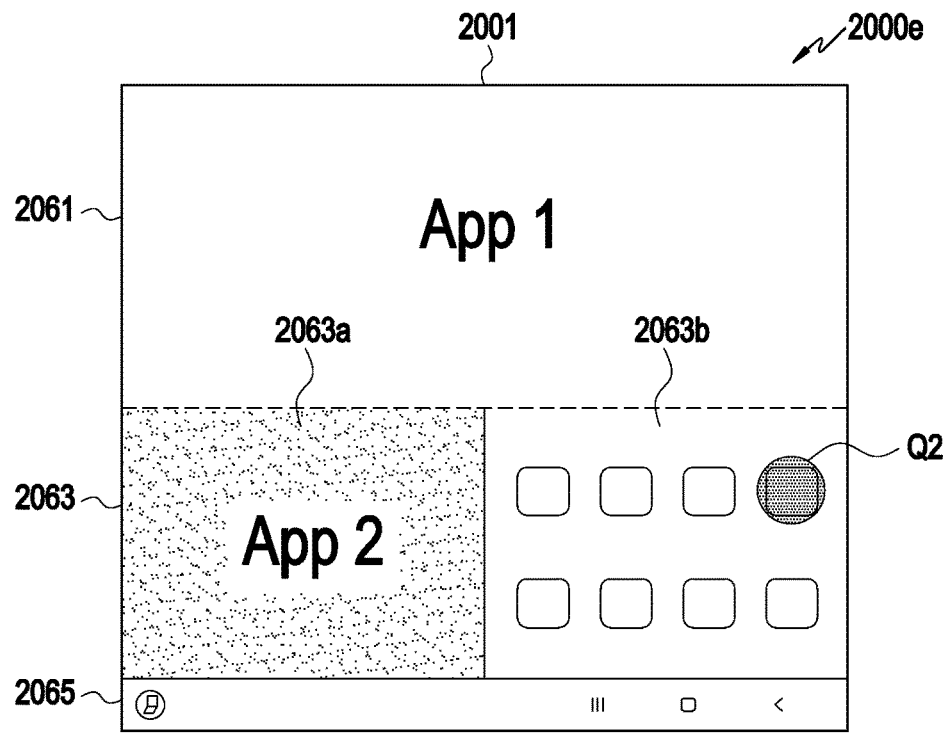
Figure 20F:
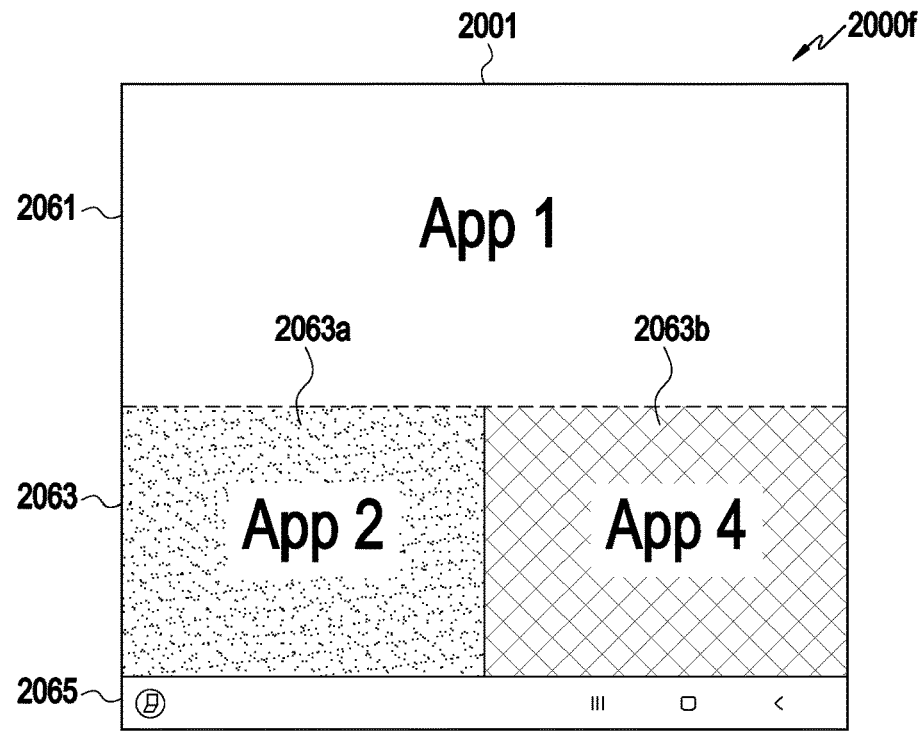

Based on detecting a selection of the application list view button j1 displayed in the first area 2081 of the second panel 2080 in FIG. 20D, the electronic device 2001 may divide the second display area 2063 into a first area 2063*a* and a second area 2063*b*, display the execution screen of the second application in the first area 2063*a* of the second display area 2063, and display, in the second area 2063*b* of the second display area 2063, the application list including types of applications stored in the electronic device 2001, as shown in FIG. 20E. Based on detecting a selection Q2 of a fourth application from the application list, the electronic device 2001 may display the execution screen of the second application in the first area 2063*a* of the second display area 2063 and display the execution screen of the selected fourth application in the second area 2063*b* of the second display area 2063 while displaying the execution screen of the first application in the first display area 2061, as shown in FIG. 20F.

Drawings 2100*a* to 2100*i* in FIGS. 21A to 21I illustrate operations of providing a panel based on a selection of a panel button in a second state of an electronic device, in an electronic device according to various embodiments.

Figure 21A:
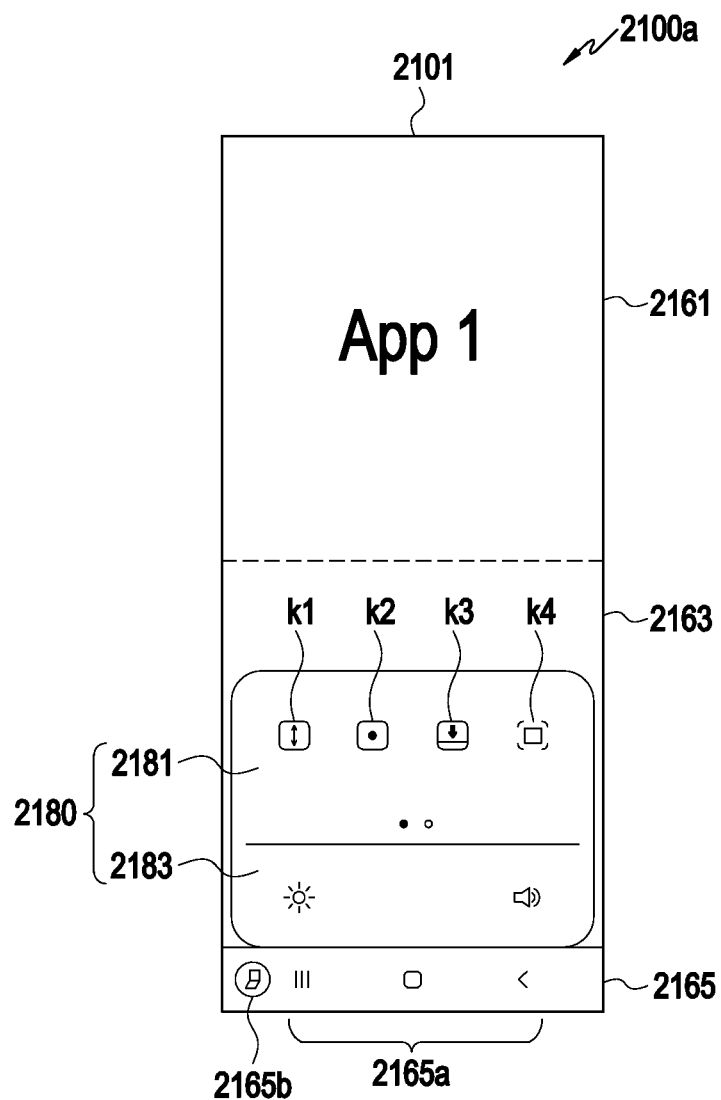

Referring to FIG. 21A, an electronic device 2101 (e.g., the electronic device 101 of FIG. 1, the electronic device 201 of FIGS. 2A to 2C, or the electronic device 301 of FIG. 3) may display an execution screen of a first application in a first display area 2161 and display, in a second display area 2163, a second panel 2180 including a first area 2181 displaying at least one common button (e.g., an application list view button k1, a touch pad button k2, a notification button k3, and a screen shot button k4) which can be commonly used in all or a plurality of applications and a second area 2183 displaying at least one system button (e.g., a brightness adjustment button and a volume adjustment volume) capable of controlling a system of the electronic device, based on a selection of a panel button in a second state (e.g., the second state of the electronic device 201 of FIG. 2B) in which the electronic device 2101 is folded and division into the first display area 2161 and the second display area 2163 is made.

Figure 21B:
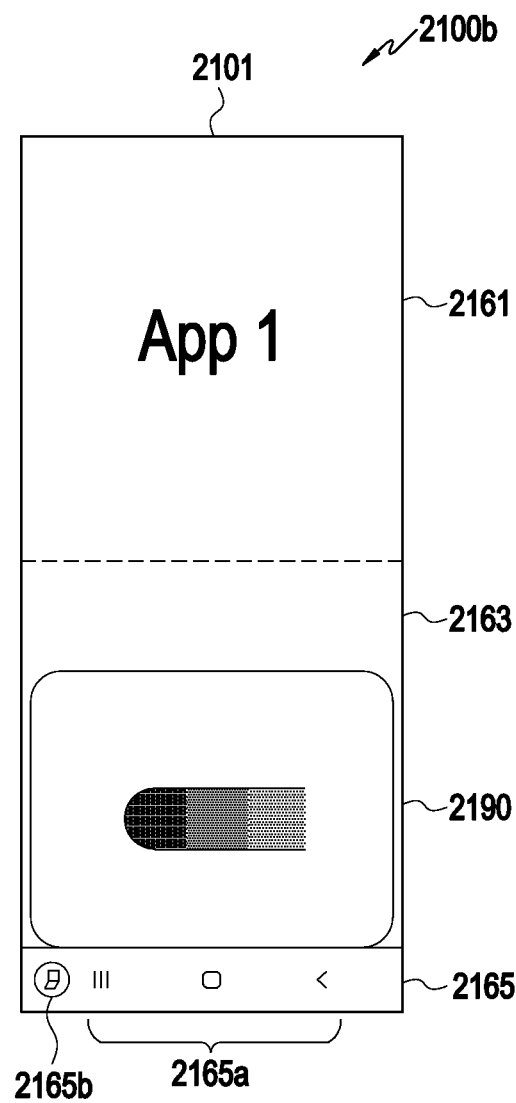

Based on detecting a selection of the touch pad button k2 displayed in the first area 2181 of the second panel 2180 in FIG. 21A, the electronic device 2101 may display a control icon 2191 capable of controlling a first application in the first display area 2161 and display a touch pad panel 2190 in the second display area 2163 as shown in FIG. 21B. When detecting a drag operation in the touch pad panel 2190 displayed in the second display area 2163 in FIG. 21B, the electronic device 2101 may perform a function corresponding to the drag operation, for example, a function of moving the control icon displayed in the first display area 2161 in order to correspond to the direction of the drag operation.

Figure 21C:
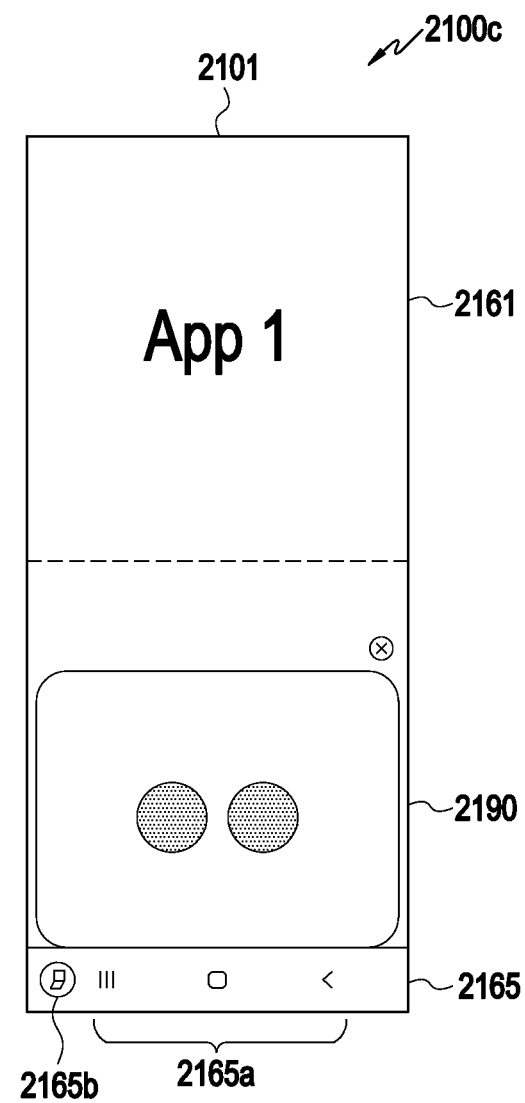

When detecting a multi-touch operation from the touch pad panel 2190 displayed in the second display area 2163 as shown in FIG. 21C, the electronic device 2101 may perform a function corresponding to the multi-touch operation, for example, a function of opening a menu item according to a situation.

Figure 21D:
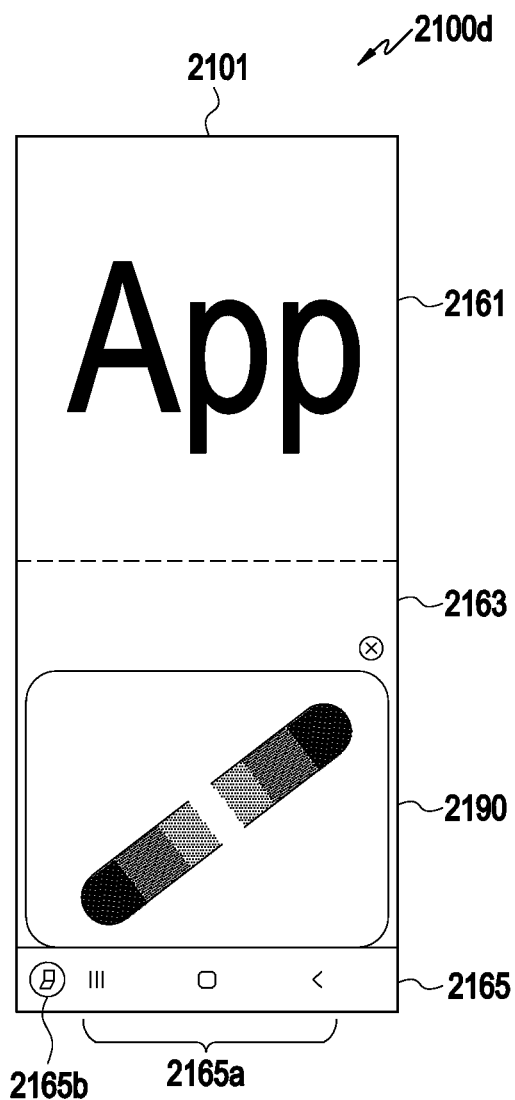

When detecting a pinch zoom-in operation from the touch pad panel 2190 displayed in the second display area 2163 as shown in FIG. 21D, the electronic device 2101 may perform a function corresponding to the pinch zoom-in operation, for example, a function of expanding a screen of the execution of the first application displayed in the first display area 2161.

Figure 21E:
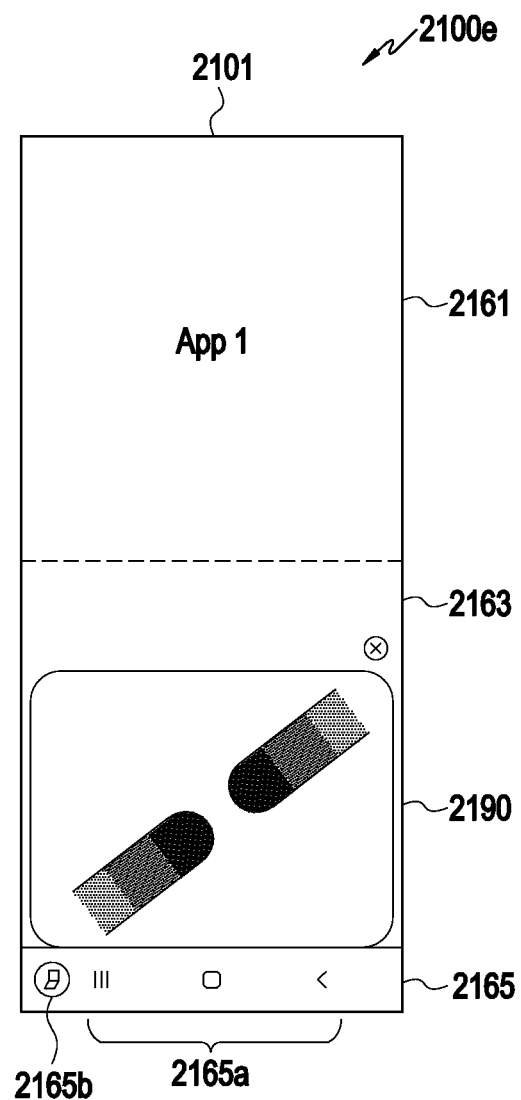

When detecting a pinch zoom-out operation from the touch pad panel 2190 displayed in the second display area 2163 as shown in FIG. 21E, the electronic device 2101 may perform a function corresponding to the pinch zoom-out operation, for example, a function of reducing a screen of the execution of the first application displayed in the first display area 2161.

Figures 21F, 21G:
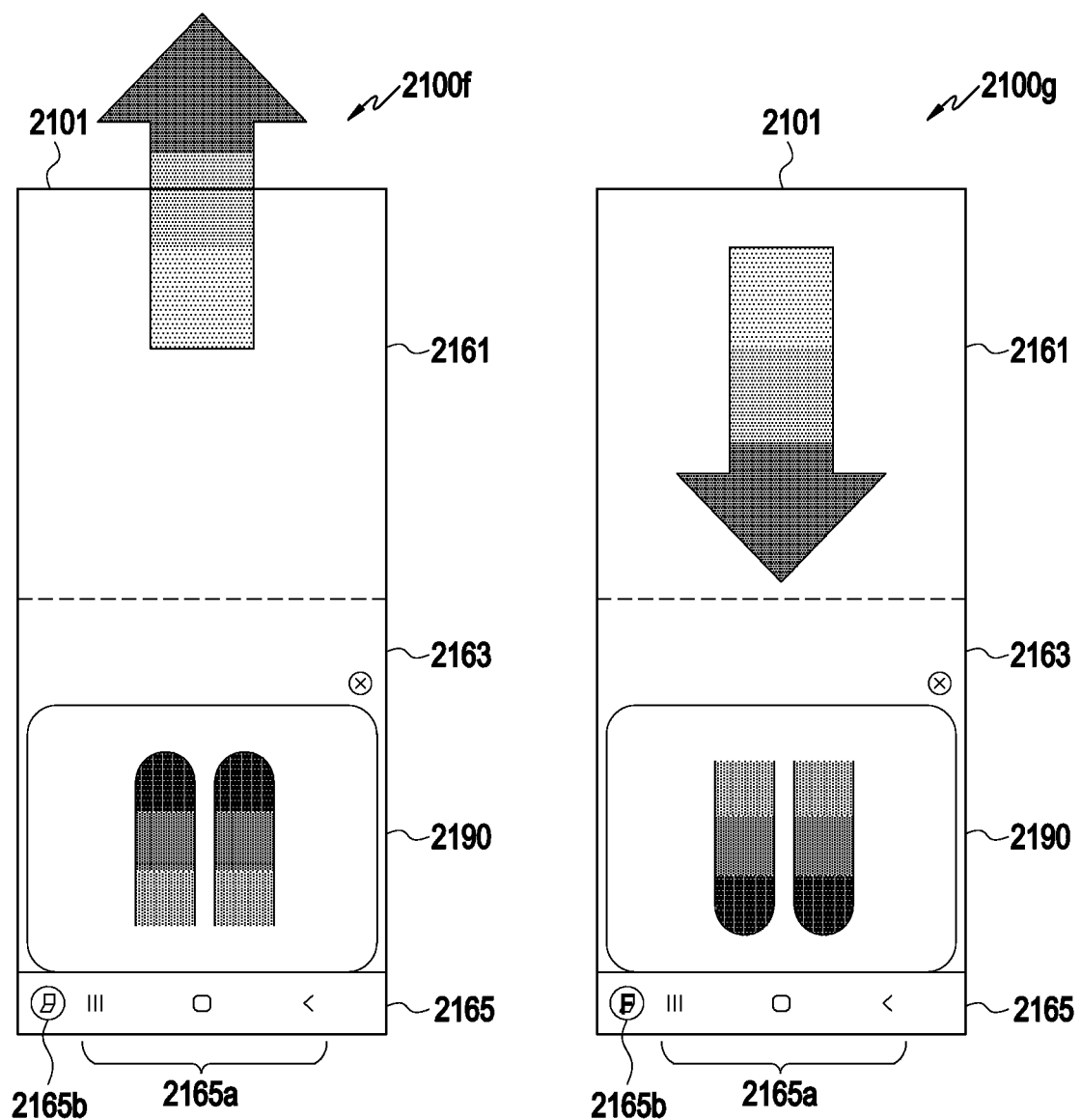

When detecting a drag operation in the upper direction by using a multi-touch on the touch pad panel 2190 displayed in the second display area 2163 as shown in FIG. 21F, the electronic device 2101 may perform a function corresponding to the drag operation in the upper direction by using the multi-touch, for example, a function of upwardly moving a screen of the execution of the first application displayed in the first display area 2161.

When detecting a drag operation in the lower direction by using a multi-touch on the touch pad panel 2190 displayed in the second display area 2163 as shown in FIG. 21G, the electronic device 2101 may perform a function corresponding to the drag operation in the lower direction by using the multi-touch, for example, a function of downwardly moving a screen of the execution of the first application displayed in the first display area 2161.

When detecting a drag operation in the right direction by using a multi-touch on the touch pad panel 2190 displayed in the second display area 2163 as shown in FIG. 21H, the electronic device 2101 may perform a function corresponding to the drag operation in the right direction by using the multi-touch, for example, a function of moving, to the right side, a screen of the execution of the first application displayed in the first display area 2161.

When detecting a drag operation in the left direction by using a multi-touch on the touch pad panel 2190 displayed in the second display area 2163 as shown in FIG. 21I, the electronic device 2101 may perform a function corresponding to the drag operation in the left direction by using the multi-touch, for example, a function of moving, to the left side, a screen of the execution of the first application displayed in the first display area 2161.

Drawings 2200a to 2200d in FIGS. 22A to 22D illustrate operations of providing of a panel based on a selection of a panel button in a second state of an electronic device, in an electronic device according to various embodiments.

Referring to FIG. 22A, an electronic device 2201 (e.g., the electronic device 101 of FIG. 1, the electronic device 201 of FIGS. 2A to 2C, or the electronic device 301 of FIG. 3) may display an execution screen of a first application in a first display area 2261 and display, in a second display area 2263, a second panel 2280 including a first area 2281 displaying at least one common button (e.g., a screen up button, 11, a notification button 12, a screen shot button 13, and a cursor button 14) which can be commonly used in all or a plurality of applications and a second area 2283 displaying at least one system button (e.g., a brightness adjustment button and a volume adjustment button) capable of controlling a system of the electronic device, based on a selection of a panel button in a second state (e.g., the second state of the electronic device 201 of FIG. 2B) in which the electronic device 2201 is folded and division into the first display area 2261 and the second display area 2263 is made.

Based on detecting a selection of the cursor button 14 displayed in the first area 2281 of the second panel 2280 in FIG. 22A, the electronic device 2201 may display a cursor icon 2291 capable of controlling a first application in the first display area 2261 and display a cursor function panel 2290 including a scroll up/down button 2293 in the second display area 2263, as shown in FIG. 22B. When detecting a drag operation from the cursor function panel 2290 displayed in the second display area 2263 as shown in FIG. 22B, the electronic device 2201 may perform a function corresponding to the drag operation, for example, a function of moving a cursor icon 2291 displayed in the first display area 2261 in order to correspond to the direction of the drag operation.

Figure 22C:
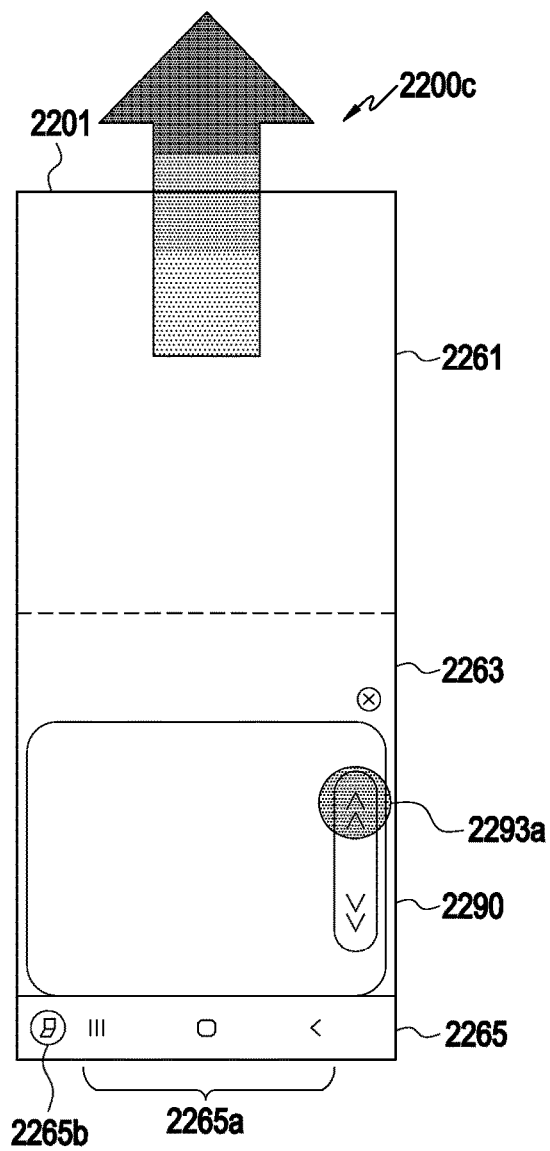

Based on detecting a selection of the scroll up button 2293a from the scroll up/down button 2293 included in the cursor function panel 2290 displayed in the second display area 2263 as shown in FIG. 22C, the electronic device 2201 may perform a function corresponding to the selection of the scroll up button 2293a, for example, a function of upwardly moving a screen of the execution of the first application displayed in the first display area 2261.

Figure 22D:
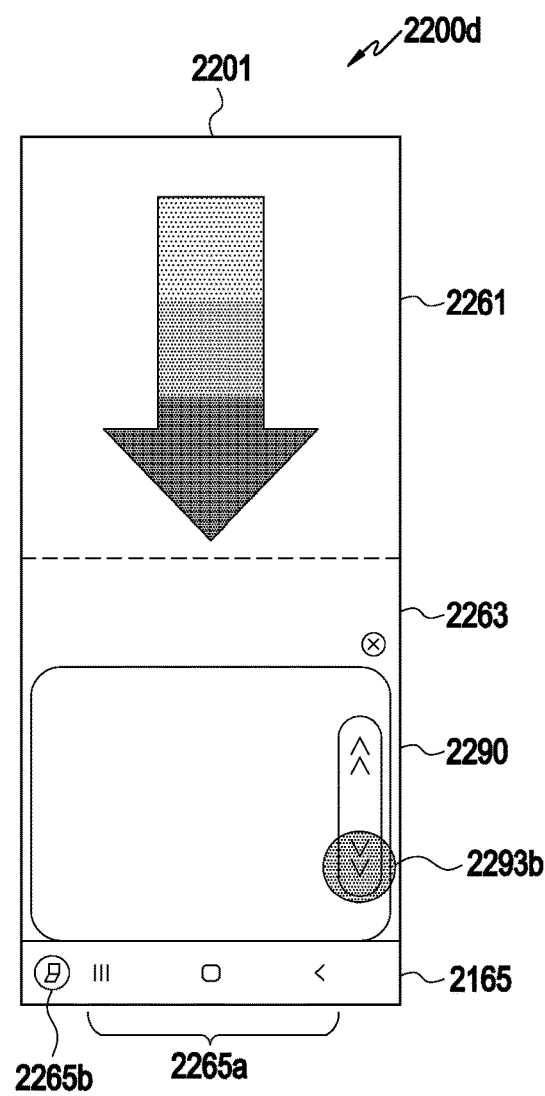

Based on detecting a selection of a scroll down button 2293b from the scroll up/down button 2293 included in the cursor function panel 2290 displayed in the second display area 2263 as shown in FIG. 22D, the electronic device 2201 may perform a function corresponding to the selection of the scroll down button 2293b, for example, a function of downwardly moving a screen of the execution of the first application displayed in the first display area 2261.

According to various embodiments, an electronic device (e.g., the electronic device 301 of FIG. 3) may include a first housing (e.g., the first housing 271 of FIG. 2A), a second housing (e.g., the second housing 274 of FIG. 2A), a hinge (e.g., the hinge 281 of FIG. 2A) configured to foldably connect a side of the first housing to a side of the second housing, a display (e.g., the display 260 of FIG. 2A) including a first display area (e.g., the first display area 261 of FIG. 2A) provided on the first housing, and a second display area (e.g., the second display area 263 of FIG. 2A) and a third display area (e.g., the third display area 265 of FIG. 2A) provided on the second housing, and at least one processor (e.g., the processor 320 of FIG. 3) is configured to, based on a state of the electronic device being a first state in which the hinge is unfolded, control the display to display an execution screen of a first application in the first display area and the second display area, and to display, in the third display area, at least one default button for controlling the electronic device, based on the state of the electronic device changing from the first state to a second state in which the hinge is folded, control the display to display a panel button for displaying a panel, in the third display area, and based on a selection of the panel button in the second state, control the display to display the execution screen of the first application in the first display area, and to display, in the second display area, a first panel including at least one control button for controlling the first application and at least one system button for controlling a system of the electronic device.

According to various embodiments, the processor may be further configured to select the at least one control button for controlling the first application based on identifying the first application as an application type corresponding to the first panel, and control the display to display the selected at least one control button for controlling the first application on the first panel.

According to various embodiments, based on detecting a selection of a button for a display of a next panel while the first panel is displayed, the processor may be further configured to control the display to display, in the second display area, a second panel including at least one common button which for controlling a plurality of applications and the at least one system button for controlling the system of the electronic device.

According to various embodiments, the processor may be further configured to control the display to display, in the second display area, a second panel including at least one common button for controlling a plurality of applications, and the at least one system button for controlling the system of the electronic device based on the first application being identified as an application type corresponding to the second panel.

According to various embodiments, the processor may be further configured to control the display to display at least one common button for controlling a plurality of applications, in the first panel according to a display configuration of the first panel.

According to various embodiments, the processor may be further configured to select at least one operation button for controlling an operation related to the first application, based on a type of an external electronic device connected to the electronic device or state information the first application, and control the display to display the selected at least one operation button together with the at least one system button in the first panel.

According to various embodiments, the processor may be further configured to, based on a rotation of the electronic device being detected while the first panel is displayed in the second display area, control the display to adjust a size and a position of the first panel, based on rotation information, a position of the third display area, and information about a size of the second display area.

According to various embodiments, the processor may be further configured to perform change a position of the first panel or hide the first panel, based on a type of a gesture detected in the second display area.

According to various embodiments, the processor may be further configured to: control the display to display the execution screen of the first application in the first display area and to display an execution screen of a second application in the second display area, when execution of a second application is identified based on a selection of an application list provision button from among at least one common button included in a second panel displayed in the second display area, and based on detecting a selection of the second application, control the display to display the execution screen of the second application in the first display area and to display, in the second display area, the first panel including at least one control button for controlling the second application and the at least one system button for controlling the system of the electronic device.

According to various embodiments, the processor may be further configured to: provide, in the second display area, a touch pad panel for controlling the first application based on detecting a selection of a button for providing a touch pad, from among at least one common button included in a second panel displayed in the second display area, and provide, in the second display area, a cursor function panel for controlling the first application based on detecting a selection of a button for providing a cursor function, from among the at least one common button.

According to various embodiments, an electronic device (e.g., the electronic device 301 of FIG. 3) may include a first housing (e.g., the first housing 271 of FIG. 2A), a second housing (e.g., the second housing 274 of FIG. 2A), a hinge (e.g., the hinge 281 of FIG. 2A) configured to foldably connect a side of the first housing to a side of the second housing, at least one sensor (e.g., the sensor module 376 of FIG. 3) configured to detect a folding state of the electronic device and a posture of the electronic device, a display (e.g., the display 260 of FIG. 2A) including a first display area (e.g., the first display area 261 of FIG. 2A) provided on the first housing, and a second display area (e.g., the second display area 263 of FIG. 2A) provided on the second housing, and a processor (e.g., the processor 320 of FIG. 3), is configured to, based on detecting that the folding state is a state in which the hinge is unfolded, control the display to display an execution screen of an application in the first display area and the second display area, and based on detecting that the folding state is changed from state in which the hinge is unfolded to a state in which the hinge is folded, and based on detecting that the posture of the electronic device is a posture in which the first display area is disposed higher than the second display area, based on sensor information received from the at least one sensor, control the display to display the execution screen of the application in the first display area, and display, in the second display area, a panel including at least one control button for controlling the application and at least one system button for controlling a system of the electronic device.

Figure 23:
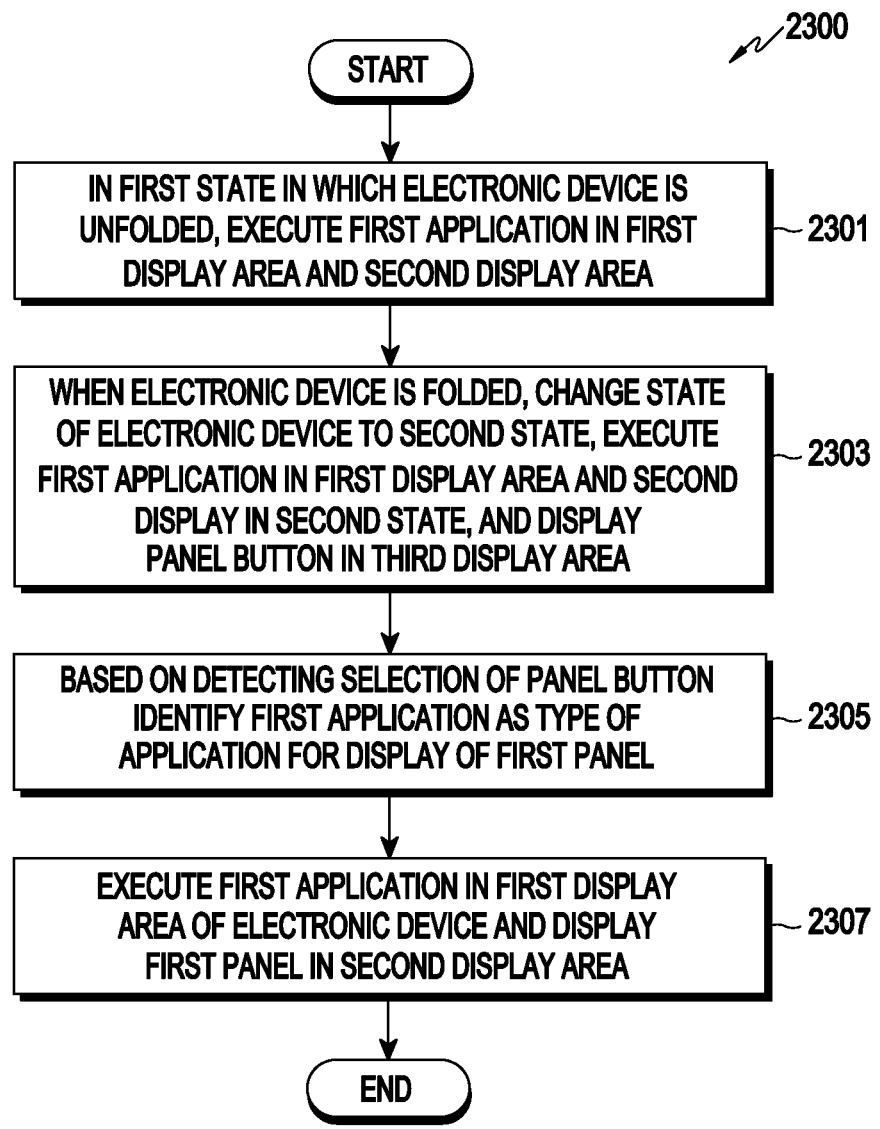
FIG. 23 is a flow chart illustrating an operation of providing a panel displayed in a second display area in an electronic device according to various embodiments.

FIG. 23 is a flow chart 2300 illustrating an operation of providing a panel displayed in a second display area in an electronic device according to various embodiments. The operations of providing the panel may include operations 2301 to 2307. According to an embodiment, at least one of operations 2301 to 2307 may be omitted, the sequence of some operations may change, or another operation may be added. The operation of providing the panel may be performed by the electronic device 101 of FIG. 1, the processor 120 of FIG. 1, the electronic device 201 of FIGS. 2A to 2C, the electronic device 301 of FIG. 3, or the processor 320 of FIG. 3.

In operation 2301, the electronic device 301 may identify execution of a first application in a first display area (e.g., the first display area 361 of FIG. 3) and a second display area (e.g., the second display area 363 of FIG. 3) in a first state (e.g., the first state of the electronic device of FIG. 2A) of an unfolded electronic device.

According to an embodiment, the electronic device may display the execution of the first application by using the first display area and the second display area of the electronic device as one screen in an unfolded first state, display at least one default button (e.g., at least one default button 265a of FIG. 2A) for control of the electronic device in the third display area (e.g., the third display area 365 of FIG. 3), and for example, display, in the third display area, a navigation bar including a recent app button, a home button, and a back button.

In operation 2303, the state of the electronic device 301 may change to a second state (e.g., the second state of the electronic device of FIG. 2B) when the electronic device is folded, and the electronic device may execute a first application in a first display area (e.g., the first display area 361 of FIG. 3) and a second display area (e.g., the second display area 363 of FIG. 3) and display a panel button (e.g., the panel button 265b of FIG. 2B) in a third display area (e.g., the third display area 365 of FIG. 3) in the second state.

According to an embodiment, when the position of the first display area (e.g., the first display area 361 of FIG. 3) of the electronic device changes by a predetermined angle according to folding of a hinge (e.g., the hinge 281 of FIG. 2A), the electronic device may detect the change to the second state by using sensor information received from a sensor module (e.g., the sensor module 376 of FIG. 3) of the electronic device.

According to an embodiment, in the second state, the electronic device may display the execution screen of the first application by using the first display area and the second display area of the electronic device as one screen, and additionally display, in the third display area, the panel button for a display of a panel together with at least one default button for control of the electronic device.

In operation 2305, based on detecting a selection of the panel button, the electronic device 301 may identify the first application as the type of an application for a display of a first panel.

According to an embodiment, based on detecting a selection of the panel button displayed in the third display area in the second state (e.g., the second state of the electronic device of FIG. 2B) of the electronic device, the electronic device may identify whether the first application corresponds to the type of an application for a display of a first panel including at least one control button capable of controlling the application or the type of an application for a display of a second panel including at least one common button which can be commonly used in all or a plurality of applications, based on the type of the first application that is currently being executed. The type of the application for the display of the first panel and the type of the application for the display of the second panel may be stored in the memory 330.

In operation 2307, the electronic device 301 may execute the first application in the first display area (e.g., the first display area 361 of FIG. 3) of the electronic device, and display the first panel in the second display area (e.g., the second display area 363 of FIG. 3).

According to an embodiment, the electronic device may display the execution screen of the first application in the first display area, and display, in the second display area, the first panel including at least one control button capable of controlling the first application and at least one system button capable of controlling a system of the electronic device.

According to an embodiment, when displaying a floating-type first panel in the second display area, the electronic device may divide the first panel into a first area and a second area, display, in the first area, at least one control button capable of controlling the first application, and display, in the second area, at least one system button capable of controlling a system of the electronic device.

According to an embodiment, based on detecting a selection of a button for a display of a next panel, included in the first panel while display the first panel, the electronic device may display the second panel including at least one common button which can be commonly used in all or a plurality of applications and at least one system button capable of controlling a system of the electronic device, instead of displaying the first panel in the second display area.

Figure 24:
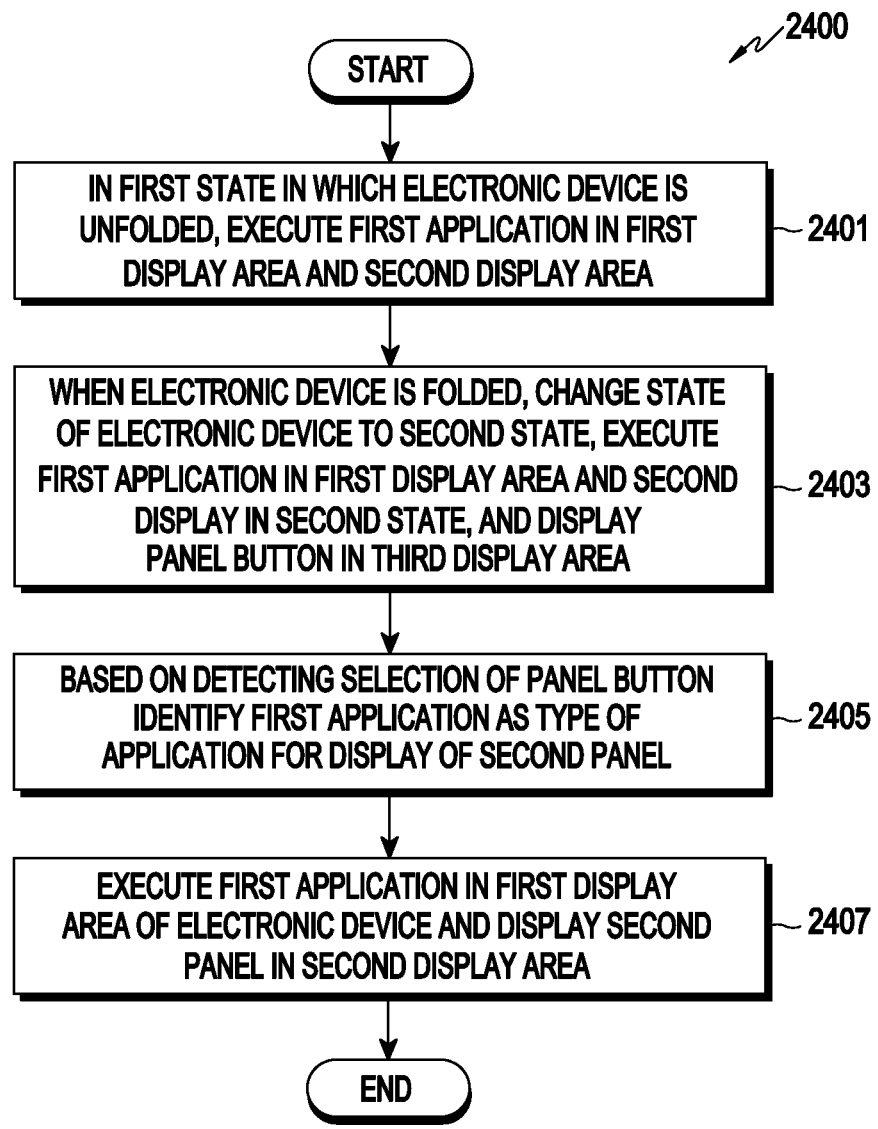
FIG. 24 is a flow chart illustrating an operation of providing a panel displayed in a second display area in an electronic device according to various embodiments.

FIG. 24 is a flow chart 2400 illustrating an operation of providing a panel displayed in a second display area in an electronic device according to various embodiments. The operations of providing the panel may include operations 2401 to 2407. According to an embodiment, at least one of operations 2401 to 2407 may be omitted, the sequence of some operations may change, or another operation may be added. The operation of providing the panel may be performed by the electronic device 101 of FIG. 1, the processor 120 of FIG. 1, the electronic device 201 of FIGS. 2A to 2C, the electronic device 301 of FIG. 3, or the processor 320 of FIG. 3.

In operation 2401, the electronic device 301 may identify execution of a first application in a first display area (e.g., the first display area 361 of FIG. 3) and a second display area (e.g., the second display area 363 of FIG. 3) in a first state (e.g., the first state of the electronic device of FIG. 2A) of an unfolded electronic device.

According to an embodiment, the electronic device may display the execution screen of the first application by using the first display area and the second display area of the electronic device as one screen in an unfolded first state, display at least one default button (e.g., at least one default button 265a of FIG. 2A) for control of the electronic device in the third display area (e.g., the third display area 365 of FIG. 3), and for example, display, in the third display area, a navigation bar including a recent app button, a home button, and a back button.

In operation 2403, the electronic device 301 may change the state of the electronic device to a second state (e.g., the second state of the electronic device of FIG. 2B) when the electronic device is folded, and the electronic device may execute a first application in a first display area (e.g., the first display area 361 of FIG. 3) and a second display area (e.g., the second display area 363 of FIG. 3) and display a panel button (e.g., the panel button 265b of FIG. 2B) in a third display area (e.g., the third display area 365 of FIG. 3) in the second state.

According to an embodiment, when the position of the first display area (e.g., the first display area 361 of FIG. 3) of the electronic device changes by a predetermined angle according to folding of a hinge (e.g., the hinge 281 of FIG. 2A), the electronic device may detect the change to the second state by using sensor information received from a sensor module (e.g., the sensor module 376 of FIG. 3) of the electronic device.

According to an embodiment, in the second state, the electronic device may display the execution screen of the first application by using the first display area and the second display area of the electronic device as one screen, and additionally display, in the third display area, the panel button for a display of a panel together with at least one default button for control of the electronic device.

In operation 2405, based on detecting a selection of the panel button, the electronic device 301 may identify the first application as the type of an application for a display of a second panel.

According to an embodiment, based on detecting a selection of the panel button displayed in the third display area in the second state (e.g., the second state of the electronic device of FIG. 2B) of the electronic device, the electronic device may identify whether the first application corresponds to the type of an application for a display of a first panel including at least one control button capable of controlling the application or the type of an application for a display of a second panel including at least one common button which can be commonly used in all or a plurality of applications, based on the type of the first application that is currently being executed. The type of the application for the display of the first panel and the type of the application for the display of the second panel may be stored in the memory 330.

In operation 2407, the electronic device 301 may execute the first application in the first display area (e.g., the first display area 361 of FIG. 3) of the electronic device, and display the second panel in the second display area (e.g., the second display area 363 of FIG. 3).

According to an embodiment, the electronic device may display the execution screen of the first application in the first display area, and display, in the second display area, the second panel including at least one control button which can be commonly used in all or a plurality of applications and at least one system button capable of controlling a system of the electronic device.

According to an embodiment, the electronic device may divide the second panel into a first area and a second area in the same manner as that for the first panel, display, in the first area, at least one common button which can be commonly used in all or a plurality of applications, and display, in the second area, at least one system button capable of controlling a system of the electronic device.

According to various embodiments, a method for providing a panel for control of an application in an electronic device includes, based on a state of the electronic device being a first state in which a hinge is unfolded, wherein the hinge is configured to foldably connect a side of a first housing having a first display area disposed therein to a side of a second housing having a second display area and a third display area arranged therein is unfolded, displaying an execution screen of a first application in the first display area and the second display area and displaying at least one default button for controlling the electronic device in the third display area; based on the state of the electronic device changing from the first state to a second state in which the hinge is folded, displaying a panel button for displaying a panel, in the third display area; and based on a selection of the panel button in the second state, displaying the execution screen of the first application in the first display area and displaying, in the second display area, a first panel including at least one control button for controlling the first application and at least one system button for controlling a system of the electronic device.

According to various embodiments, the method may further include selecting the at least one control button for controlling the first application based on the first application being identified as an application type corresponding to the first panel; and displaying the selected at least one control button for controlling the first application on the first panel.

According to various embodiments, the method may further include, based on detecting a selection of a button for a display of a next panel while the first panel is displayed, displaying, in the second display area, a second panel including at least one common button for controlling a plurality of applications and the at least one system button for controlling the system of the electronic device.

According to various embodiments, the method may further include displaying, in the second display area, a second panel including at least one common button for controlling a plurality of applications, and the at least one system button for controlling the system of the electronic device based on the first application being identified as an application type corresponding to the second panel.

According to various embodiments, the method may further include displaying at least one common button for controlling a plurality of applications, in the first panel according to a display configuration of the first panel.

According to various embodiments, the method may further include selecting at least one operation button for controlling an operation related to the first application, based on a type of an external electronic device connected to the electronic device or state information the first application; and displaying the selected at least one operation button together with the at least one system button on the first panel.

According to various embodiments, the method may further include, based on a rotation of the electronic device being detected while the first panel is displayed in the second display area, adjusting a size and a position of the first panel, based on rotation information, a position of the third display area, and information about a size of the second display area.

According to various embodiments, The method may further include changing a position of the first panel or hiding the first panel, based on a type of a gesture detected in the second display area.

According to various embodiments, the method may further include when execution of a second application is identified based on a selection of an application list provision button from among at least one common button included in a second panel displayed in the second display area, displaying the execution screen of the first application in the first display area and displaying an execution screen of a second application in the second display area in the third state, and based on detecting a selection of the second application, displaying the execution screen of the second application in the first display area and displaying, in the second display area, the first panel including at least one control button for controlling the second application and the at least one system button for controlling the system of the electronic device.

According to various embodiments, the method may further include providing, in the second display area, a touch pad panel for controlling the first application based on detecting a selection of a button for providing a touch pad, from among at least one common button included in a second panel displayed in the second display area; and providing, in the second display area, a cursor function panel for controlling the first application based on detecting a selection of a button for providing a cursor function, from among the at least one common button.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
  a first housing;
  a second housing;
  a hinge configured to foldably connect a side of the first housing to a side of the second housing;
  a display comprising a first display area provided on the first housing, and a second display area and a third display area provided on the second housing; and
  at least one processor configured to:
    based on a state of the electronic device being a first state in which the hinge is unfolded, control the display to display an execution screen of a first application in the first display area and the second display area, and to display, in the third display area, at least one default button for controlling the electronic device,
    based on the state of the electronic device changing from the first state to a second state in which the hinge is folded, control the display to display a panel button for displaying a panel, in the third display area, and
    based on a selection of the panel button in the second state, control the display to display the execution screen of the first application in the first display area, and to display, in the second display area, a first panel comprising at least one control button for controlling the first application and at least one system button for controlling a system of the electronic device.

2. The electronic device of claim 1, wherein the processor is further configured to select the at least one control button for controlling the first application based on identifying the first application as an application type corresponding to the first panel, and control the display to display the selected at least one control button for controlling the first application on the first panel.

3. The electronic device of claim 1, wherein the processor is further configured to, based on detecting a selection of a button for a display of a next panel while the first panel is displayed, control the display to display, in the second display area, a second panel comprising at least one common button for controlling a plurality of applications and the at least one system button for controlling the system of the electronic device.

4. The electronic device of claim 1, wherein the processor is further configured to control the display to display, in the second display area, a second panel comprising at least one common button for controlling a plurality of applications, and the at least one system button for controlling the system of the electronic device based on the first application being identified as an application type corresponding to the second panel.

5. The electronic device of claim 1, wherein the processor is further configured to control the display to display at least one common button for controlling a plurality of applications, in the first panel according to a display configuration of the first panel.

6. The electronic device of claim 1, wherein the processor is further configured to select at least one operation button for controlling an operation related to the first application, based on a type of an external electronic device connected to the electronic device or state information about the first application, and control the display to display the selected at least one operation button together with the at least one system button in the first panel.

7. The electronic device of claim 1, wherein the processor is further configured to, based on a rotation of the electronic device being detected while the first panel is displayed in the second display area, control the display to adjust a size and a position of the first panel, based on rotation information, a position of the third display area, and information about a size of the second display area.

8. The electronic device of claim 1, wherein the processor is further configured to perform change a position of the first panel or hide the first panel, based on a type of a gesture detected in the second display area.

9. The electronic device of claim 1, wherein the processor is further configured to:
  control the display to display the execution screen of the first application in the first display area and to display an execution screen of a second application in the second display area, when execution of a second application is identified based on a selection of an application list provision button from among at least one common button included in a second panel displayed in the second display area, and
  based on detecting a selection of the second application, control the display to display the execution screen of the second application in the first display area and to display, in the second display area, the first panel comprising at least one control button for controlling the second application and the at least one system button for controlling the system of the electronic device.

10. The electronic device of claim 1, wherein the processor is further configured to:
  provide, in the second display area, a touch pad panel for controlling the first application based on detecting a selection of a button for providing a touch pad, from among at least one common button included in a second panel displayed in the second display area, and
  provide, in the second display area, a cursor function panel for controlling the first application based on detecting a selection of a button for providing a cursor function, from among the at least one common button.

11. The electronic device of claim 1, wherein based on the selection of the panel button in the second state, a portion of the execution screen of the first application is moved from the second display area to the first display area.

12. A method for providing a panel for control of an application in an electronic device, the method comprising:
based on a state of the electronic device being a first state in which a hinge is unfolded, wherein the hinge is configured to foldably connect a side of a first housing having a first display area provided therein to a side of a second housing having a second display area and a third display area provided therein is unfolded, displaying an execution screen of a first application in the first display area and the second display area and displaying at least one default button for controlling the electronic device in the third display area;
based on the state of the electronic device changing from the first state to a second state in which the hinge is folded, displaying a panel button for displaying a panel, in the third display area; and
based on a selection of the panel button in the second state, displaying the execution screen of the first application in the first display area and displaying, in the second display area, a first panel comprising at least one control button for controlling the first application and at least one system button for controlling a system of the electronic device.

13. The method of claim 12, further comprising:
selecting the at least one control button for controlling the first application based on the first application being identified as an application type corresponding to the first panel; and
displaying the selected at least one control button for controlling the first application on the first panel.

14. The method of claim 12, further comprising, based on detecting a selection of a button for a display of a next panel while the first panel is displayed, displaying, in the second display area, a second panel comprising at least one common button for controlling a plurality of applications and the at least one system button for controlling the system of the electronic device.

15. The method of claim 12, further comprising displaying, in the second display area, a second panel comprising at least one common button for controlling a plurality of applications, and the at least one system button for controlling the system of the electronic device based on the first application being identified as an application type corresponding to the second panel.

16. The method of claim 12, further comprising displaying at least one common button for controlling a plurality of applications, in the first panel according to a display configuration of the first panel.

17. The method of claim 12, further comprising:
selecting at least one operation button for controlling an operation related to the first application, based on a type of an external electronic device connected to the electronic device or state information about the first application; and
displaying the selected at least one operation button together with the at least one system button on the first panel.

18. The method of claim 12, further comprising, based on a rotation of the electronic device being detected while the first panel is displayed in the second display area, adjusting a size and a position of the first panel, based on rotation information, a position of the third display area, and information about a size of the second display area.

19. The method of claim 12, further comprising:
when execution of a second application is identified based on a selection of an application list provision button from among at least one common button included in a second panel displayed in the second display area, displaying the execution screen of the first application in the first display area and displaying an execution screen of a second application in the second display area, and
based on detecting a selection of the second application, displaying the execution screen of the second application in the first display area and displaying, in the second display area, the first panel comprising at least one control button for controlling the second application and the at least one system button for controlling the system of the electronic device.

20. The method of claim 12, further comprising:
providing, in the second display area, a touch pad panel for controlling the first application based on detecting a selection of a button for providing a touch pad, from among at least one common button included in a second panel displayed in the second display area, and
providing, in the second display area, a cursor function panel for controlling the first application based on detecting a selection of a button for providing a cursor function, from among the at least one common button.

21. An electronic device comprising:
a first housing;
a second housing;
a hinge configured to foldably connect a side of the first housing to a side of the second housing;
at least one sensor configured to detect a folding state of the electronic device and a posture of the electronic device;
a display comprising a first display area provided on the first housing, and a second display area provided on the second housing; and
a processor configured to:
based on detecting that the folding state is a state in which the hinge is unfolded, control the display to display an execution screen of an application in the first display area and the second display area, and
based on detecting that the folding state is changed from state in which the hinge is unfolded to a state in which the hinge is folded and the posture of the electronic device is a posture in which the first display area is provided higher than the second display area, based on sensor information received from the at least one sensor, control the display to display the execution screen of the application in the first display area, and display, in the second display area, a panel comprising at least one control button for controlling the application and at least one system button for controlling a system of the electronic device.

* * * * *